(12) United States Patent
Sakajo et al.

(10) Patent No.: US 10,540,460 B2
(45) Date of Patent: Jan. 21, 2020

(54) FLOW PATTERN REGULAR EXPRESSION CREATING METHOD, REGULAR EXPRESSION CREATING APPARATUS, AND COMPUTER-EXECUTABLE PROGRAM

(71) Applicant: Japan Science and Technology Agency, Kawaguchi-shi, Saitama (JP)

(72) Inventors: Takashi Sakajo, Kyoto (JP); Tomoo Yokoyama, Kyoto (JP)

(73) Assignee: JAPAN SCIENCE AND TECHNOLOGY AGENCY, Kawaguchi-Shi (JP)

( * ) Notice: Subject to any disclaimer, the term of this patent is extended or adjusted under 35 U.S.C. 154(b) by 216 days.

(21) Appl. No.: 15/524,897

(22) PCT Filed: Nov. 6, 2015

(86) PCT No.: PCT/JP2015/081402
§ 371 (c)(1),
(2) Date: May 5, 2017

(87) PCT Pub. No.: WO2016/072515
PCT Pub. Date: May 12, 2016

(65) Prior Publication Data
US 2017/0323033 A1   Nov. 9, 2017

(30) Foreign Application Priority Data
Nov. 6, 2014   (JP) ................... 2014-226532

(51) Int. Cl.
*G06F 17/50* (2006.01)
*G16Z 99/00* (2019.01)

(52) U.S. Cl.
CPC .......... *G06F 17/5009* (2013.01); *G16Z 99/00* (2019.02); *G06F 2217/16* (2013.01)

(58) Field of Classification Search
None
See application file for complete search history.

(56) References Cited

U.S. PATENT DOCUMENTS

| 7,756,335 B2 | 7/2010 | Sternby |
| 9,442,894 B2 | 9/2016 | Sakajo et al. |
| 2015/0248377 A1 | 9/2015 | Sakajo et al. |

FOREIGN PATENT DOCUMENTS

| JP | 2008-532176 A | 8/2008 |
| WO | 2014/041917 A1 | 3/2014 |

OTHER PUBLICATIONS

Cooper, K. D., & Kennedy, K. (Jun. 1984). Efficient computation of flow insensitive interprocedural summary information. In SIGPLAN Symposium on Compiler Construction (pp. 247-258). (Year: 1984).*

(Continued)

*Primary Examiner* — Bijan Mapar
(74) *Attorney, Agent, or Firm* — Amster, Rothstein & Ebenstein LLP

(57) ABSTRACT

There is provided a flow pattern regular expression creating method, a regular expression creating apparatus, and a program enabling provision of a new representation method enabling one-to-one correspondence to a flow pattern. A regular expression creating method of creating a regular expression of a flow pattern in a multiply connected exterior domain with N (N is an integer equal to or larger than 1) holes topologically includes a graph representation creating step of creating a graph representation having one-to-one correspondence to the flow pattern; and a regular expression creating step of creating a regular expression from the graph representation that is created at the graph representation creating step.

11 Claims, 39 Drawing Sheets

(56) References Cited

OTHER PUBLICATIONS

Tian Ma and Shouhong Wang, "Topology of 2-D incompressible flows and applications to geophysical fluid dynamics," RACSAM, vol. 96, Issue 3, (Dec. 31, 2002) pp. 447-459, Rev. R. Acad. Cien. Serie A. Mat.

Darren Crowdy, "A new calculus for two-dimensional vortex dynamics," Theoretical and Computational Fluid Dynamics, vol. 24, No. 1-4 (Apr. 30, 2009) pp. 9-24, Springer.

European Patent Office, "Extended European Search Report," issued in European Patent Application No. 15 858 028.2, which is a European counterpart of U.S. Appl. No. 15/524,897, dated May 17, 2018, 9 pages.

Tomasz Kaczynski, Konstantin Mischaikow and Marian Mrozek., "Computational Homology," Applied Mathematical Sciences 157, Springer, Print (2000).

Takashi Sakajo, "Paradigm Shift Created by Vortex-Boundary Interactions—Ideas of interdisciplinary research between mathematics and other fields of science and feedbacks to mathematics—," Mathematics, vol. 65, No. 3, pp. 309-314 (Jul. 2013).

Takashi Sakajo, Tomoo Yokoyama and Youichi Sawamura "Character String Representation Algorithm for Structurally Stable Incompressible Flows in Two Dimensional Multiply Connected Domains," Kôkyûroku (publications on studies), Research Institute for Mathematical Sciences, Kyoto University, Analysis of flow structure in biofluid dynamics and its role, vol. 1900, pp. 11-25 (2014).

Zin Arai, "Towards topological understanding of the structure of fluid flows," The Japan Society of Fluid Mechanics—NAGARE, vol. 33, No. 1, pp. 23-28 (2014).

International Search Report received for PCT Patent Application No. PCT/JP2015/081402 dated Feb. 2, 2016, 5 pages (2 pages of English Translation and 3 pages of PCT search report).

* cited by examiner

FIG.1
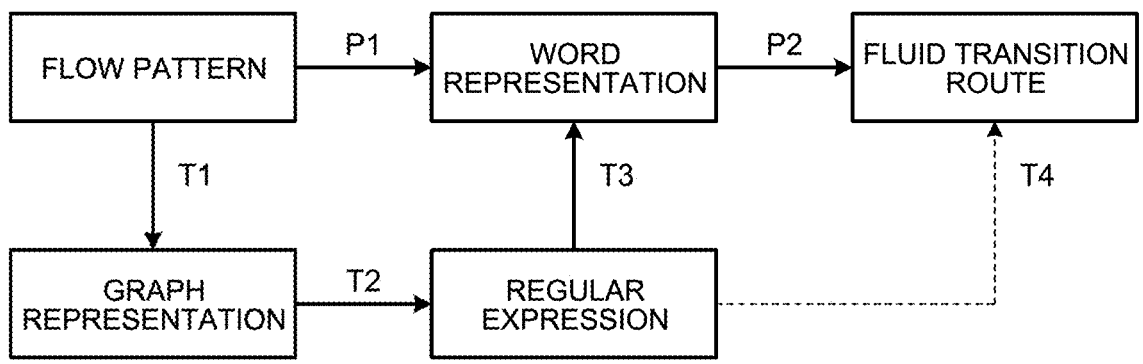
FIG.2-A
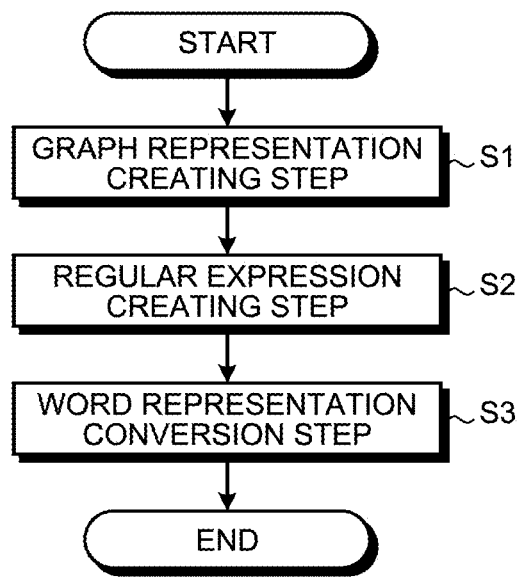

FIG.4
(a)
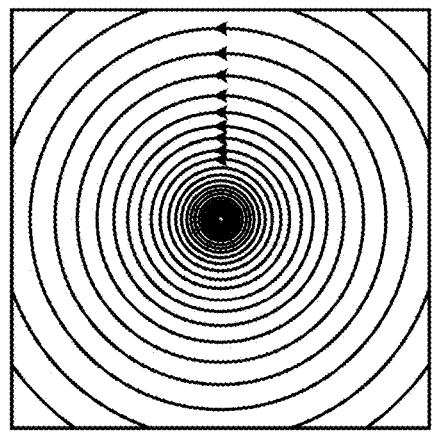
(b)
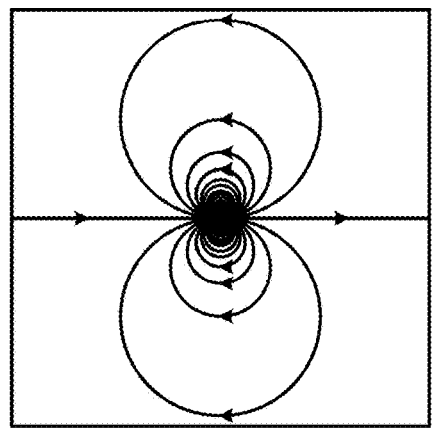
(c)
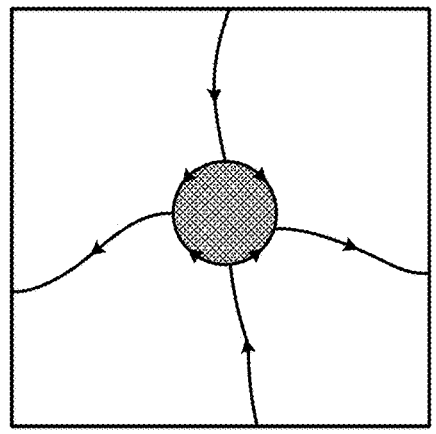

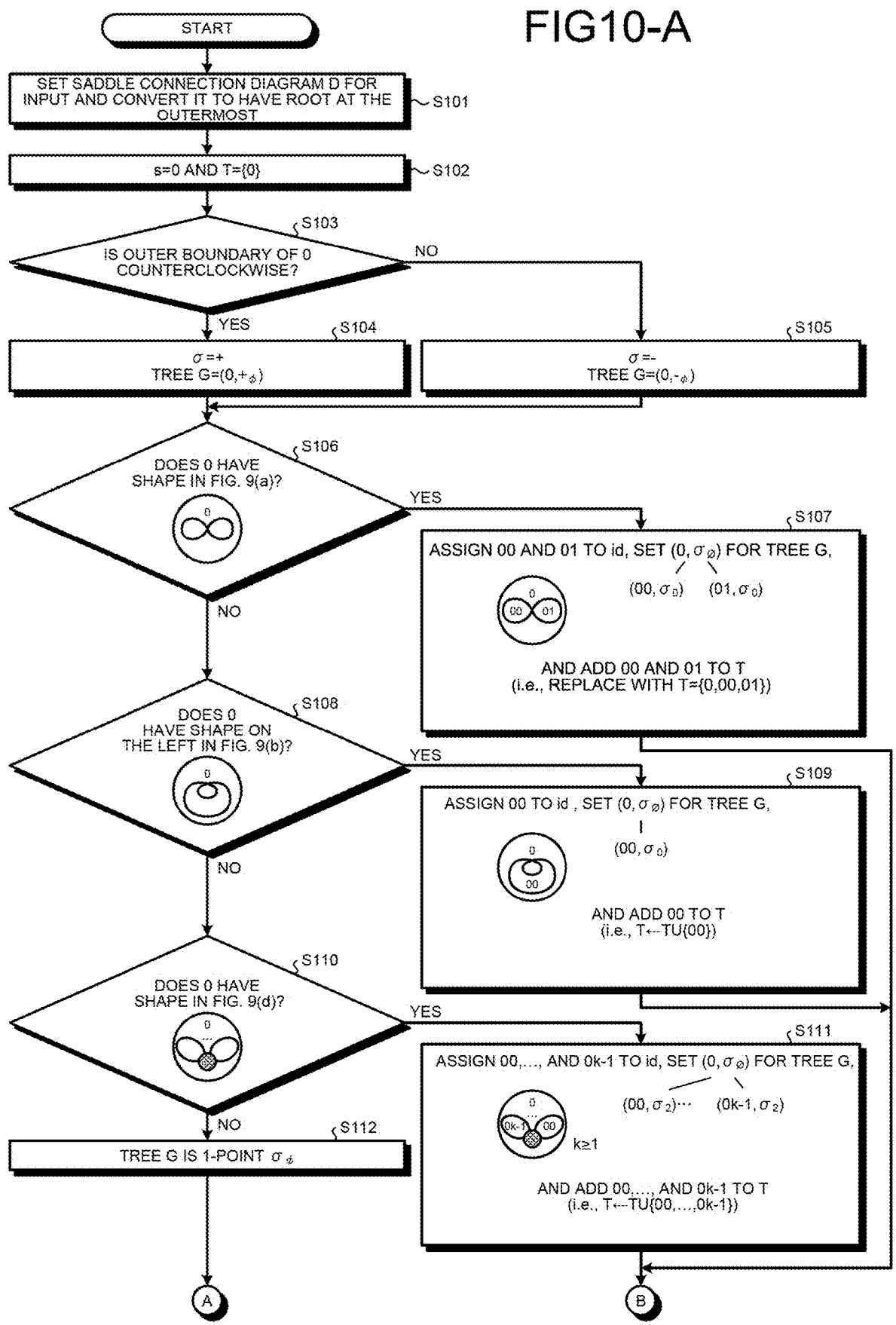

FIG.10-B
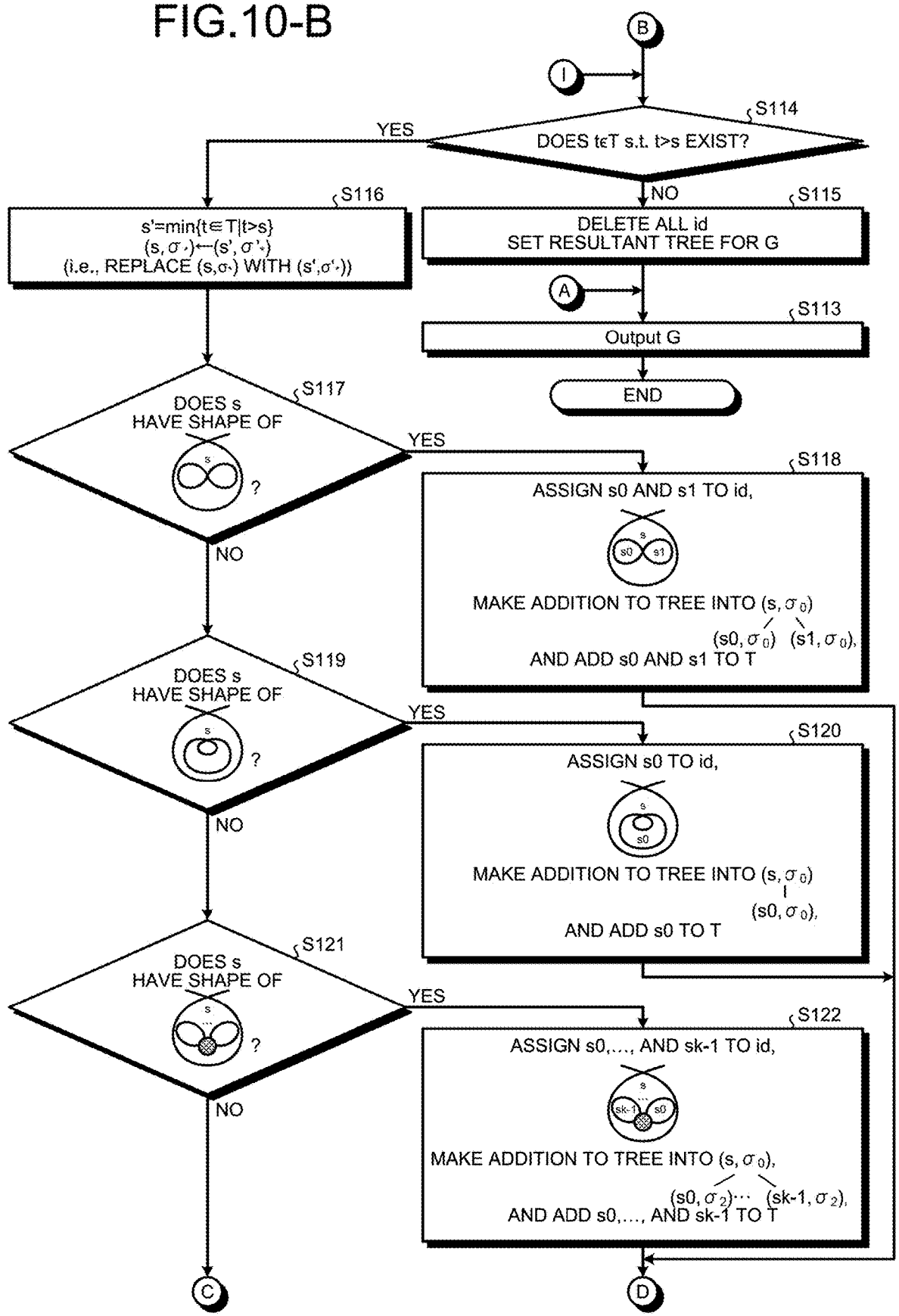

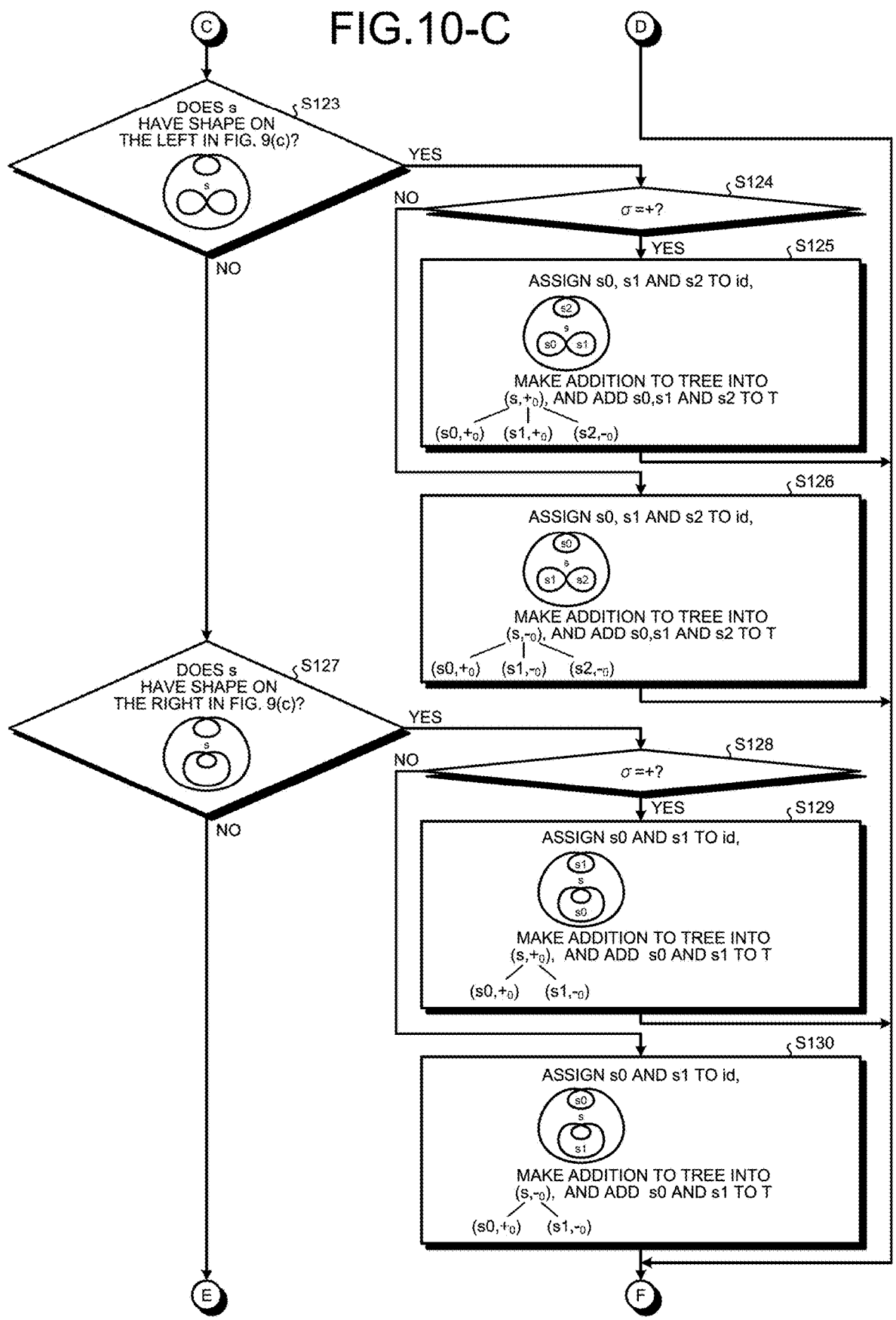

FIG.10-D
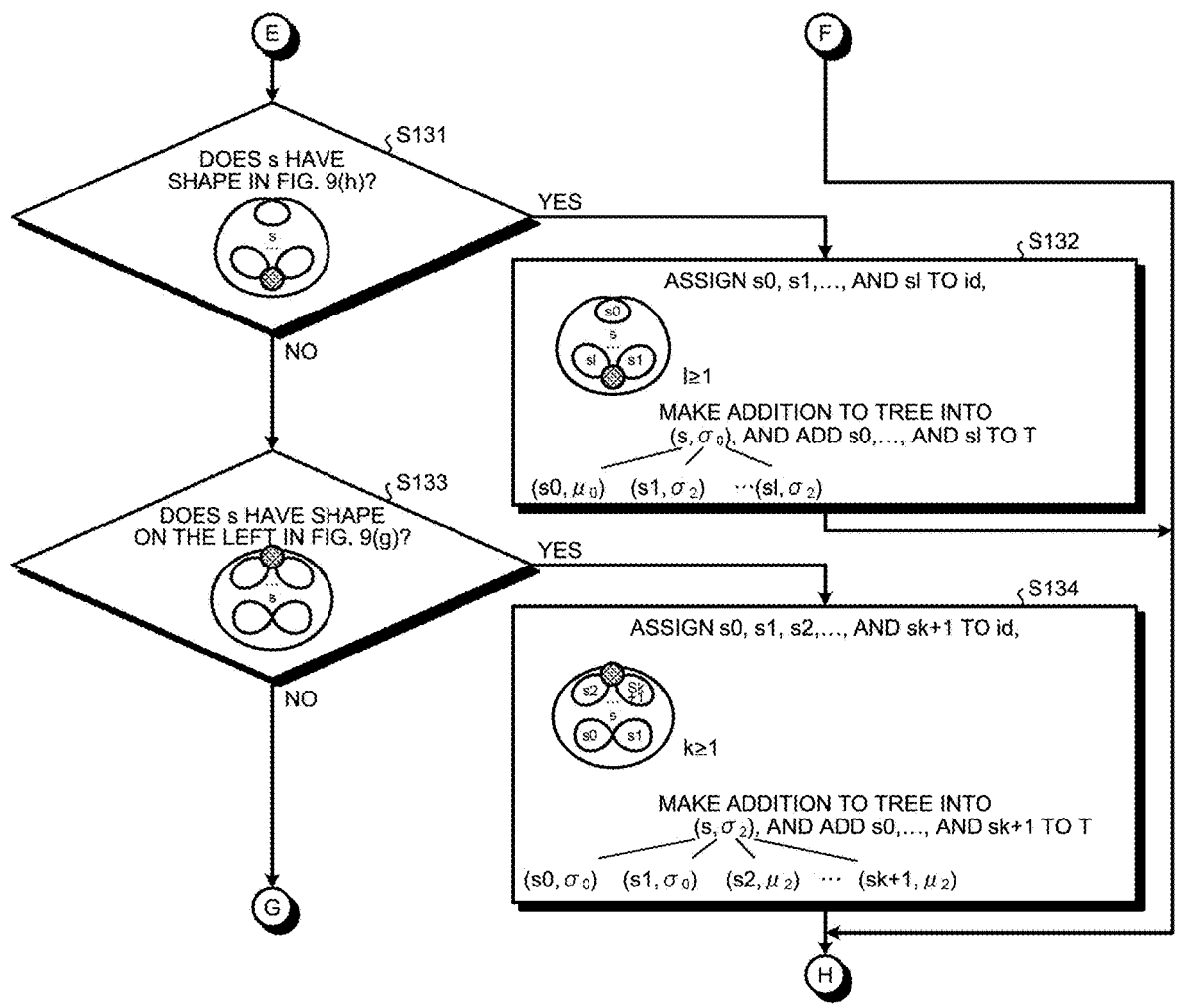

FIG.10-E
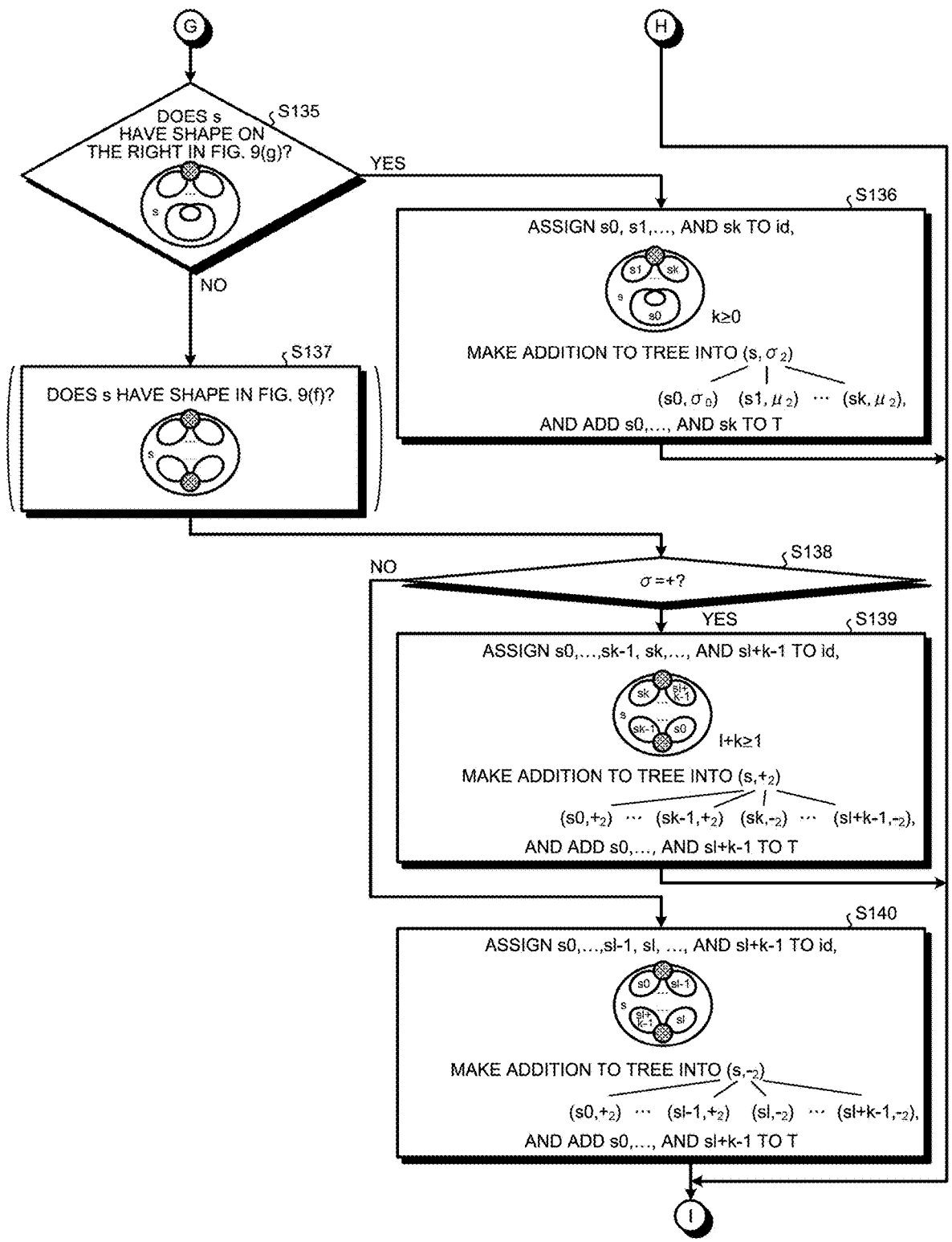

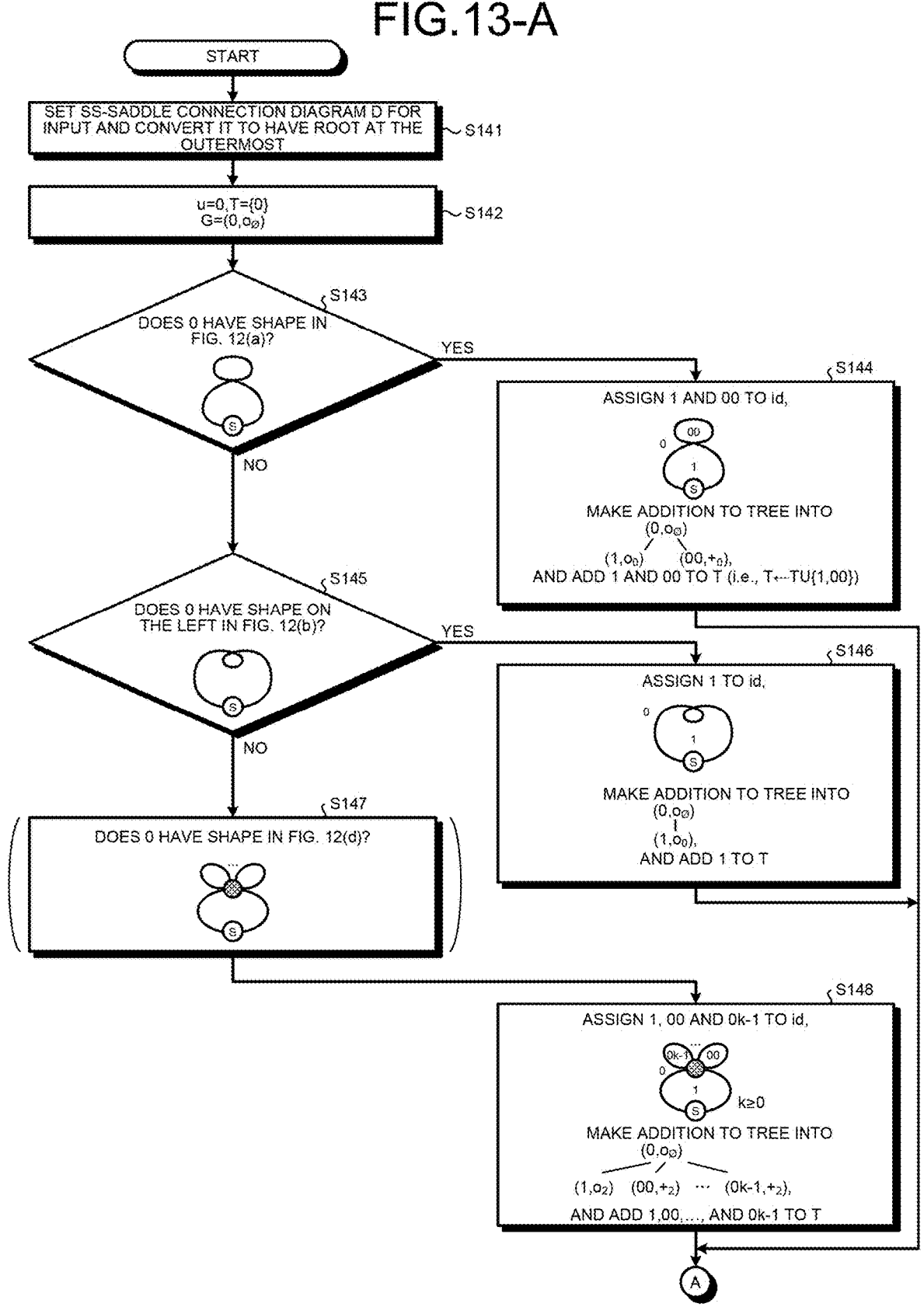
FIG.13-A

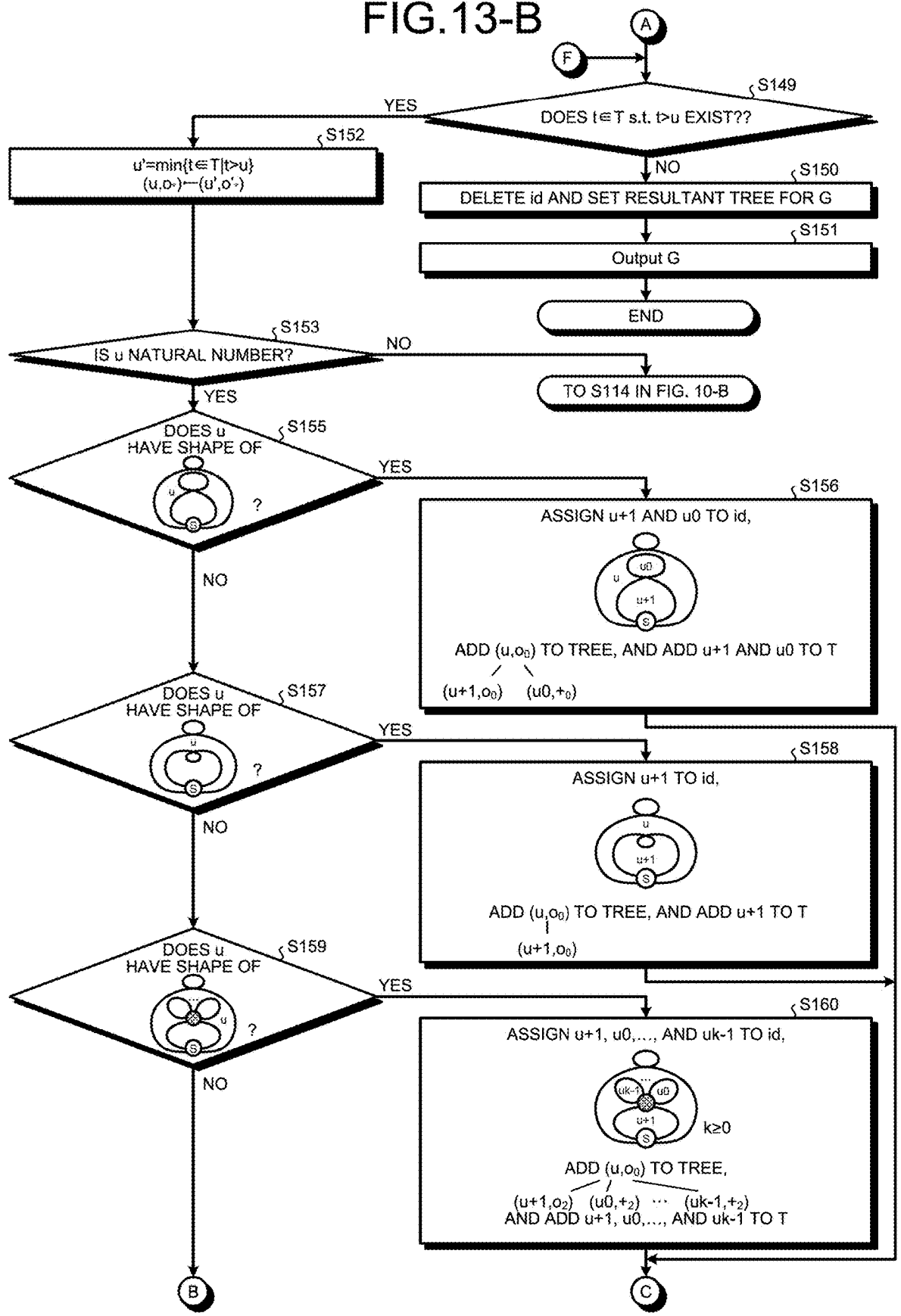
FIG.13-B

FIG.13-C
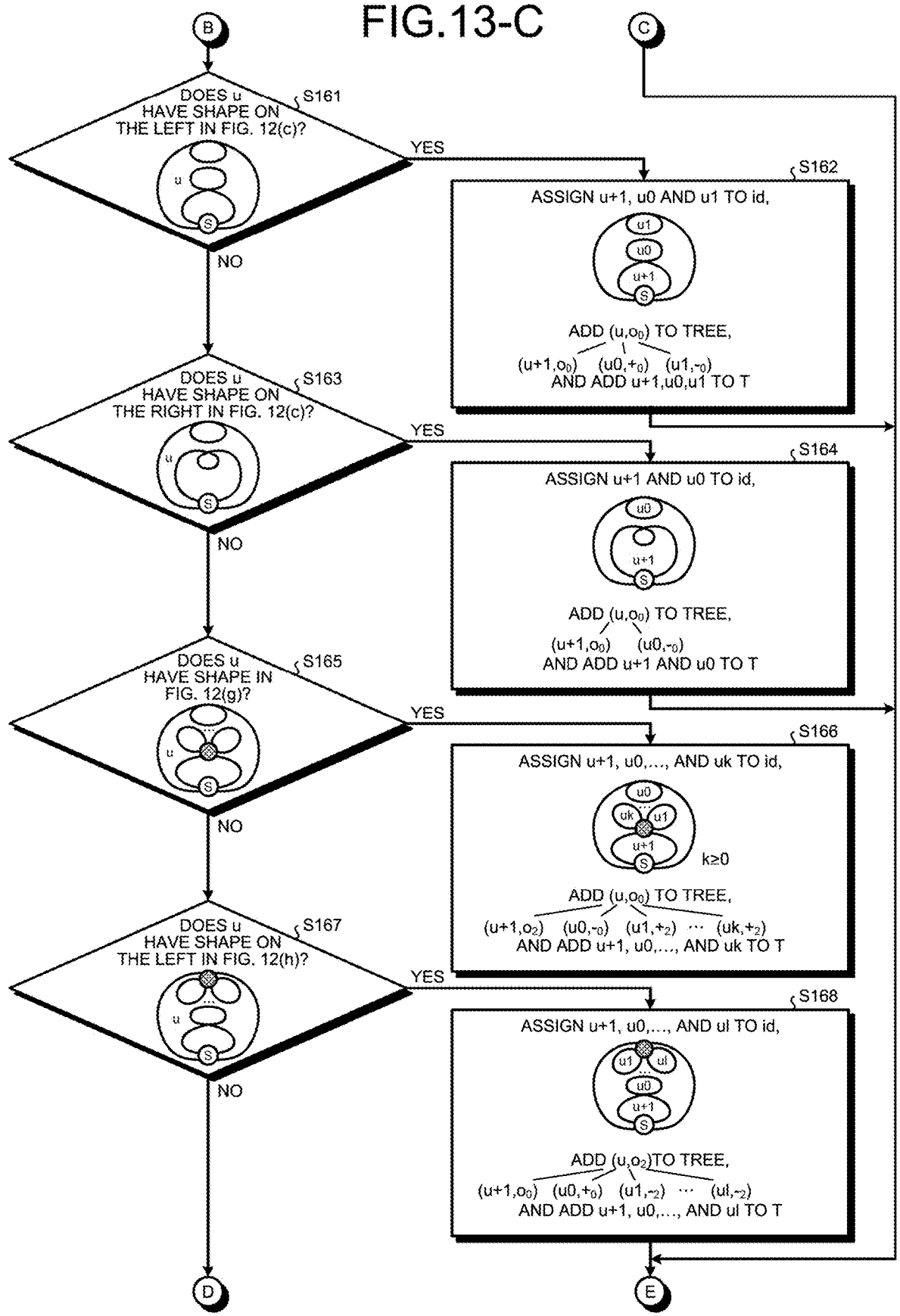

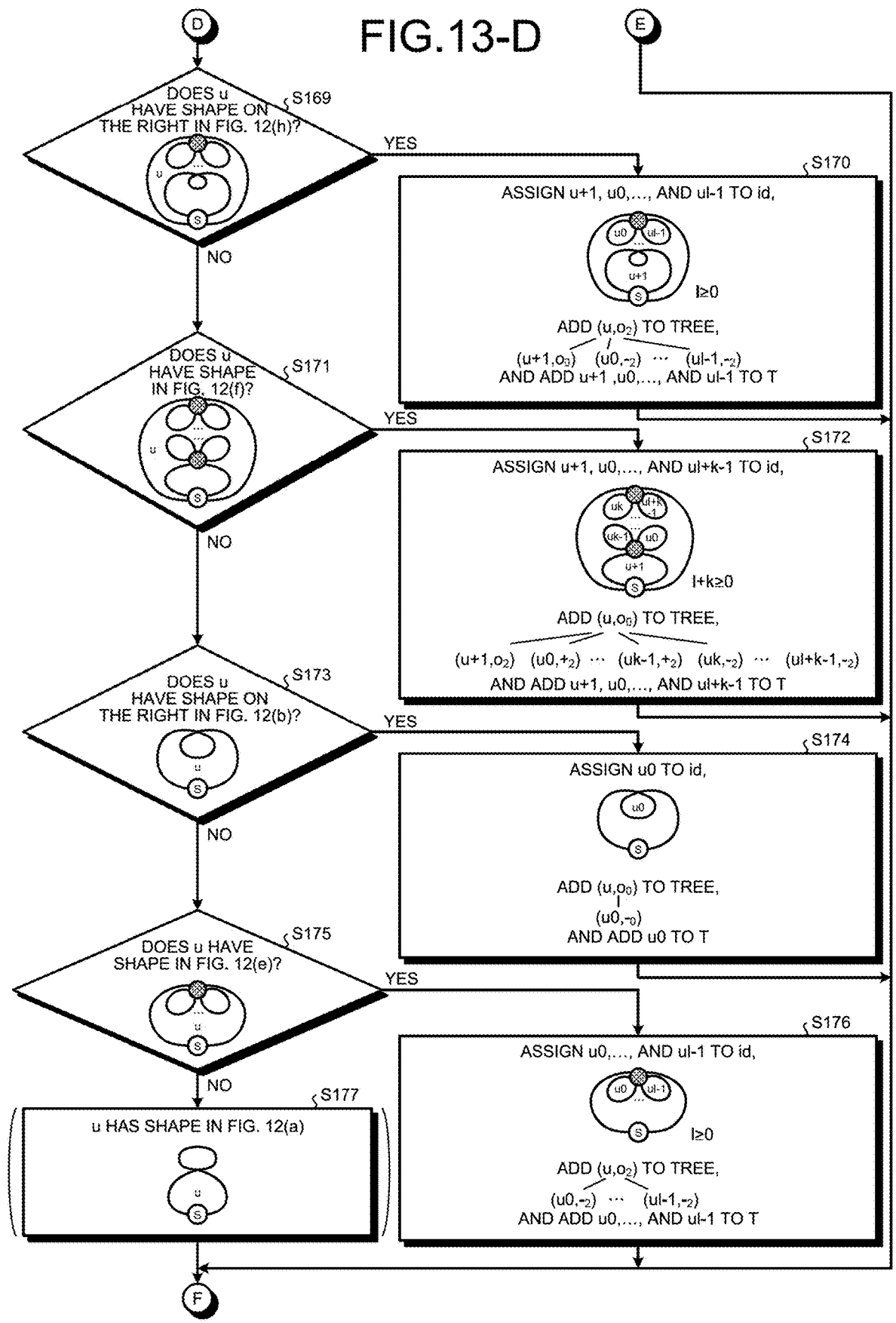
FIG.13-D

FIG.14-A
$\circ_\emptyset(\circ_2(\circ_0, +_0), +_2)$
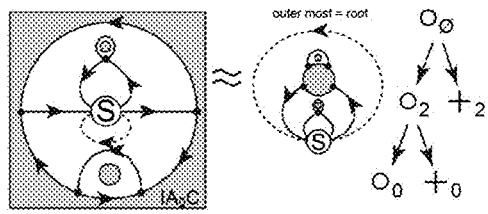
$\circ_\emptyset(\circ_0(\circ_2(-_2), -_0))$
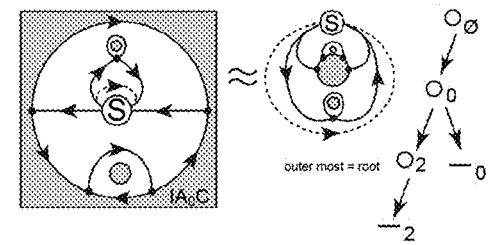
$\circ_\emptyset(\circ_2(\circ_0(-_0)), +_2)$
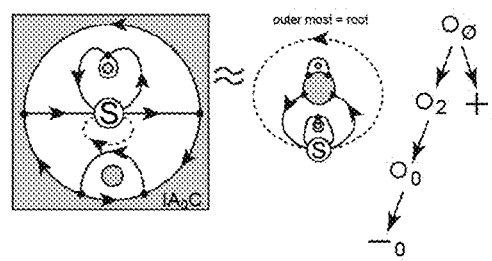
$\circ_\emptyset(\circ_0(\circ_2(-_2)), +_0)$
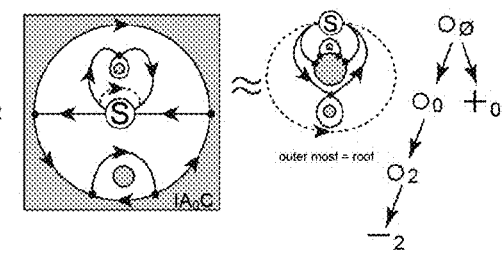
$\circ_\emptyset(\circ_2(\circ_0, +_0, -_2))$
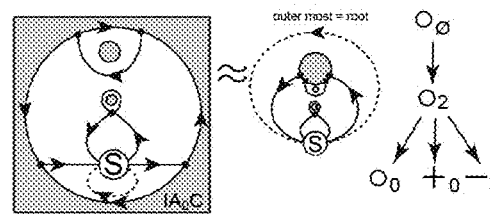
$\circ_\emptyset(\circ_0(\circ_2, -_0, +_2))$
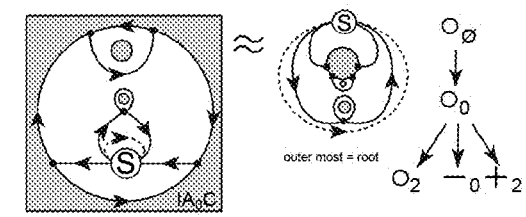
$\circ_\emptyset(\circ_2(\circ_0(-_0), -_2))$
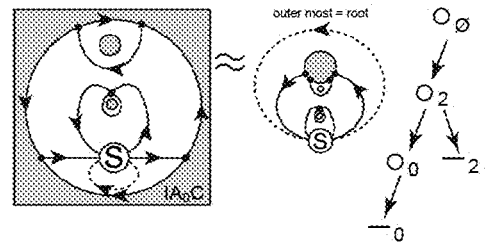
$\circ_\emptyset(\circ_0(\circ_2, +_2), +_0)$
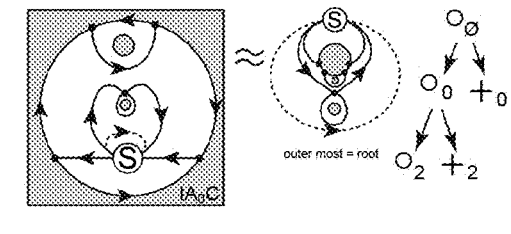

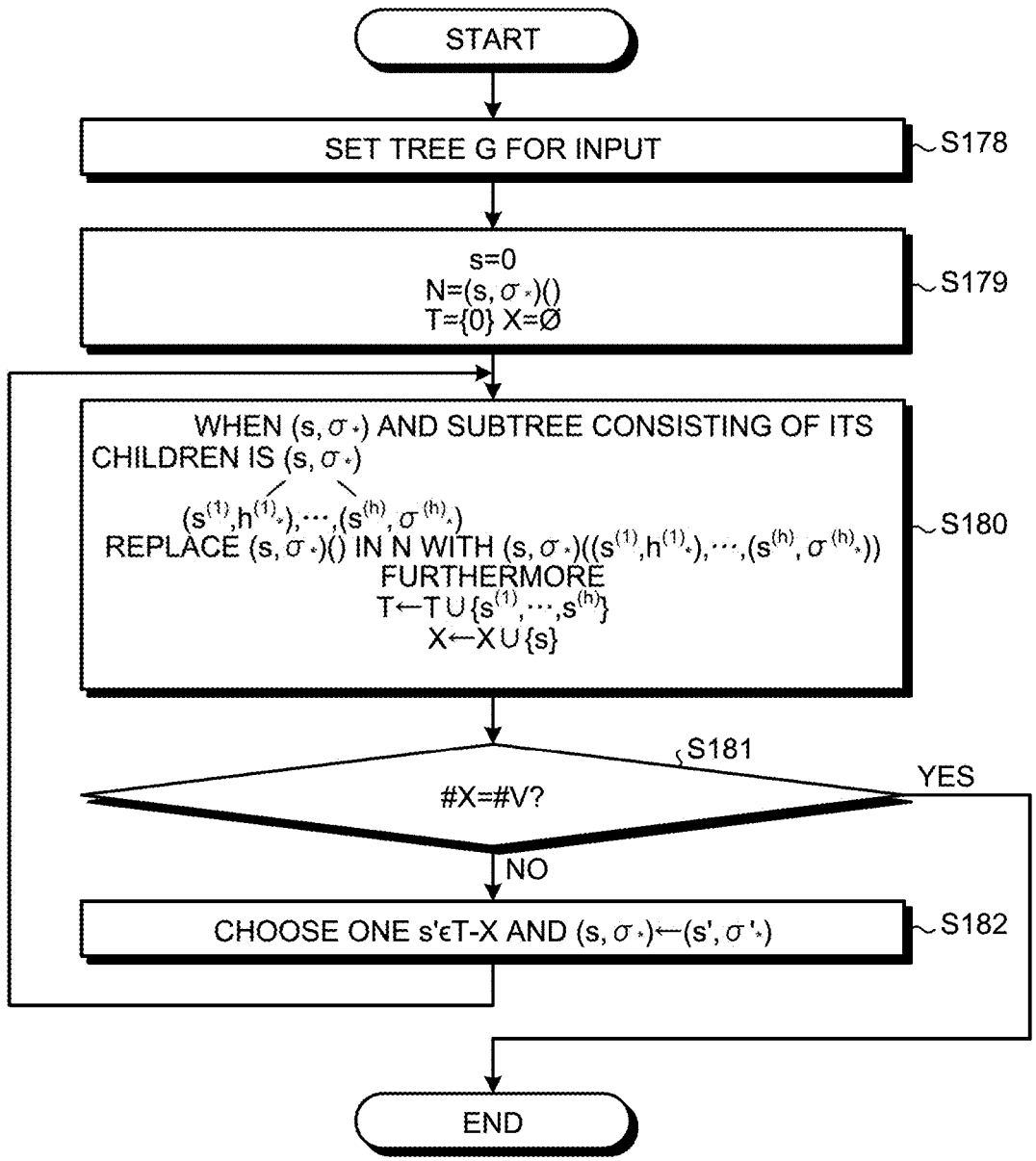
FIG.14-B

FIG.15

| FUNDAMENTAL TYPE $T_N$ | REGULAR EXPRESSION N |
|---|---|
| O | $\sigma_\phi$ |
| $OB_0$ | $\sigma_\phi(\sigma_0, \sigma_0)$ or $\sigma_\phi(\sigma_0(\mu_0))$ |
| $OB_2C^k (k \geq 0)$ | $\sigma_\phi(\underbrace{\sigma_2,...,\sigma_2}_{k+1})$ |
| II | $\circ_\phi(\circ_0(-_0))$ or $\circ_\phi(\circ_0, +_0)$ |
| $IC^k (k \geq 0)$ | $\circ_\phi(\circ_2, \underbrace{+_2,...,+_2}_{k})$ |

FIG.16

| FORWARD REPLACEMENTS | REGULAR EXPRESSION CONVERSION RULES |
|---|---|
| $A_{0+}$ | $\circ_0 \mapsto \circ_0(\circ_0, +_0)$ |
| $A_{0-}$ | $\circ_0 \mapsto \circ_0(\circ_0(-_0))$ |
| $A_2 C^k\ (k \geq 0)$ | $\circ_0 \mapsto \circ_0(\circ_2, \underbrace{+_2, \ldots, +_2}_{k})$ |
| $C^l A_{0+}\ (l \geq 0)$ | $\circ_2 \mapsto \circ_2(\circ_0, +_0, \underbrace{-_2, \ldots, -_2}_{l})$ |
| $C^l A_{0-}\ (l \geq 0)$ | $\circ_2 \mapsto \circ_2(\circ_0(-_0), \underbrace{-_2, \ldots, -_2}_{l})$ |
| $C^l_\circ\ (l \geq 0)$ | $\circ_2 \mapsto \circ_2(\underbrace{-_2, \ldots, -_2}_{l})$ |
| $C^l A_2 C^k\ (l, k \geq 0)$ | $\circ_2 \mapsto \circ_2(\circ_2, \underbrace{+_2, \ldots, +_2}_{k}, \underbrace{-_2, \ldots, -_2}_{l})$ |
| $B_{0+}$ | $\sigma_0 \mapsto \sigma_0(\sigma_0, \sigma_0)$ |
| $B_{0-}$ | $\sigma_0 \mapsto \sigma_0(\sigma_0(\mu_0))$ |
| $B_2 C^k\ (k \geq 0)$ | $\sigma_0 \mapsto \sigma_0(\underbrace{\sigma_2, \ldots, \sigma_2}_{k+1})$ |
| $C^l B_{0+}\ (l \geq 0)$ | $\sigma_2 \mapsto \sigma_2(\sigma_0, \sigma_0, \underbrace{\mu_2, \ldots, \mu_2}_{l})$ |
| $C^l B_{0-}\ (l \geq 0)$ | $\sigma_2 \mapsto \sigma_2(\sigma_0(\mu_0), \underbrace{\mu_2, \ldots, \mu_2}_{l})$ |
| $C^l_\sigma\ (l \geq 0)$ | $\sigma_2 \mapsto \sigma_2(\underbrace{\mu_2, \ldots, \mu_2}_{l})$ |
| $C^l B_2 C^k\ (k, l \geq 0)$ | $+_2 \mapsto +_2(\underbrace{+_2, \ldots, +_2}_{k+1}, \underbrace{-_2, \ldots, -_2}_{l})$, $-_2 \mapsto -_2(\underbrace{+_2, \ldots, +_2}_{l}, \underbrace{-_2, \ldots, -_2}_{k+1})$ |

FIG.17
(a) $A_{0+} : o_0 \mapsto o_0(o_0, +_0)$
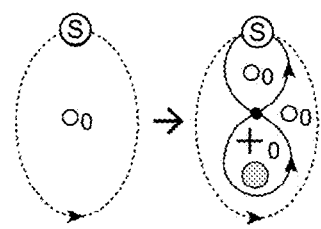
(b) $A_{0-} : o_0 \mapsto o_0(o_0(-_0))$
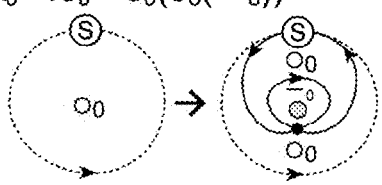
(c) $A_2C^k : o_0 \mapsto o_0(o_2, +_2, ..., +_2)$
$\underbrace{\phantom{+_2, ..., +_2}}_{k}$
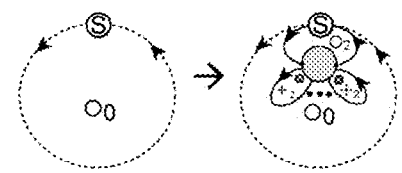
(d) $C^l A_{0+} : o_2 \mapsto o_2(o_0, +_0, \underbrace{-_2, ..., -_2}_{l})$
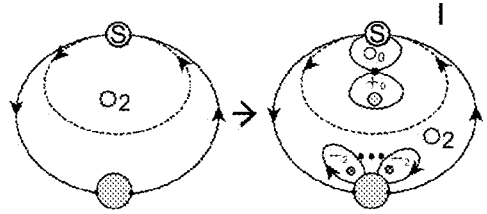
(e) $C^l A_{0-} : o_2 \mapsto o_2(o_0(-_0), \underbrace{-_2, ..., -_2}_{l})$
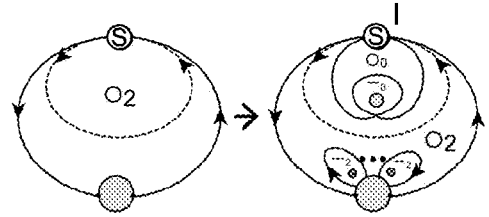
(f) $C_o^l : o_2 \mapsto o_2(\underbrace{-_2, ..., -_2}_{l})$
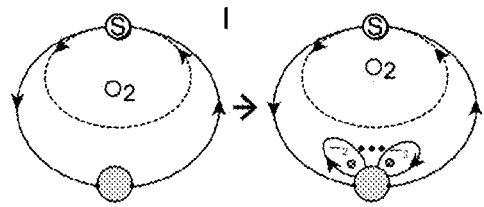
(g) $C^l A_2 C^k : o_2 \mapsto o_2(o_2, \underbrace{+_2, ..., +_2}_{k}, \underbrace{-_2, ..., -_2}_{l})$
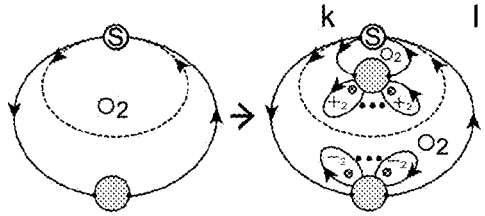

FIG.18

(a) $B_{0+} : \sigma_0 \mapsto \sigma_0(\sigma_0, \sigma_0)$

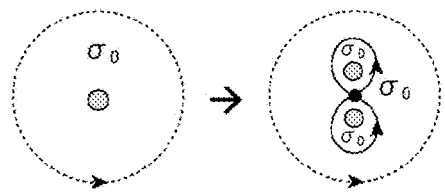

(b) $B_{0-} : \sigma_0 \mapsto \sigma_0(\sigma_0(\mu_0))$

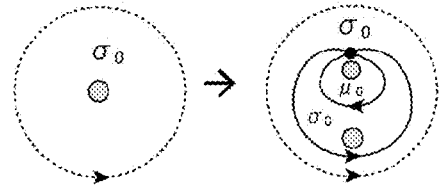

(c) $B_2 C^k : \sigma_0 \mapsto \sigma_0(\underbrace{\sigma_2,...,\sigma_2}_{k+1})$

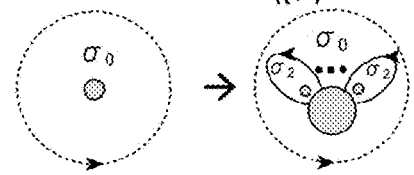

(d) $C^l B_{0+} : \sigma_2 \mapsto \sigma_2(\sigma_0, \sigma_0, \underbrace{\mu_2,...,\mu_2}_{l})$

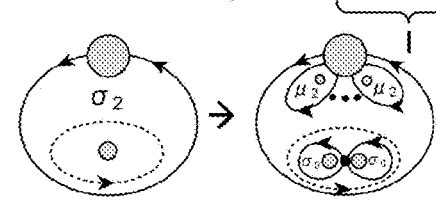

(e) $C^l B_{0-} : \sigma_2 \mapsto \sigma_2(\sigma_0(\mu_0), \underbrace{\mu_2,...,\mu_2}_{l})$

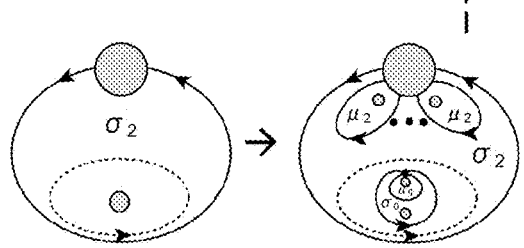

(f) $C_\sigma^l : \sigma_2 \mapsto \sigma_2(\underbrace{\mu_2,...,\mu_2}_{l})$

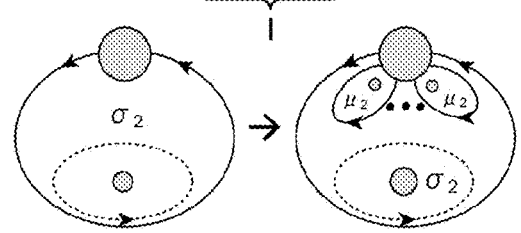

(g) $C^l B_2 C^k : +_2 \mapsto +_2(\underbrace{+_2,...,+_2}_{k+l}, \underbrace{-_2,...,-_2}_{l})$ $-_2 \mapsto -_2(\underbrace{+_2,...,+_2}_{l}, \underbrace{-_2,...,-_2}_{k+l})$

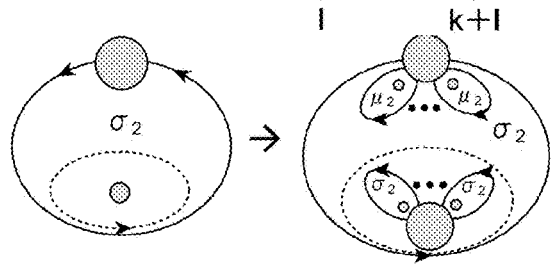

FIG.19

(a) $\sigma_0(\underline{\sigma_2}) \mapsto \sigma_0$

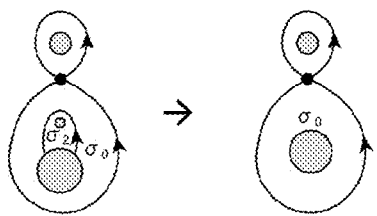

(d) $+_0(\underline{+_0, +_0, -_0}) \mapsto +_0(-_0)$
$-_0(\underline{+_0, -_0, -_0}) \mapsto -_0(+_0)$

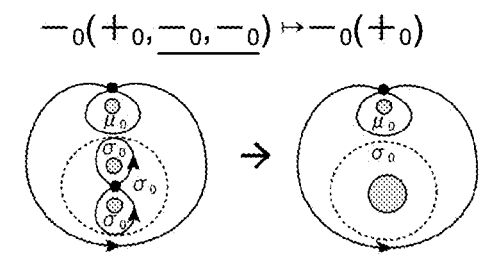

(b) $\sigma_0(\mu_0, \underline{\sigma_2}) \mapsto \sigma_0(\mu_0)$

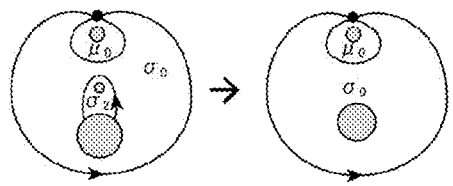

(e) $\circ_0(\circ_2 \underbrace{+_2, \cdots, +_2}_{k}) \mapsto \circ_0(\circ_2 \underbrace{+_2, \cdots, +_2}_{k-1})$

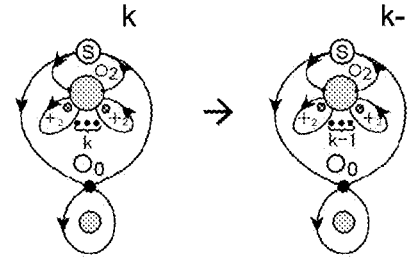

(c) $\sigma_0(\underline{\sigma_0, \sigma_0}) \mapsto \sigma_0$

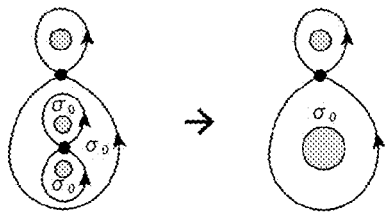

(f) $\circ_0(\circ_2, -_0, \underbrace{+_2, \cdots, +_2}_{k}) \mapsto \circ_0(\circ_2, -_0, \underbrace{+_2, \cdots, +_2}_{k-1})$

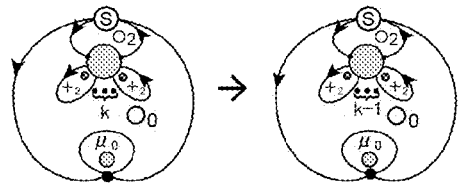

FIG.20

| [$B_2$] | BACKWARD REPLACEMENTS | [$B_0$] | BACKWARD REPLACEMENTS |
|---|---|---|---|
| $OB_2$ | $\sigma_\phi(\underline{\sigma_2}) \mapsto \sigma_\phi$ | $OB_0$ | $\sigma_\phi(\underline{\sigma_0,\sigma_0}) \mapsto \sigma_\phi$ |
| $B_2$ | $\sigma_0(\underline{\sigma_2}) \mapsto \sigma_0,\ \sigma_0(\mu_0,\underline{\sigma_2}) \mapsto \sigma_0(\mu_0)$ | $B_0$ | $\sigma_0(\underline{\sigma_0,\sigma_0}) \mapsto \sigma_0,\ \sigma_0(\underline{\sigma_0,(\mu_0)}) \mapsto \sigma_0$ |
| $C^iB_2$ | $+_2(\underline{+_2},\underbrace{-_2,...,-_2}_{i\geq 0}) \mapsto +_2(\underbrace{-_2,...,-_2}_{i})$ | $C^iB_{0+}$ | $\sigma_2(\underline{\sigma_0,\sigma_0},\underbrace{\mu_2,...,\mu_2}_{i\geq 0}) \mapsto \sigma_2(\underbrace{\mu_2,...,\mu_2}_{i})$ |
|  | $-_2(\underbrace{+_2,...,+_2}_{i\geq 0},\underline{-_2}) \mapsto -_2(\underbrace{+_2,...,+_2}_{i})$ | $C^iB_{0-}$ | $\sigma_2(\underline{\sigma_0(\mu_0)},\underbrace{\mu_2,...,\mu_2}_{i\geq 0}) \mapsto \sigma_2(\underbrace{\mu_2,...,\mu_2}_{i})$ |
|  |  | $B_{0+}$ | $+_0(\underline{+_0,+_0},-_0) \mapsto +_0(-_0)$ |
|  |  |  | $-_0(+_0,\underline{-_0},-_0) \mapsto -_0(+_0)$ |
|  |  | $B_{0-}$ | $+_0(\underline{+_0(-_0)},-_0) \mapsto +_0(-_0)$ |
|  |  |  | $-_0(+_0,\underline{-_0(+_0)}) \mapsto -_0(+_0)$ |

| [C] | BACKWARD REPLACEMENTS |
|---|---|
| $IC^k$ | $\circ_\phi(\circ_2,\underbrace{+_2,...,+_2}_{k\geq 1}) \mapsto \circ_\phi(\circ_2,\underbrace{+_2,...,+_2}_{k-1})$ |
| $A_2C^k$ | $\circ_0(\circ_2,\underbrace{+_2,...,+_2}_{k\geq 1}) \mapsto \circ_0(\circ_2,\underbrace{+_2,...,+_2}_{k-1}),\ \circ_0(\circ_2,-_0,\underbrace{+_2,...,+_2}_{k\geq 1}) \mapsto \circ_0(\circ_2,-_0,\underbrace{+_2,...,+_2}_{k-1})$ |
| $C^iA_{0+}$ | $\circ_2(\circ_0,+_0,\underbrace{-_2,...,-_2}_{i\geq 1}) \mapsto \circ_2(\circ_0,+_0,\underbrace{-_2,...,-_2}_{i-1})$ |
| $C^iA_{0-}$ | $\circ_2(\circ_0(-_0),\underbrace{-_2,...,-_2}_{i\geq 1}) \mapsto \circ_2(\circ_0(-_0),\underbrace{-_2,...,-_2}_{i-1})$ |
| $C_\circ^i$ | $\circ_2(\underbrace{-_2,...,-_2}_{i\geq 1}) \mapsto \circ_2(\underbrace{-_2,...,-_2}_{i-1})$ |
| $B_2C^k$ | $\sigma_0(\underbrace{\sigma_2,...,\sigma_2}_{k+1\geq 2}) \mapsto \sigma_0(\underbrace{\sigma_2,...,\sigma_2}_{k}),\ \sigma_0(\mu_0,\underbrace{\sigma_2,...,\sigma_2}_{k+1\geq 2}) \mapsto \sigma_0(\mu_0,\underbrace{\sigma_2,...,\sigma_2}_{k-1})$ |
| $C^iB_{0+}$ | $\sigma_2(\sigma_0,\sigma_0,\underbrace{\mu_2,...,\mu_2}_{i\geq 1}) \mapsto \sigma_2(\sigma_0,\sigma_0,\underbrace{\mu_2,...,\mu_2}_{i-1})$ |
| $C^iB_{0-}$ | $\sigma_2(\sigma_0(\mu_0),\underbrace{\mu_2,...,\mu_2}_{i\geq 1}) \mapsto \sigma_2(\sigma_0(\mu_0),\underbrace{\mu_2,...,\mu_2}_{i-1})$ |
| $C_\sigma^i$ | $\sigma_2(\underbrace{\mu_2,...,\mu_2}_{i\geq 1}) \mapsto \sigma_2(\underbrace{\mu_2,...,\mu_2}_{i-1})$ |
| $C^iA_2C^k$ | $\circ_2(\circ_2,\underbrace{+_2,...,+_2}_{k\geq 1},\underbrace{-_2,...,-_2}_{i\geq 0}) \mapsto \circ_2(\circ_2,\underbrace{+_2,...,+_2}_{k-1},\underbrace{-_2,...,-_2}_{i})$ |
|  | $\circ_2(\circ_2,\underbrace{+_2,...,+_2}_{k\geq 0},\underbrace{-_2,...,-_2}_{i\geq 1}) \mapsto \circ_2(\circ_2,\underbrace{+_2,...,+_2}_{k},\underbrace{-_2,...,-_2}_{i-1})$ |
| $C^iB_2C^k$ | $+_2(\underbrace{+_2,...,+_2}_{k+1\geq 2},\underbrace{-_2,...,-_2}_{i\geq 0}) \mapsto +_2(\underbrace{+_2,...,+_2}_{k},\underbrace{-_2,...,-_2}_{i})$ |
|  | $+_2(\underbrace{+_2,...,+_2}_{k+1\geq 1},\underbrace{-_2,...,-_2}_{i\geq 1}) \mapsto +_2(\underbrace{+_2,...,+_2}_{k+1},\underbrace{-_2,...,-_2}_{i-1})$ |
|  | $-_2(\underbrace{+_2,...,+_2}_{i\geq 1},\underbrace{-_2,...,-_2}_{k+1\geq 1}) \mapsto -_2(\underbrace{+_2,...,+_2}_{i-1},\underbrace{-_2,...,-_2}_{k+1})$ |
|  | $-_2(\underbrace{+_2,...,+_2}_{i\geq 1},\underbrace{-_2,...,-_2}_{k+1\geq 2}) \mapsto -_2(\underbrace{+_2,...,+_2}_{i},\underbrace{-_2,...,-_2}_{k})$ |

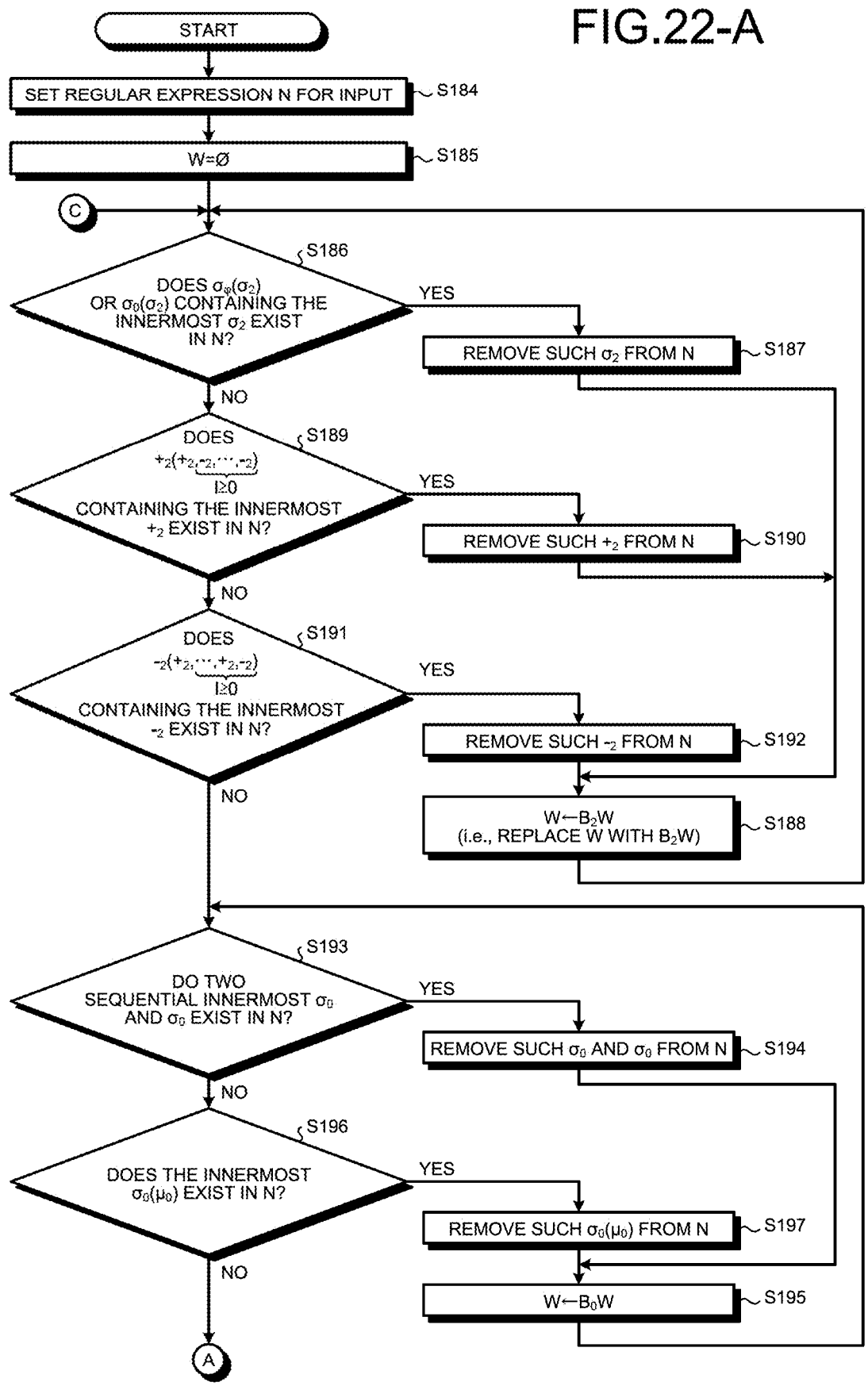
FIG.22-A

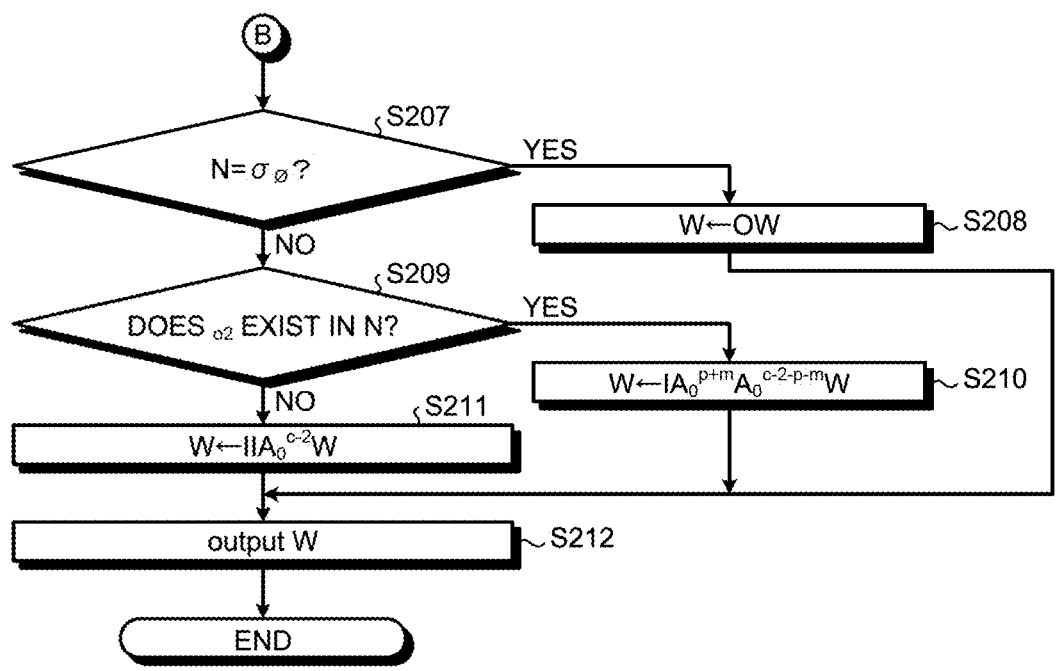
FIG.22-C

FIG.28
(a) $W_4 IA_0 CCB_0$
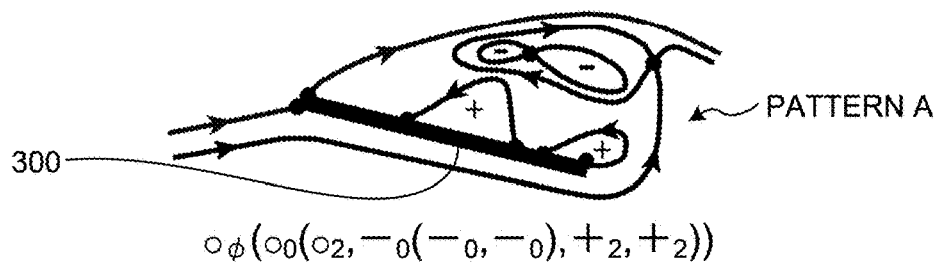
PATTERN A
$\circ_\phi(\circ_0(\circ_2, -_0(-_0, -_0), +_2, +_2))$
⇓ $X = IM_{l,s}$
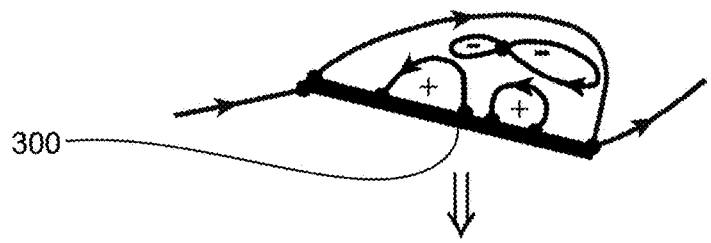
⇓
(b) $ICCCB_0$
$\circ_\phi(\circ_2(-_2(-_0, -_0, +_2, +_2)))$
⇓ $X = ICM_{l,i}$
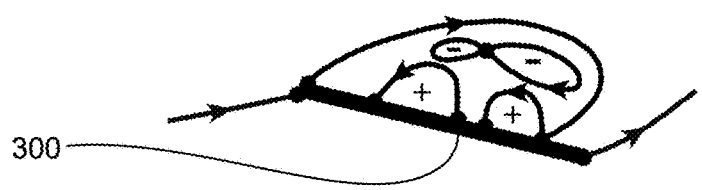
⇓
(c) $IA_0 CCB_0$
PATTERN B
$\circ_\phi(\circ_2(\circ_0, +_0, -_2(-_0, -_0, +_2)))$

FLOW PATTERN REGULAR EXPRESSION CREATING METHOD, REGULAR EXPRESSION CREATING APPARATUS, AND COMPUTER-EXECUTABLE PROGRAM

CROSS-REFERENCE TO RELATED APPLICATIONS

The present application claims the benefit of and priority to Japanese Patent Application No. 2014-226532, filed on Nov. 6, 2014, and International Patent Application No. PCT/JP2015/081402, filed on Nov. 6, 2015, the entire contents of which are incorporated by reference herein.

FIELD

The present invention relates to a flow pattern regular expression creating method, a regular expression creating apparatus, and a computer-executable program.

BACKGROUND

Conventionally, fluid simulations owing to large-scale numerical calculations have been used in addition to wind channel tests in order to design an optimum structure in a flow field, such as an air flow or a water flow.

For example, an optimization technology of repeatedly performing fluid simulations with respect to a structure while changing the design variable of the structure by using simulated annealing, a genetic algorithm method, etc., has been developed.

Furthermore, in recent years, algorithms and programs that make it possible to mathematically deal with topologies of flow patterns by constructing a mathematical model of fluid, or the like, have been developed.

Conventional methods of optimizing structure designing, however, have a problem in that the large-scale calculations that are performed repeatedly lead to increases in calculation time and designing costs and thus, due to restrictions from them, the search area has to be limited and a possibility that the derived optimum structure is locally optimum cannot be excluded. In other words, selecting a search area has to depend on the engineer's experience and intuition and accordingly the derived result of optimization of the structure depends on which search area is set.

To deal with the problem, in Patent Document 1 "FLOW PATTERN WORD REPRESENTATION METHOD, WORD REPRESENTATION APPARATUS, AND PROGRAM (hereinafter, also referred to as "word representation theory")", the applicant of the present application has proposed the word representation theory in which a sequence of words is assigned to a flow that is obtained through numerical calculations and experiments and a quantitative characteristic (for example, the lift-to-drag ratio) appearing therein are represented as a qualitative sequence of subwords. Accordingly, when a structure in a flow field is designed, it is possible to easily deal with flow patterns that can be adopted to the structure without relying on experience and intuition.

CITATION LIST

Patent Literature

Patent Literature 1: International Publication Pamphlet No. WO 2014/041917

Patent Literature

Non Patent Literature 1: Tomasz Kaczynski, Konstantin Mischaikow, Marian Mrozek, "Computational Homology" Springer, 2000.

SUMMARY

Technical Problem

When a problem in controlling flows is considered, the word representation theory is beneficial; however, while there exists an algorithm that assigns a unique word representation to an assigned Hamiltonian vector field, on the contrary, multiple different Hamiltonian vector fields correspond to an assigned sequence of words. In short, it is possible to use word representations to specify flows, while it is not possible to limit specific flows only by using word representations.

As described above, as the theory of optimum control on flows relying on only word representations has difficulty, some sort of another new representation method enabling one-to-one correspondence to a flow pattern has been required together with word representations.

The present invention was made in view of the above-described circumstances, and an object of the present invention is to provide a flow pattern regular expression creating method, a regular expression creating apparatus, and a program enabling provision of a new representation method enabling one-to-one correspondence to a flow pattern.

Solution to Problem

It is an object of the present invention to at least partially solve the problems in the conventional technology. According to an aspect of the present invention, in a flow pattern regular expression creating method of creating a regular expression of a flow pattern in a multiply connected exterior domain with N (N is an integer equal to or larger than 1) holes topologically, the method includes a graph representation creating step of creating a graph representation having one-to-one correspondence to the flow pattern; and a regular expression creating step of creating a regular expression from the graph representation that is created at the graph representation creating step.

According to another aspect of the present invention, in the flow pattern regular expression creating method described above, the graph representation is obtained by assigning a unique rooted, labeled, and directed tree $T_H$= (V,E) (where V is a set of points called vertices and E is a set of edges connecting the vertices) to a structurally stable Hamiltonian vector field H defined by the flow pattern and then visualizing the tree as a plane graph.

According to still another aspect of the present invention, in the flow pattern regular expression creating method described above, the graph representation is obtained by, when v is a parent vertex, w is a child vertex of the parent vertex, l(v) is a label assigned to the parent vertex v, l(w) is a label assigned to the child vertex w, and Γ(v) is the set of child vertices of v, arranging the set of child vertices Γ(v) of v according to rules of a given order relation and drawing arrows from l(v) to l(w) from left to right for w∈Γ(v).

According to still another aspect of the present invention, in the flow pattern regular expression creating method described above, the flow pattern is defined by at least one of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes.

According to still another aspect of the present invention, in the flow pattern regular expression creating method described above, the graph representation creating step includes, when the flow pattern has a 1-source-sink point, converting the flow pattern such that a domain containing a counterclockwise ss-orbit closest to the 1-source-sink point is an outermost domain; extracting orbits appearing on a (ss-) saddle connection diagram of the converted flow pattern from a whole domain; setting vertices for connected components obtained by excluding all orbits appearing on the (ss-) saddle connection diagram from the whole domain and regarding an outermost connected component as a root; setting a current component as the root; regarding the connected components sharing a boundary with the current component as children of the current component, assigning labels according to an orbit serving as the boundary, and arranging the labels according to a given order relation; and setting the children of the current component for current components and repeating the regarding, assigning, and setting until there is no child.

According to still another aspect of the present invention, in the flow pattern regular expression creating method described above, the flow pattern is a flow pattern diagram that is created by repeating an operation, starting from at least one pattern, of assigning any one of operation words defining five types of operations that can be topologically adopted to add a hole to a flow pattern until a number of holes reaches N.

According to still another aspect of the present invention, in the flow pattern regular expression creating method described above, the method further includes a word representation conversion step of converting the regular expression created at the regular expression creating step into a word representation.

According to still another aspect of the present invention, in the flow pattern regular expression creating method described above, the regular expression conversion step includes converting, into the word representation, an admissible regular expression enabling a forward replacement performed on a regular expression of a fundamental type among regular expressions corresponding to a rooted, labeled and directed tree.

According to still another aspect of the present invention, in the flow pattern regular expression creating method described above, the word representation is a sign word that is formed by assigning any one of a plurality of operation words that define five types of operations that can be topologically adopted to add a hole to a flow pattern, for a number of times corresponding to a number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes.

According to still another aspect of the present invention, in the flow pattern regular expression creating method described above, the method further includes a design parameter selecting step of, to select a possible design parameter for an object in a fluid, setting an upper limit and a lower limit of the design parameter, selecting multiple parameters from a parameter region that is defined by the upper limit and the lower limit, performing experiments and/or numerical calculations on a flow with respect to each of the selected multiple parameters, assigning the word representations and/or the regular expressions to results of the experiments and/or numerical calculations, and selecting, as the possible design parameter, a design parameter having the word representation and/or the regular expression representing an optimum state among the assigned word representations and/or regular expressions.

According to still another aspect of the present invention, in the flow pattern regular expression creating method described above, the design parameter selecting step further includes a step of performing optimization designing by using the selected design parameter.

According to still another aspect of the present invention, in the flow pattern regular expression creating method described above, the method further includes a second design parameter selecting step of, to select an optimum design parameter for the object in the fluid, changing a design parameter for transition from the regular expression of a current flow pattern to the regular expression of an objective flow pattern and selecting a design parameter leading to the regular expression of the objective flow pattern.

According to still another aspect of the present invention, in the flow pattern regular expression creating method described above, the second design parameter selecting step includes changing the design parameter for transition from the regular expression and the word representation of the current flow pattern to the regular expression and the word representation of the objective flow pattern and selecting a design parameter leading to the regular expression and the word representation of the objective flow pattern.

According to still another aspect of the present invention, in the flow pattern regular expression creating method described above, the second design parameter selecting step includes acquiring one or more routes for transition from the regular expression and the word representation of the current flow pattern to the regular expression and the word representation of the objective flow pattern; changing the design parameter and selecting, from the acquired one or more routes, a route enabling transition from the current flow pattern; and changing, for the selected route, the design parameter around the changed design parameter and selecting a design parameter leading to the regular expression and the word representation of the objective flow pattern.

According to an aspect of the present invention, in a regular expression creating apparatus that creates a regular expression of a flow pattern in a multiply connected exterior domain with N (N is an integer equal to or larger than 1) holes topologically, the apparatus includes a graph representation creating unit that creates a graph representation having one-to-one correspondence to the flow pattern; and a regular expression creating unit that creates a regular expression from the graph representation that is created by the graph representation creating unit.

According to an aspect of the present invention, in a program installed in a regular expression creating apparatus that creates a regular expression of a flow pattern in a multiply connected exterior domain with N (N is an integer equal to or larger than 1) holes topologically, the program causes a computer to execute a graph representation creating step of creating a graph representation having one-to-one correspondence to the flow pattern; and a regular expression creating step of creating a regular expression from the graph representation that is created at the graph representation creating step.

Advantageous Effects of Invention

According to the present invention, there is an effect that it is possible to provide a flow pattern regular expression creating method, a regular expression creating apparatus, and a program enabling provision of a new representation method enabling one-to-one correspondence to a flow pattern.

BRIEF DESCRIPTION OF DRAWINGS

FIG. 1 is an explanatory view for explaining an overview of the present invention.

FIG. 2-B is a flowchart for explaining an exemplary graph representation creating step in FIG. 2-A.

FIG. 4 is a diagram schematically showing structurally stable flow patterns.

FIG. 10-A is a flowchart for explaining a process of converting a saddle connection diagram of O system into a tree.

FIG. 10-B is a flowchart for explaining the process of converting a saddle connection diagram of O system into a tree.

FIG. 10-C is a flowchart for explaining the process of converting a saddle connection diagram of O system into a tree.

FIG. 10-D is a flowchart for explaining the process of converting a saddle connection diagram of O system into a tree.

FIG. 10-E is a flowchart for explaining the process of converting a saddle connection diagram of O system into a tree.

FIG. 13-A is a flowchart for explaining a process of converting an ss-saddle connection diagram of I, II system into a tree.

FIG. 13-B is a flowchart for explaining the process of converting an ss-saddle connection diagram of I, II system into a tree.

FIG. 13-C is a flowchart for explaining the process of converting an ss-saddle connection diagram of I, II system into a tree.

FIG. 13-D is a flowchart for explaining the process of converting an ss-saddle connection diagram of I, II system into a tree.

FIG. 14-A is a diagram showing graph representations of structurally stable streamline patterns with word representations $IA_0C$ and their corresponding regular expressions.

FIG. 14-B is a flowchart for explaining a process of converting a tree into a regular expression.

FIG. 15 is a table showing five fundamental types $T_N$ and their corresponding regular expressions N.

FIG. 16 is a table showing a list of fourteen forward replacements.

FIG. 17 is a diagram showing forward replacements and changes of streamline structures that are obtained when operations $A_0$, $A_2$ and C are applied.

FIG. 18 is a diagram for explaining forward replacements of regular expressions induced in accordance with the changes of streamline structures that are obtained when operations $B_0$, $B_2$ and C are applied to closed orbits contained in simply connected components $\sigma_0$ and $\sigma_2$ in (ss-) saddle connection diagrams.

FIG. 19 is a diagram showing backward replacements of regular expressions corresponding to changes of local streamline structures in (ss-) saddle connection diagrams.

FIG. 20 is a diagram showing lists of the background replacements $[B_2]$, $[B_0]$ and $[C]$ of regular expressions induced by the inverse operations of the operations $B_0$, $B_2$ and C.

FIG. 22-B is a flowchart for explaining the process of converting a regular expression into a word representation.

FIG. 22-C is a flowchart for explaining the process of converting a regular expression into a word representation.

FIG. 28 is an explanatory view for explaining the method of optimizing a flow around an object in a fluid by using word representations and regular expressions.

DESCRIPTION OF EMBODIMENTS

Figure 2:
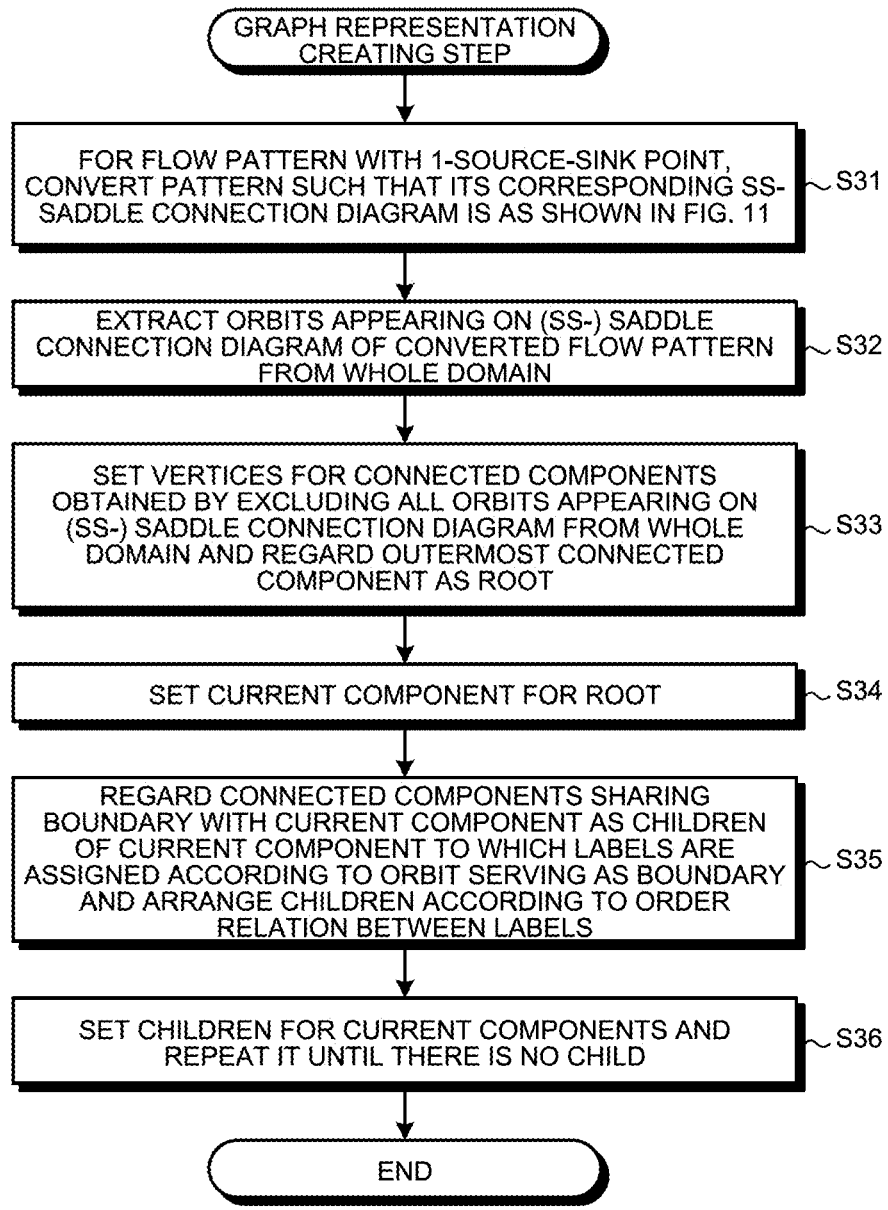
FIG. 2-A is a flowchart for explaining a flow pattern regular expression creating method according to an embodiment.

An embodiment of the structurally stable flow pattern (also referred to as "streamline pattern") regular expression creating method, the regular expression creating apparatus, and the computer-executable program according to the present invention will be described in detail below with reference to the drawings. The components of the invention are generally illustrated in the drawings of the specification, and it will be easily understood that the the components may be arranged and designed in various configurations and extensively and in various ways. The following more detailed descriptions of the embodiments of the device, method, and program of the invention therefore do not limit the scope of the invention represented by the claims, but simply represent the selected embodiment of the invention, simply represent the selected embodiment of the device, the method, and the program without any discrepancy from the invention represented by the claims. Those skilled in the art are able to understand that it is possible to realize the invention even without at least one of the specific items or by using another method, parts, and materials. The order in which the steps in a flowchart are executed is not limited to the order illustrated in the flowcharts and the order may be changed without departing from the point of the invention. Note that the embodiment does not limit the invention. The components of the following embodiment include those that can be assumed by those skilled in the art and those substantially the same as the components. The content of the specification and drawings of International Publication Pamphlet No. WO 2014/041917 (PCT/JP2013/070939) and Japanese Laid-open Patent Publication No. 2013-230678 already filed by the applicant is incorporated by reference into the present specification.

Particularly, regarding the following embodiment, an example where the invention is applied to simulations of a two-dimensional fluid will be described; however, the invention may be applied not only to this case but also to any cross section (such as a cross section of a structure) in three-dimensional simulations.

Overview of Invention

FIG. 1 is an explanatory view for explaining an overview of the present invention. According to "FLOW PATTERN WORD REPRESENTATION METHOD, WORD REPRESENTATION APPARATUS, AND PROGRAM" of Patent Document 1 (International Publication Pamphlet No. WO 2014/041917, Japanese Laid-open Patent Publication No. 2012-203601, and PCT/JP2013/070939) already filed by the applicant, a word representation theory is proposed in which a corresponding sequence of words is assigned to a flow pattern obtained through numeric calculations or experiments and a quantitative characteristic (for example, a lift-to-drag ratio) of a flow appearing in the pattern is represented as a qualitative partial sequence of words.

According to "FLUID TRANSITION ROUTE ACQUISITION APPARATUS, FLUID TRANSITION ROUTE ACQUISITION METHOD, AND PROGRAM" of Japanese Laid-open Patent Publication No. 2013-230678 (undisclosed when this application is filed) filed by the applicant of the present application, a fluid transition route is acquired from a word representation; however, it is necessary to, after covering all possibilities of transition by using word representations, perform pattern matching not on sequences of words but on flow patterns.

According to FIG. 1, as described above, Patent Document 1 has been already filed on (P1) the method of creating a word representation from a flow pattern. Furthermore, Japanese Laid-open Patent Publication No. 2013-230678 has been filed on (P2) the method of creating a fluid transition route from a word representation. Regarding word representations, while it is possible to assign a unique word representation to a flow pattern, multiple different flow patterns correspond to a sequence of words assigned according to a word representation. To deal with this, the flow pattern regular expression creating method according to the embodiment creates a graph representation having one-to-one correspondence to a flow pattern (T1) and creates a regular expression from the graph representation (T2). The flow pattern regular expression creating method according to the embodiment further creates a word representation from the regular expression (T3). As the regular expression has one-to-one correspondence to the flow pattern, it is possible to create a fluid transition route directly from the word representation and the regular expression. Furthermore, the flow pattern regular expression creating method according to the embodiment may further enable creation of a fluid transition route directly from the regular expression.

Flow Pattern Regular Expression Creating Method

With reference to FIGS. 2-A to 22-C, the flow pattern regular expression creating method according to the embodiment will be described. The flow pattern regular expression creating method according to the embodiment is executable by an apparatus, such as a computer. FIG. 2-A is a flowchart for explaining an overview of the flow pattern regular expression creating method according to the embodiment.

As shown in FIG. 2-A, the flow pattern regular expression creating method according to the embodiment creates a regular expression of a flow pattern in a multiply connected exterior domain with N (N is an integer equal to or larger than 1) holes topologically. The method roughly includes a graph representation creating step of creating a graph representation having one-to-one correspondence to the flow pattern (step S1), a regular expression creating step of creating a regular expression from the graph representation that is created at the graph representation creating step at step S1 (step S2), and a word representation conversion step of converting the regular expression that is created at the regular expression creating step at step S2 into a word representation (step S3).

The graph representation may be obtained by assigning a unique rooted, labeled, and directed tree $T_H=(V,E)$ (where V is a set of points called vertices and E is a set of edges connecting the vertices) to a structurally stable Hamiltonian vector field H defined by a flow pattern and then visualizing it as a plane graph.

The graph representation may include one obtained by, when v is a parent vertex, w is a child vertex of the parent vertex, l(v) is a label assigned to the parent vertex v, l(w) is a label assigned to the child vertex w, and Γ(v) is the set of child vertices of v, arranging the set of child vertices Γ(v) of v according to the rules of a given order relation and drawing arrows from l(v) to l(w) from left to right for w∈Γ(v).

The flow pattern may be at least one of patterns of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes.

The word representation may be a sign word that is formed by assigning any one of operation words that define five types of operations that can be topologically adopted to add a hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes.

Figure 11:
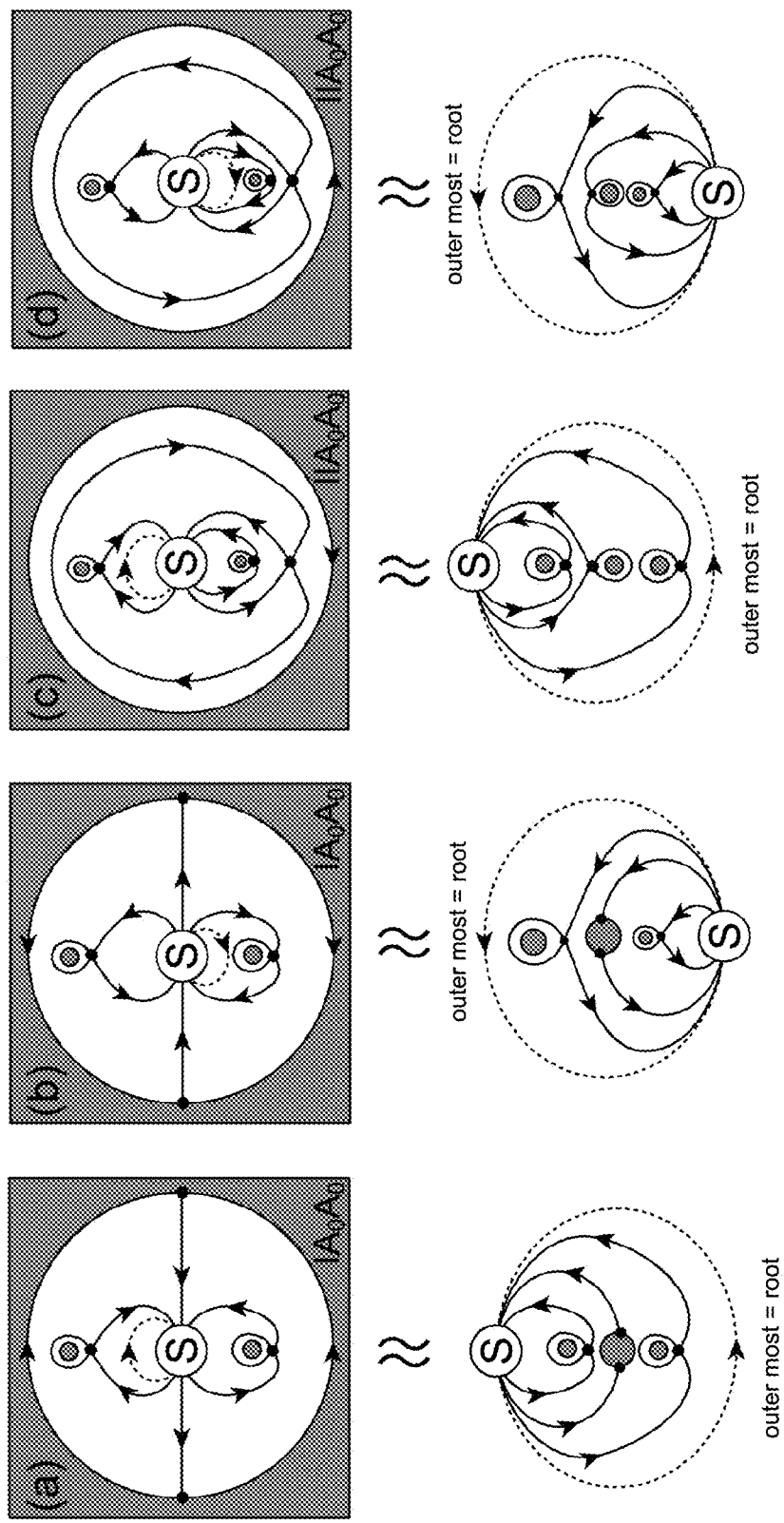
FIG. 11 is a diagram for explaining a method of choosing a connected component serving as a route from $C_H=D_Z(M)$ \D.

FIG. 2-B is a flowchart for explaining the exemplary graph representation creating step in FIG. 2-A. According to FIG. 2-B, in the graph representation creating step, first, when a flow pattern has a 1-source-sink point, the flow pattern is converted such that the domain containing a counterclockwise ss-orbit closest to the 1-source-sink point is the outermost domain (step S31). For example, the flow pattern may be a flow pattern diagram with N holes that is created by repeating an operation, starting from at least one of the above-described patterns, of assigning any one of the operation words defining the five types of operations that can be topologically adopted to add a hole to a flow pattern until the number of holes reaches N. Specifically, as described below, conversion is performed such that the roots of ss-saddle connection diagrams (flow pattern diagram) with I, II-words are as shown in FIG. 11. Then, the orbits appearing on the (ss-) saddle connection diagram of the converted flow pattern are extracted from the whole domain (step S32). Vertices are set for the connected components obtained by excluding all orbits appearing on the (ss-) saddle connection diagram from the whole domain and the outermost connected component is regarded as the root (step S33). The current component is then set for the root (step S34). The connected components sharing the boundary with the current component are regarded as children of the current component to which labels are assigned according to the orbit serving as the boundary and the children are arranged according to a given order relation between labels (step S35). The children of the current component are set as current components and step S35 is repeatedly executed until there is no child (step S36).

In the flow pattern regular expression creating method according to the embodiment, a design parameter selecting step of selecting a possible design parameter for an object in a fluid may be executed. The design parameter selecting step may include, for example, to select a possible design parameter for an object in a fluid, setting an upper limit and a lower limit of the design parameter, selecting multiple parameters from a parameter region defined by the upper limit and the lower limit, performing experiments and/or numerical calculations on a flow with respect to each of the selected multiple parameters, assigning word representations and/or regular expressions to the results of experiments and/or numerical calculations, and selecting, as the possible design parameter, a design parameter having the word representation and/or the regular expression representing an optimum state among the assigned word representations and/or regular expressions.

The design parameter selecting step may further include a step of performing optimization designing by using the selected design parameter.

In the flow pattern regular expression creating method, a second design parameter selecting step of selecting a design parameter for the object in the fluid may be executed. For example, the second design parameter selecting step may include, to select an optimum design parameter for an object in a fluid, changing a design parameter for transition from the regular expression of a current flow pattern to the regular expression of an objective flow pattern and selecting a design parameter leading to the regular expression of the objective flow pattern.

The second design parameter selecting step may include, by using word representations in addition to regular expressions, changing the design parameter for transition from the regular expression and the word representation of the current flow pattern into the regular expression and the word representation of the objective flow pattern and selecting a design parameter leading to the regular expression and the word representation of the objective flow pattern.

The second design parameter selecting step may include acquiring one or more routes for transition from the regular expression and the word representation of the current flow pattern to the regular expression and the word representation of the objective flow pattern; changing the design parameter and selecting, from the acquired one or more routes, a route enabling transition from the current flow pattern; and changing, for the selected route, the design parameter around the changed design parameter and selecting a design parameter leading to the regular expression and the word representation of the objective flow pattern.

The flow pattern regular expression creating method according to the embodiment and its principle will be described in detail below.

1. Word Representation Theory

First of all, as the flow pattern regular expression creating method according to the embodiment uses part of the above-described word representation theory, the word representation theory will be described briefly.

1-1. Word Representation Algorithm

Figure 3:
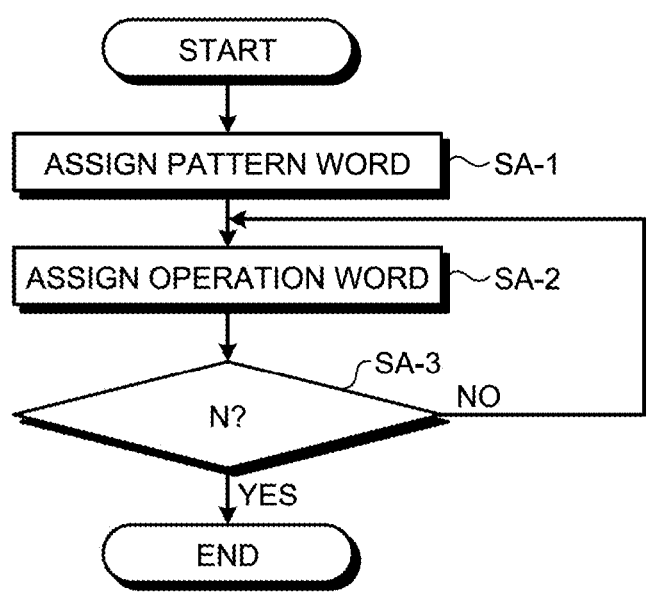
FIG. 3 is a flowchart represented in a summary of the embodiment.

An overview of the word representation algorithm for forming the above-described word representations will be described below. FIG. 3 is a flowchart showing the overview of the word representation algorithm.

First of all, as shown in FIG. 3, in order to form a word representation of a flow pattern in a connected exterior domain with N holes topologically, any one of pattern words (such as I, II, and O) defining three types of flow patterns in total including, in addition to two types of flow patterns adoptable topologically in a simply connected exterior domain having one hole, a pattern without any 1-source-sink point in a doubly connected exterior domain with two holes, is assigned (step SA-1).

According to the embodiment, any one of operation words (such as $A_0$, $A_2$, $B_0$, $B_2$, and C) defining five types of operations adoptable topologically to add one hole to the flow pattern is assigned to the word assigned at step SA-1 (step SA-2) and the processing at step SA-2 is repeatedly performed until the number of holes reaches N (step SA-3), whereby a word representation corresponding to the connected exterior domain with N holes is formed. In this example, the pattern word is assigned (step SA-1) first and then the operation word is assigned (step SA-2). Alternatively, an operation word may be assigned first and then a pattern word may be assigned.

According to the embodiment, the "connected exterior domain" is an expression including simply connected exterior domain and multiply connected exterior domain, and the "simply connected exterior domain" refers to a domain in a two dimensional space (plane) with one hole and the "multiply connected exterior domain" refers to a domain in a two dimensional space (plane) with multiple holes. The expression "hole" is a mathematical abstract expression and various modes of expression may be applied. For example, when a uniform flow occurring when a vehicle moves is focused on and if there are one or more structures in a cross-section of the vehicle along the uniform flow, the domain may be dealt with as a simply connected exterior domain or a multiply connected exterior domain. As for, for example, a flying object, such as an airplane that travels in the air, a ground traveling vehicle, such as a train or a car that travels through the air, or a vehicle, such as a ship that travels on or in the sea, the domain can be dealt with as connected exterior domain of simply connect or multiply connect with one or more holes. In other words, according to the embodiment, a flow, such as a "flow with one or more obstacles in a flow" can be dealt with as a flow in a connected exterior domain. Furthermore, an independent vortex structure or a flow structure with a bounding closed orbit (an elliptic stagnation point) can also be referred to as a "hole".

As described above, assigning word representations to flow patterns allows topological classification of flows in a multiply connected exterior domain. "Topological" is mathematical jargon indicating one geometric field also referred to as topology. In traditional geometry, a triangle and a square are regarded as different figures because of their difference in the number of corners; however, from the topological viewpoint, such detailed information is not focused on and a triangle and a square are regarded as diagrams equivalent to each other from, for example, a viewpoint that, for example, an elastic band is deformable between a triangle and a square. In other words, all polygons are regarded to be equivalent to circles. On the other hand, if there is a circular domain obtained by, for example, taking a circle out of another circle, the circle and the circular domain cannot be deformed by deforming one elastic band and therefore they are regarded as different diagrams. While, if the number of holes is different between multiply connected exterior domains, they are regarded as different diagrams topologically, they are regarded to be equivalent to each other if only the holes in the domains have the same shape regardless of whether the shapes of the holes are circular, rectangular or segment. For this reason, what characterizes the domain of flow is only the number of holes and, accordingly, a connected exterior domain is expressed by $D_\zeta(M)$ for the number of holes M+1 according to the embodiment. For example, there is a simply connected exterior domain $D_\zeta(0)$ when there is only one hole, and there is a doubly connected exterior domain $D_\zeta(1)$ when there are two holes.

To deal with topological classification of flows, a certain specific structure that characterizes a flow (referred to as a "topology") is captured and, if there are two flows having the specific structure and if both of them cannot deform mutually according to continuous deformation of the specific structure (i.e., without cutting and pasting), they are regarded as different flows.

The components of flows that are dealt with in the embodiment will be described here with reference to FIGS. 4 to 6. Incompressible flows may be used as "flows" according to the embodiment. The incompressibility of fluid refers to the property that the volume does not change even if a force is applied. It is generally permissible to consider the flows of normal water or the atmosphere, when considered in the scale of daily life, in the frame of such flows. The present invention is not limited to this, and compressible flows may be dealt with in calculations.

The fluid according to the embodiment may be dealt with as an inviscid fluid. For an inviscid fluid, a boundary condition can be dealt with as a "slip condition". The boundary condition for a viscous fluid is a "zero boundary condition"; however, even for a fluid, if its viscosity is not high, the vortex has a layered flow around the boundary, and virtually extending the outer boundary of the flow makes it possible to deal with the boundary condition as a "slip condition". Particularly, the word representation algorithm for inviscid fluid according to the embodiment will be described and properly extending the boundary makes it possible to apply the embodiment to viscous fluids.

The components of the flows dealt with in the embodiment are the following three components: obstacle, vortex, and uniform flow. Obstacles refer to holes in a connected exterior domain, and it can be derived from the general mathematical theory on fluids that, even if the shapes of the holes are regarded as circles upon topological classification, it does not have any effect on the result given mathematically. FIG. 4 is a diagram schematically showing flow patterns. FIG. 4(c) schematically shows a boundary with four ∂-saddle points (the definitions will be described below).

As shown in FIG. 4(a), a vortex is a component that creates a flow rotating around the vortex. A uniform flow refers to, in a river current, a basic flow that is a flow across the domain. In the case of a moving object, such as a vehicle, a uniform flow refers to a flow, such as a relative air flow or a water flow, viewed from an observer on the vehicle. In other words, in the coordinate system of a moving object, even if the air or water are still, a relative flow flowing from a point at infinity can be recognized.

The component of a uniform flow is referred to as a 1-source-sink point and the correctness of the rules can be mathematically proved.

There is a reason for referring to the component not as a uniform flow but as a 1-source-sink point. In order to explain the reason, some mathematical explanations will be given below. When there exists a uniform flow, the assumed domain is a connected exterior domain where one or more holes (obstacles) are buried in a plane that extends infinitely, which is difficult to deal with for schematic representation. For this reason, using a projection method referred to as stereographic projection in mathematics, the plane may be projected onto a sphere. In this case, the point at infinity on the plane can correspond to the North Pole on the sphere and the origin can correspond to the South Pole.

Accordingly, the uniform flow has a flow structure of a pair of a source and a sink of the flow at the North Pole on the sphere, and it can be mathematically represented that it corresponds to a flow field like that shown in FIG. 4(b). Furthermore, in order for a further schematic representation of the flow field, the positions of the North Pole and the South Pole can be shifted properly by utilizing the highly symmetrical shape of the sphere and therefore re-projection onto the plane by using stereographic projection after the point at infinity is positioned at the South Pole and the center of a circular hole (obstacle) is positioned at the North Pole leads to a flow like that shown in FIG. 4(b) near the origin corresponding to the South Pole. Furthermore, because the circular boundary with its center at the point at infinity is projected into an exterior circular boundary on the plane, the flow field over the plane can be resultantly represented in a bounded domain in a shape like that shown in FIG. 5. Regarding a connected exterior domain $D_\zeta(M)$, according to this conversion method, a connected domain containing M boundaries that is obtained by regarding the source-sink point at the point of infinity as the origin, choosing one of M+1 boundaries, and shifting the boundary to a unit circle exterior domain is written in $D_z(M)$. Accordingly, a representation like that shown in FIG. 4(b) via the proper projection method is equivalent to flows with a uniform flow over the plane. In the descriptions of the embodiment, because such a projection method is useful to schematically represent flows, flows will be sometimes represented in the drawings by using the projection method.

Figure 5:
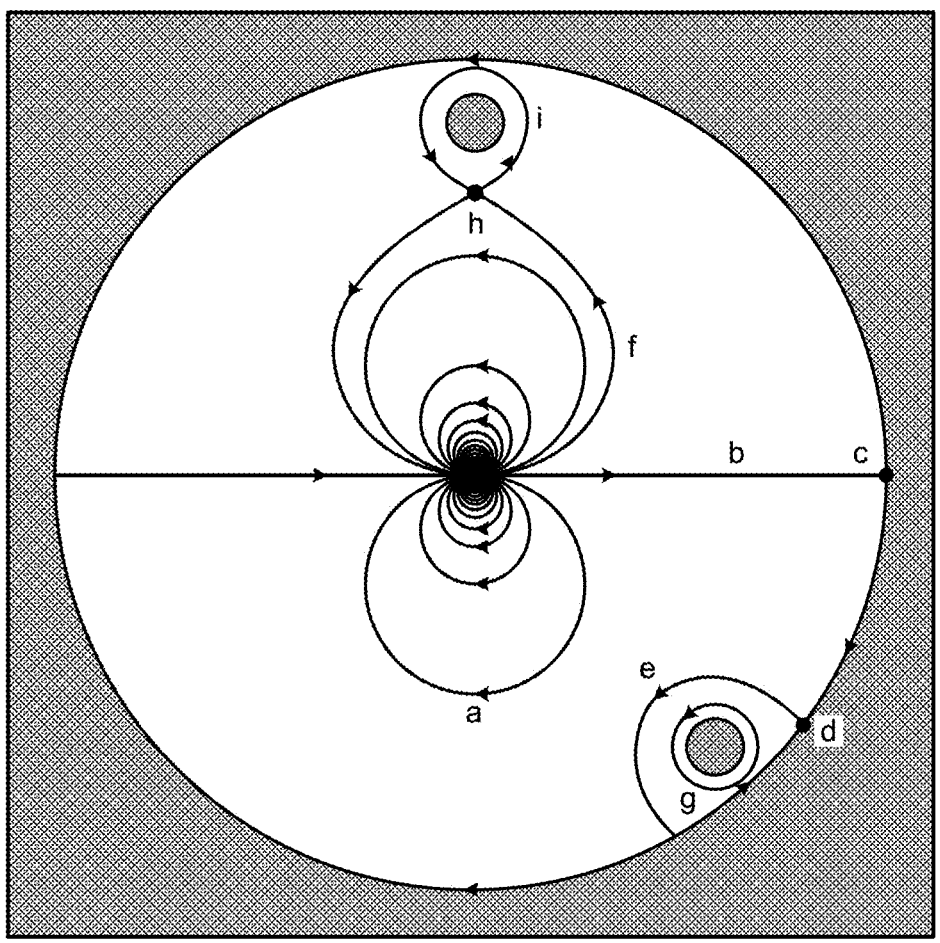
FIG. 5 is a diagram illustrating all characteristic orbits (streamlines) to perform topological classification of structurally stable flow patterns in a domain.
Figure 6:
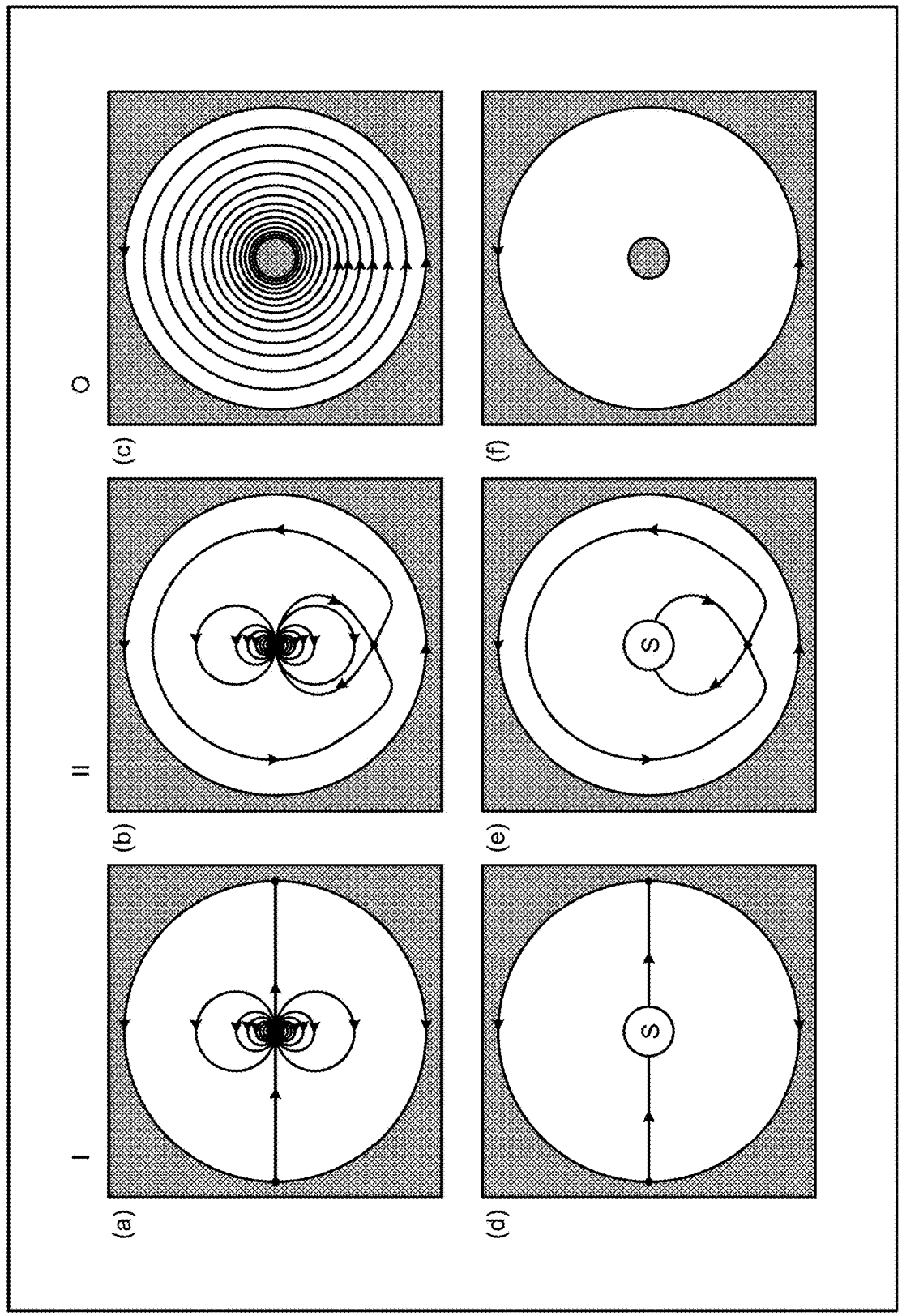
FIG. 6 is a diagram schematically showing three types of flow patterns serving as initial structures.

FIG. 5 is a diagram illustrating all characteristic orbits (streamlines) to perform topological classification of structurally stable flows in such a connected domain $D_z(M)$. First of all, orbits departing from and returning to a 1-source-sink point as shown in FIG. 5(a) are referred to as ss-orbits. The lines represent the respective streamlines of a uniform flow in the connected exterior domain. Secondly, an orbit departing from the 1-source-sink point and connecting onto a boundary as shown in FIG. 5(b) is referred to as an ss-∂-saddle connection, and a point on the boundary to which the orbit connects as shown in FIG. 5(c) is referred to as an ss-∂-saddle.

An orbit departing not from the 1-source-sink point but from a point at a boundary and connecting to a point at the same boundary as shown in FIG. 5(e) is referred to as a ∂-saddle connection, and a point on the boundary thus connected as shown in FIG. 5(d) is referred to as a ∂-saddle. A hyperbolic stationary point not on any boundary as shown in FIG. 5(h) is referred to as a saddle point, and an orbit departing from the 1-source-sink point and connecting to the saddle point as shown in FIG. 5(f) is referred to as an ss-saddle connection. A closed curved orbit going around a boundary and the circumference of a vortex as shown in FIG. 5(g) is referred to as a closed orbit, and an orbit departing from and returning to the saddle point as shown in FIG. 5(i) is referred to as a homoclinic saddle connection. It can be mathematically proved that targeted structurally stable flows can be only represented by combinations of these orbits.

According to the embodiment, at the above-described step SA-2, a hole and the structure involved are added to the flow of a connected exterior domain $D_z(M-1)$ with M holes to inductively construct a flow field of a multiply connected exterior domain $D_z(M)$ with an additional hole. For this reason, one serving as an initial structure of the inductive configuration in a simply connected exterior domain $D_z(0)$ or a doubly connected exterior domain $D_z(1)$ is assigned at step SA-1.

Specifically, the above-described basic flow patterns are of three types in total:

1) a pattern I with a 1-source-sink point and two ss-∂-saddle connections, 2) a pattern II with a 1-source-sink point, a saddle point, a homoclinic saddle connection connecting to the saddle point, and two ss-saddle connections, and 3) a pattern O without any 1-source-sink point. FIG. 6 is a diagram schematically showing the three types of structurally stable flow patterns that serve as initial structures.

In other words, as shown in FIGS. 6(a) and 6(b), there exist two types of flows, Pattern I and Pattern II, in a simply connected exterior domain $D_z(0)$ with a hole. Each of these patterns has a 1-source-sink point, and it can be mathematically proved that there are only these two types. For a flow with a 1-source-sink point for which a uniform flow is supposed, while a doubly connected exterior domain $D_z(1)$ is constructed essentially from them, a flow without any 1-source-sink point cannot be constructed from them, and an initial flow necessary to construct that flow corresponds to the pattern O that is schematically shown in FIG. 6(c). In order to simply represent the topologies, the 1-source-sink point is denoted by a circled S in the drawings and ss-orbits and closed orbits are not represented because there exists an infinite number of ss-orbits and closed orbits. As shown in FIGS. 6(d) and 6(e), they will be schematically represented simply below. As shown in FIG. 6(c), not all closed orbits of a flow pattern in a doubly connected exterior domain $D_z(1)$ are drawn and they will be simply illustrated as shown in FIG. 6(f).

1-2. Descriptions of Operation Word

An "operation" of adding a hole and the flow structure involved to inductively construct a flow will be described with reference to FIGS. 7 and 8. In other words, an operation of adding one hole to the flow in a connected exterior domain $D_z(M-1)$ with M holes to calculate a flow in a multiply connected exterior domain $D_z(M)$ will be described.

At the above-described step SA-2, five operations that can be adopted topologically are:

1) an $A_0$ operation of replacing an ss-orbit with a saddle point, a homoclinic saddle connection connecting to the saddle point and enclosing a hole, and two ss-saddle connections;

2) an $A_2$ operation of replacing an ss-orbit with two ss-∂-saddle connections and two ∂-saddles at a boundary newly added;

3) a $B_0$ operation of replacing a closed orbit with two homoclinic orbits forming a figure eight by adding a hole and a saddle point (this pattern will be referred to as a figure eight pattern below);

4) a $B_2$ operation of replacing a closed orbit with an orbit with a ∂-saddle connection connecting two ∂-saddles added at a boundary of a hole newly added; and 5) a C operation of newly adding two ∂-saddles at a boundary already having 2k (k>0) ∂-saddles and connecting the two ∂-saddles with a ∂-saddle connection to enclose a hole newly added.

Figure 7:
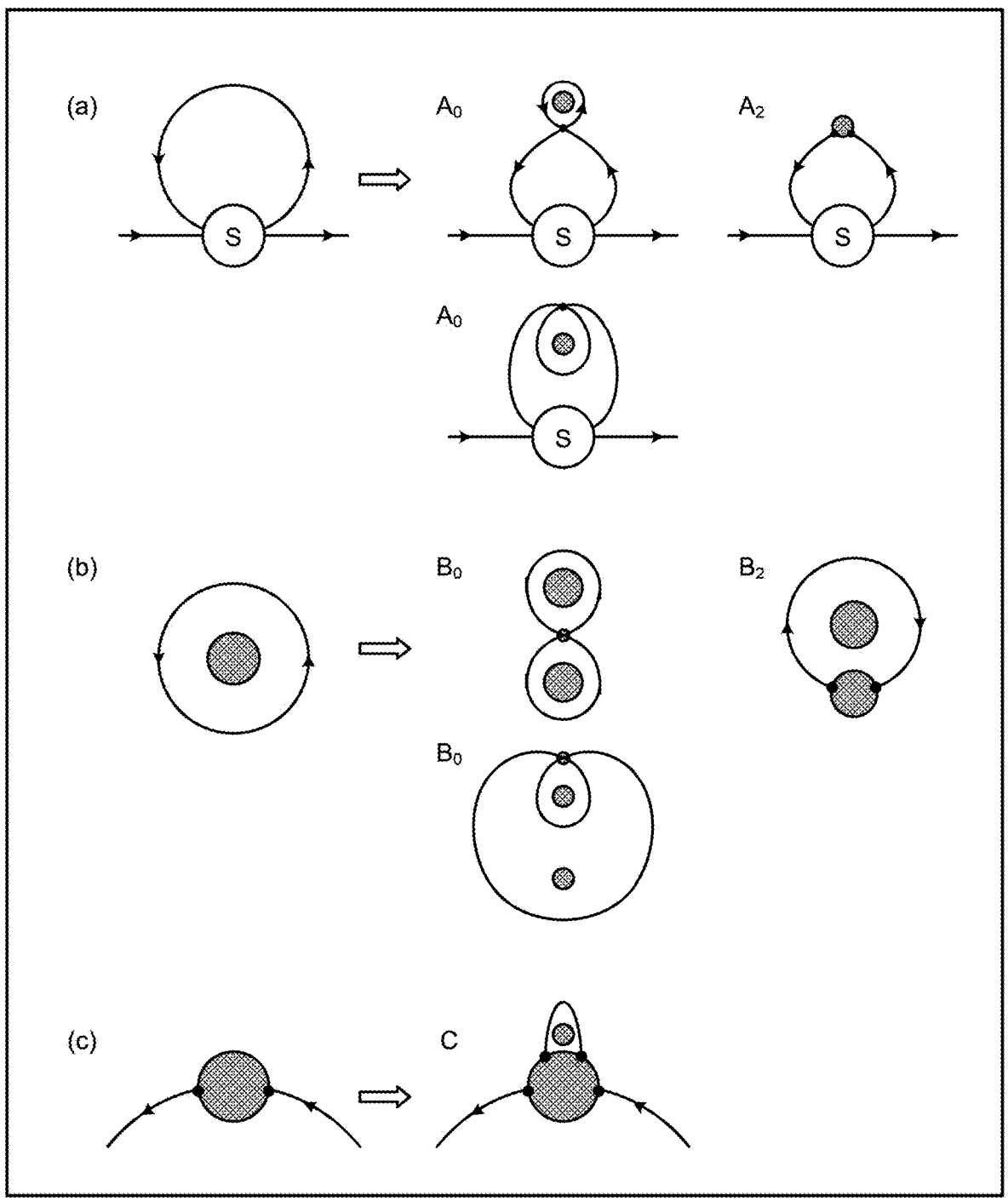
FIG. 7 is a diagram schematically showing five types of operations to construct a structurally stable flow by adding one hole.
Figure 8:
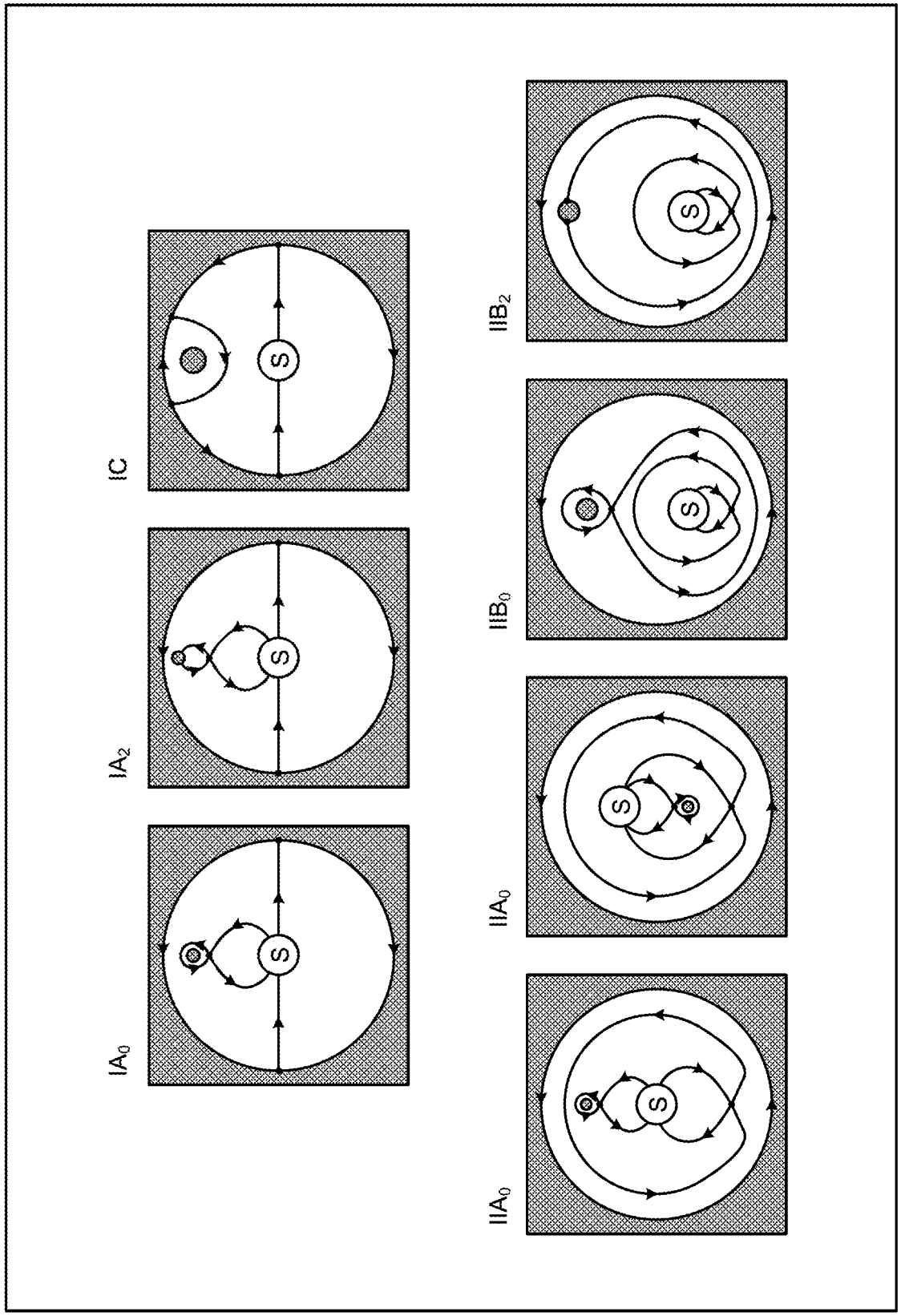
FIG. 8 is a diagram showing all classification of flow patterns with two structures and a uniform flow.

FIG. 7 is a diagram schematically showing five types of operations of constructing a structurally stable flow by adding a hole.

As shown in FIG. 7(a), the operations $A_0$ and $A_2$ are applied to an ss-orbit. Furthermore, as shown in FIG. 7(b), the operations $B_0$ and $B_2$ are applied to a closed orbit. Furthermore, as shown in FIG. 7(c), the operation C is applied to a boundary already having ∂-saddles. It can be mathematically proved that there are only five types of operations to make that possible while maintaining structural stability. As for flow pattern diagrams obtained by repeating the steps, a diagram from the pattern I or II is referred to as an ss-saddle connection diagram and a diagram from the pattern O is referred to as a saddle connection diagram.

The number of holes is increased one by one by performing these operations from the three types of flow patterns I, II and O of the initial structure assigned at step SA-1 (M to M+1) so that the flow in the domain with many holes is inductively constructed, and thus, according to the embodiment, the sequence of operation words representing the operations is regarded as a sequence of words and they are listed, whereby a word representation of the flow field can be obtained. FIG. 8 is a diagram showing all classification of structurally stable flow patterns with two structures and a uniform flow. As shown in FIG. 8, by assigning operation words to the initial structural Patterns I and II in simply connected exterior domains $D_z(0)$, all flow patterns in a doubly connected exterior domain $D_z(1)$ can be illustrated. Note that the total number of types of the flow patterns shown in FIG. 8 is not ten from two types (I and II)×five types ($A_0$, $A_2$, $B_0$, $B_2$ and C). In other words, the operation words are not obtained by arbitrarily arranging the five types of operation words and there are various limitations for mathematical reasons.

The limitations can be described as follows. Because the operations $A_0$ and $A_2$ are applied to an ss-orbit as described with FIG. 7, the existence of an ss-orbit is essential to the premise of applying the operations. Furthermore, because the operations $B_0$ and $B_2$ are applied to a closed orbit, the existence of a closed orbit is essential to the premise of applying the operations. Furthermore, as the operation C is applied to a boundary with two or more $\partial$-saddles, the existence of a boundary with $\partial$-saddles is essential to the premise of applying the operation. For this reason, the rule of arrangement differs depending on from which of I, II and O the pattern words start. Descriptions will be given below for the rules of arranging the word sequences starting from the respective pattern words I, II and O, which are derived according to the above-described constraints.

There are the following rules to start with the pattern word O without any 1-source-sink point. The necessary and sufficient conditions for the word representation starting with O are as follows:

O-1) only $B_0$, $B_2$ and C are operations that can be practically applied, and accordingly the word representations starting with O is the list of these three words; and O-2) $B_2$ has to exist before C in order for the word C to be included in the word representation of the operation sequence.

Such a word sequence is referred to as a word of O system (O-word) and the correctness of the rules can be mathematically proved.

For the word representation starting with the pattern word I, it is necessary to satisfy the following rules:

I-1) all $A_0$, $A_2$, $B_0$, $B_2$ and C are operations that can be applied and accordingly the word representation starting with I is the list of these five types of operation words; and I-2) C or $A_2$ has to exist before $B_0$ or $B_2$ in order for the word of $B_0$ or $B_2$ to be included in the word representation of the operation sequence.

Such a word sequence is referred to as a word of I system (I-word) and the correctness of the rules can be mathematically proved.

Lastly, for the word representation starting with the pattern word II, it is necessary to satisfy the following rules:

II-1) $A_0$, $B_0$, $B_2$ and C are operations that can be applied and accordingly the word representation starting with II is the list of these four words; and II-2) $B_2$ has to exist before C in order for the word C to be included in the word representation of the operation sequence.

Such a word sequence is referred to as a word of II system (II-word) and the correctness of the rules can be mathematically proved.

2. Graph Representation Creating Step

The above-described graph representation creating step in FIG. 2 (step S1) will be described in detail. First of all, the graph theory used in the embodiment will be described.

2-1. Graph Theory

A graph $T=(V,E)$ is a pair of a set of points called "vertices" (vertex set) V and a set E called "edges" connecting vertices. In general, graphs can have various structures; however, in the graph representation theory according to the embodiment, the following set of graphs having a specific structure of a set over the graph will be considered.

1) A tree refers to a graph where any two vertices are connected by only the shortest path depending on the connection of the edge.

2) A rooted graph refers to a graph where a specific vertex (called the "root" below) exists. For the rooted tree, the shortest path depending on the connection of the edge from the root to each vertex $v \in V$ can be considered, which is referred to as the height of v whose symbol is written in $ht(v)$. Accordingly, for the rooted tree T, the height of the tree T can be given by $ht(T):=\max_{v \in V} ht(v)$.

3) A directed graph refers to a graph where every edge has a parent-child order. An edge in a directed graph from a vertex $v \in V$ to $w \in V$ is denoted by $v \Rightarrow w \in E$, where v refers to a parent of w and w refers to a child of v. Let $\Gamma(v)$ denote the set of children of the vertex $v \in V$, i.e., $\Gamma(v):= \{w \in V | v \Rightarrow w \in E\}$. The number of child vertices contained in the set, i.e., $\#\Gamma(v)$, is referred to as the out-degree of v and, on the contrary, the number of edges entering v is referred to as the in-degree of v.

4) A labeled graph refers to a graph in which a certain label is assigned to every vertex.

For the embodiment, a rooted, labeled, and directed tree will be considered. For the root of the tree, the in-degree zero vertex, that is, the vertex without any edge entering there, will be considered. Any one of $\{o_\varnothing, o_0, o_2, +_\varnothing, +_0, +_2, -_\varnothing, -_0, -_2\}$ is assigned as a label of a vertex. Here, the subset of the set of vertices whose label is $o_\varnothing$ (resp. $o_0$, $o_2$, $+_\varnothing$, $+_0$, $+_2$, $-_\varnothing$, $-_0$ or $-_2$) is denoted by $Vo_\varnothing$ (resp. $Vo_0$, $Vo_2$, $V+_\varnothing$, $V+_0$, $V+_2$, $V-_\varnothing$, $V-_0$ or $V-_2$). For a vertex v, $l(v)$ denotes the label assigned to the vertex. For later convenience, a set will be defined as follows: $Vo=Vo_\varnothing \cup Vo_0 \cup Vo_2$, $V+=V+_\varnothing \cup V+_0 \cup V+_2$, $V-=V-_\varnothing \cup V-_0 \cup V-_2$, $V_0=Vo_0 \cup V+_0 \cup V-_0$, $V_2=Vo_2 \cup V+_2 \cup V-_2$, where the symbol $\cup$ denotes the disjoint union. Furthermore, the set of child vertices of the vertex v can be divided as follows.

$\Gamma o_0(v)=\Gamma(v) \cap vo_0$, $\Gamma o_2(v)=\Gamma(v) \cap vo_2$, $\Gamma+_0(v)=\Gamma(v) \cap v+_0$, $\Gamma-_0(v)=\Gamma(v) \cap v-_0$, $\Gamma+_2(v)=\Gamma(v) \cap v+_2$, $\Gamma-_2(v)=\Gamma(v) \cap v-_2$, $\Gamma-(v)=\Gamma(v) \cap v_-$, $\Gamma_+(v)=\Gamma(v) \cap v_+$ and $\Gamma_2(v)=\Gamma(v) \cap v_2$.

Furthermore, $sgn(v)$ denotes the "sign" for the vertex $v \in V$ and then $sgn(v)=+$ for $v \in V+ \cup V_0$ and $sgn(v)=-$ for $v \in V_-$. Because flow representations will be given by arranging the labels, Rule (1) of the following order relation is defined for the order in which the labels appear.

$$o_0 > o_2 > +_0 > -_0 > +_2 > -_2 \qquad (1)$$

Tree Representations of 2D Structurally Stable Hamiltonian Vector Fields

Tree representations of two-dimensional structurally stable Hamiltonian vector fields according to the graph representation creating step will be described. Graph representations of flow patterns represented by O-words and graph representations of flow patterns represented by I or II words will be described below.

Graph Representations of Flow Patterns with O-Words

Let H be a structurally stable Hamiltonian vector field on a two-dimensional domain $D_z(M)$ represented by an O-word and D be its saddle connection diagram. A method of assigning unique rooted, labeled, and directed trees $T_H=(V, E)$ to the Hamiltonian vector field H and a visualization algorithm for a plane graph will be described below.

First of all, removing all D from the whole domain $D_z(M)$ constructs the set of connected components of $C_H=D_z(M)\setminus D$ that is a set of some open annuli (consisting of periodic orbits). The connected components are the set of vertex V. The vertex of the root is the outermost connected component among the connected components and $+_\varnothing$ is assigned when the periodic orbits contained as the labels are counterclockwise and $-_\varnothing$ is assigned when the periodic orbits are clockwise.

Edges are created in the following manner. For two vertices v and w∈V, a directed edge v⇒w∈E is constructed between them if the common components of the closure of their corresponding connected component (the common boundary between components) is one-dimensional, i.e., $\dim(cl(v) \cap cl(w))=1$, and v is an outer component with respect to w. When the set of common component (boundary) $cl(v) \cap cl(w)$ contains a saddle and the child connected component w has counterclockwise (resp. clockwise) periodic orbits, $+_0$ (resp. $-_0$) is assigned as a label for w. Similarly, the set of common component (boundary) $cl(v) \cap cl(w)$ contains a ∂-saddle and the direction of periodic orbits in w is counterclockwise (resp. clockwise), $+_2$ (resp. $-_2$) is assigned as a label for w.

Note that, because there is no ss-orbit in $C_H$, the set of child vertices $\Gamma(v)$ of the connected component v is $\Gamma(v)=\Gamma+_0(v) \cup \Gamma-_0(v) \cup \Gamma+_2(v) \cup \Gamma-_2(v)$. Owing to $V_{0o}=V_{02}=\emptyset$, the subsets of the set of vertices V are $V_0=V+_0 \cup V-_0$ and $V_2=V+_2 \cup V-_2$. The number of elements contained in these subsets can be estimated according to the fact that all structurally stable flow patterns are constructed by the operations $B_0$, $B_2$ and C.

Figure 9:
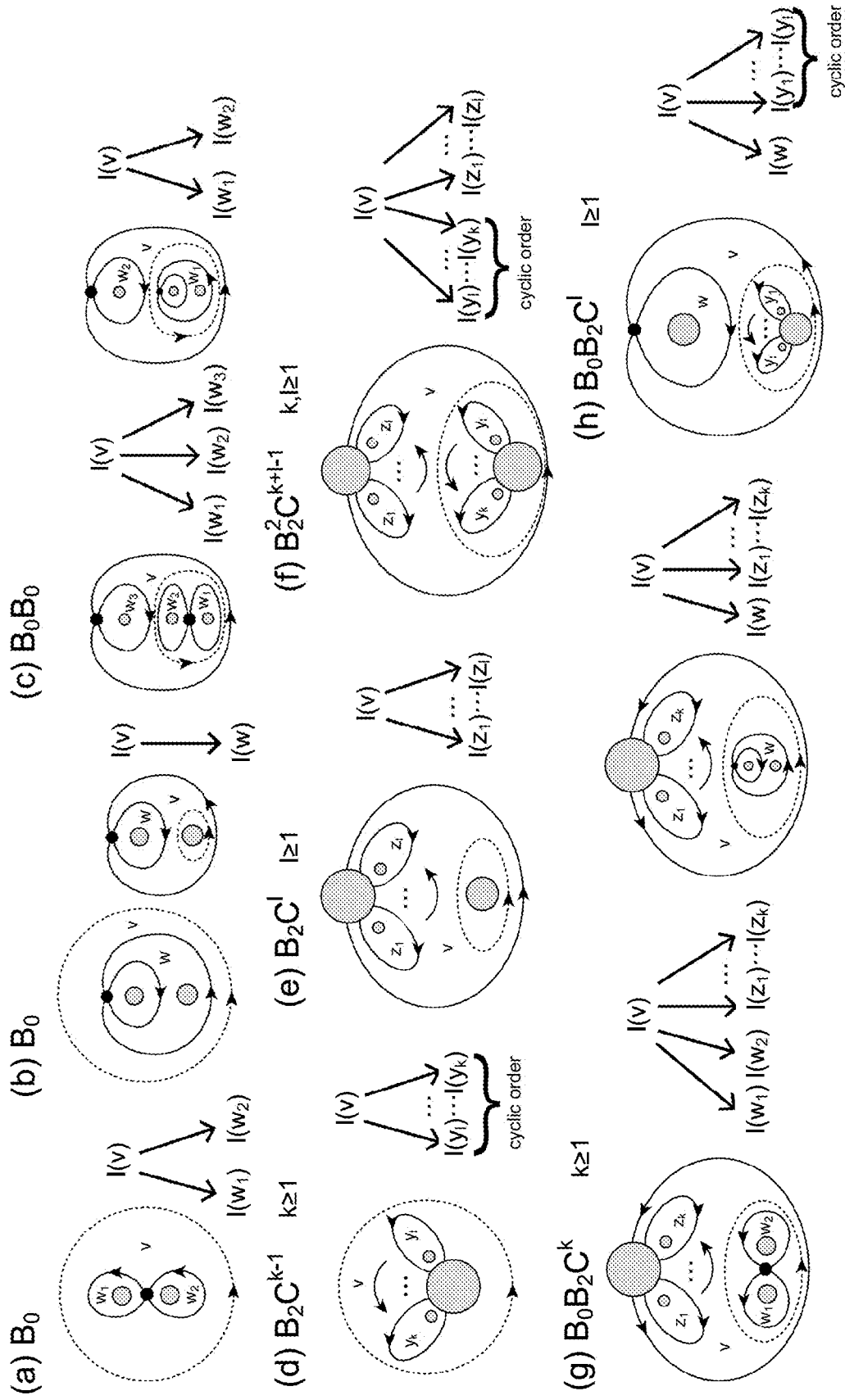
FIG. 9 is a diagram showing all flow patterns created by the operations $B_0$, $B_2$ and C and parent-children relations induced by the connected subsets (set of vertices) according to the flow patterns.

FIG. 9 shows all possible streamline patterns generated by the operations $B_0$, $B_2$ and C and parent-children relations induced by the connected subsets (set of vertices) according to the streamline patterns, where (a) represents $B_0$, (b) represents $B_0$, (c) represents $B_0B_0$, (d) represents $B_2C^{k-1}$ and k≥1, (e) represents $B_2C^l$ and l≥1, (f) represents $B_2{}^2C^{k+l-1}$, k and l≥1, (g) represents $B_0B_2C^k$ and k≥1, and (h) represents $B_0B_2C^l$ and l≥1. According to FIG. 9, v denotes a parent connected subset and its child connected subsets are denoted by w, y or z. The dashed line represents the set of parent connected components and thus only a single periodic orbit contained therein is drawn with a direction.

As shown in FIG. 9(a), an outward figure-eight pattern created by the operation $B_0$ is constructed. There exist two connected components $w_1 \in V_0$ and $w_2 \in V_0$ sharing the homoclinic saddle connections serving as the boundary with v and their signs are the same, i.e., $sgn(v)=sgn(w_1)=sgn(w_2)$. On the other hand, when the pattern created by $B_0$ is an inward figure-eight pattern as shown in FIG. 9(b), two edges of the two types v and w∈$V_0$ (one is given by $sgn(v)=sgn(w)$ and the other is given by $sgn(v) \neq sgn(w)$) can be constructed depending on which connected component is chosen as a parent component v.

As shown in FIG. 9(c), two types of parent-child edge relations are formed depending on the operation $B_0B_0$. According to the pattern on the left, edges from the parent connected component v to three child connected components $w_1$, $w_2$ and $w_3 \in V_0$ can be constructed, where sgn(v)=sgn($w_1$)=sgn($w_2$) and sgn(v)≠sgn($w_3$).

According to the pattern on the right, edges from the parent connected component v to two child connected components $w_1$ and $w_2 \in V_0$ can be constructed, where sgn(v)=sgn($w_1$)≠sgn($w_2$). In the same manner, as shown in FIGS. 9(d) to 9(f), the operations $B_2C^{k-1}$, $B_2C^l$ and $B_2{}^2C^{k+l-1}$ (k≥1 and l≥1) sequentially construct edges of parent-children relations between k connected components containing periodic orbits in the same direction as that of v and l connected components containing periodic orbits in the opposite direction.

FIG. 9(g) is a streamline pattern constructed by the operation $B_0B_2C^k$, which constructs edges from v to $w_1$ and $w_2 \in V_0$, or an edge from v to w∈$V_0$, of the domain with the same sign and k edges to child connected components $z_j \in V_0$ with the opposite signs (j=1, . . . , k).

Lastly, for the streamline pattern of FIG. 9(h) created by the operation $B_0B_2C^l$ (l≥1), one edge to w∈$V_0$ with sgn(v)≠sgn(w) and l edges to $y_j \in V_0$ with the same sign (j=1, . . . , 1) are constructed.

No other patterns exist that generate additional parent-children relations according to the operations $B_0$, $B_2$ and C. Hence, the number of elements contained in the set of child connected components is #$\Gamma+_0(v)$ and #$\Gamma-_0(v) \leq 2$, while any non-negative integers can be selected for the set of child vertices.

Next, how to draw the graph representation obtained from the assigned saddle connection diagram as a plane graph will be explained. First of all, for all connected components v∈V, the elements contained in the set of their child connected subsets $\Gamma(v)$ are arranged according to Rule (1) of the order relation on labels. Note that, when the same multiple labels $+_0$ (resp. $-_0$) are contained, the elements are arranged in cyclic order (which can be uniquely implemented owing to #$\Gamma+_0(v)$ and #$\Gamma-_0(v) \leq 2$). On the other hand, for the child connected subsets $\Gamma+_2(v)$ and $\Gamma-_2(v)$, how to arrange the elements accord to the following rule.

For the connected components symbolized as $y_j$ in FIG. 9, the order is introduced in cyclic order. In other words, a specific connected component is chosen from them as $y_1$ and other connected components are arranged counterclockwise. The connected components symbolized as $z_j$ in FIG. 9 can be simply arranged counterclockwise.

For the following "2-2-1-1. Process of Converting ss-saddle Connection Diagram of O system into Tree" and "2-2-2-1. Process of Converting ss-saddle connection Diagram of I, II system into Tree", definitions will be given as follows: N denotes a set of non-negative integers and $N^\infty$ denotes a set of finite sequences of non-negative integers (i.e., $N^\infty = N \cup N^2 \cup N^3 \ldots$). On $N^\infty$, a partial order < is defined as follows: s<t, if "n<m" or "n=m and there exists a natural number k>0 such that $s_1=t_1, \ldots, s_{k-1}=t_{k-1}$, and $s_k<t_k$" is satisfied for the elements of $N^\infty$, $s=s_1 \ldots s_n$ and $t=t_1 \ldots t_m$. An injective function $S:V \to N^\infty$ from a set of vertices V to $N^\infty$ will be given below. For a vertex v, S(v) is referred to as a vertex id. Because of injection, a vertex and its vertex id are regarded as the same. Furthermore, 0 is set for a vertex id of a root (in order to regard the vertex and id the same). The structure given below represents that a vertex id corresponds to the searching order prioritizing the tree height. Hereinafter, σ∈{+,−} will be represented; μ=−σ; G denotes a tree; s, s', t and u denote vertices id; and T denotes subsets of the vertices id. FIG. 9 will be referred to below, while the direction of flows will be ignored.

2-2-1-1. Process of Converting Saddle Connection Diagram of O System to Tree

FIGS. 10-A to 10-E are flowcharts for explaining the process of converting a saddle connection diagram of O system to a tree. An apparatus, such as a computer, is able to execute the process of converting a saddle connection diagram of O system to a tree, which is shown in FIGS. 10-A to 10-E.

According to FIGS. 10-A to 10-E, a saddle connection diagram D is set for the input and the saddle connection diagram D is converted to have a root at the outermost (step S101) and s=0 and T={0} are put (step S102). It is determined whether the outer boundary of the root 0 is counterclockwise (step S103). When the outer boundary of the root 0 is counterclockwise (YES at step S103), σ=+ and the tree G=(0,+⊗) are put (step S104). When the outer boundary of the root 0 is not counterclockwise, i.e., clockwise (NO at step S103), σ=− and tree G=(0,−⊗) are put (step S105) and the process moves to step S106.

At step S106, it is determined whether the root 0 has the shape (pattern) in FIG. 9(a). When the root 0 has the shape (pattern) of FIG. 9(a) (YES at step S106), 00 and 01 are set for the vertices id of $w_1$ and $w_2$, a tree obtained by replacing the label of the tree in FIG. 9(a) with pairs of id and label is set for the tree G (i.e., for G, $(00,\sigma_0) \leftarrow (0,\sigma_\varnothing) \rightarrow (01,\sigma_0)$ is put), and {00,01} is added to a set T (step S107). In other words, replacement with T={0,00,01} is performed. This replacing operation is symbolized as T←T∪{00,01}. Then, the process moves to step S114.

On the other hand, at step S106, when the root 0 does not have the shape in FIG. 9(a) (NO at step S106), the process moves to step S108.

At step S108, it is determined whether the root 0 has the shape on the left in FIG. 9(b). When the root 0 has the shape on the left in FIG. 9(b) (YES at step S108), 00 is set for the vertex id of w, a tree obtained by replacing the label of the tree in FIG. 9(b) with a pair of id and label is set for the tree G (i.e., for G, $((0,\sigma_\varnothing) \rightarrow (00,\sigma_0))$) is put), and {00} is added to the set T (step S109), i.e., T←T∪{00} is put. Then, the process moves to step S114.

On the other hand, at step S108, when the root 0 does not have the shape on the left in FIG. 9(b) (NO at step S108), the process moves to step s110.

At step S110, it is determined whether the root 0 has the shape in FIG. 9(d). When the root 0 has the shape in FIG. 9(d) (YES at step S110), 00, . . . , and 0k−1 are set for the vertices of $y_1$, . . . , and $y_k$, a tree obtained by replacing the label of the tree in FIG. 9(d) with pairs of id and label is set for the tree G, and {00, . . . , 0k−1} is added to the set T (step S111), i.e., T←T∪{00, . . . , 0k−1} is put. Then, the process moves to step S114.

On the other hand, at step S110, when the root 0 does not have the shape in FIG. 9(d) (NO at step S110), $\sigma_\varnothing$ is set for the tree G (step S112), the tree G is output (step S113) and the process ends.

At step S114, it is determined whether there exists an element t larger than s among T. When s is the largest element among T (NO at step S114), all vertices id of the tree G are removed and the resultant tree is set for G (step S115). The tree G is then output (step S113) and the process ends.

At step S114, when s is not the largest element among T (YES at step S114), s'=min{t∈T|s<t} (s' is the next largest element following s in T) is put, s is replaced with s' to put (s,σ*)←(s',σ*') (step S116). Then, the process moves to step S117.

At step S117, it is determined whether the outer boundary of the vertex s consists of a homoclinic saddle connection and a saddle and the inner boundary of the vertex s has the shape in FIG. 9(a). When the outer boundary of the vertex s consists of a homoclinic saddle connection and a saddle and the inner boundary of the vertex s has the shape in FIG. 9(a) (YES at step S117), s0 and s1 are set for the vertices id of $w_1$ and $w_2$, a tree obtained by replacing the label of the tree in FIG. 9(a) with pairs of id and label are set for the tree G, and {s0,s1} is added to T (step S118). Then the process returns to step S114.

On the other hand, at step S117, when the outer boundary of the vertex s does not consist of a homoclinic saddle connection and a saddle or the inner boundary of the vertex s does not have the shape in FIG. 9(a) (NO at step S117), the process moves to step S119.

At step S119, it is determined whether the outer boundary of the vertex s consists of a homoclinic saddle connection and a saddle and the inner boundary of the vertex s has the shape on the left in FIG. 9(b). When the outer boundary of the vertex s consists of a homoclinic saddle connection and a saddle and the inner boundary of the vertex s has the shape on the left in FIG. 9(b) (YES at step S119), s0 is set for the vertex id of w, a tree obtained by replacing the label of the tree on the left in FIG. 9(b) with a pair of id and label is set for the tree G, and {s0} is added to T (step S120). Then, the process returns to step S114.

On the other hand, when the outer boundary of the vertex s does not consist of a homoclinic saddle connection and a saddle or the inner boundary of the vertex s does not have the shape on the left in FIG. 9(b) (NO at step S119), the process moves to step S121.

At step S121, it is determined whether the outer boundary of the vertex s consists of a homoclinic saddle connection and a saddle and the inner boundary of the vertex s has the shape in FIG. 9(d). When the outer boundary of the vertex s consists of a homoclinic saddle connection and a saddle and the inner boundary of the vertex s has the shape in FIG. 9(d) (YES at step S121), {s0, . . . , sk−1} is set for the vertices id of $y_1$, . . . , and $y_k$, a tree obtained by replacing the label of the tree in FIG. 9(d) with pairs of id and label is set for the tree G, and {s0, . . . ,sk−1} is added to T (step S122). Then the process returns to step S114.

On the other hand, at step S121, when the outer boundary of the vertex s does not consist of a homoclinic saddle connection and a saddle or the inner boundary of the vertex s does not have the shape in FIG. 9(d) (NO at step S121), the process moves to step S123.

At step S123, it is determined whether the vertex s has the shape on the left in FIG. 9(c). When the vertex s has the shape on the left in FIG. 9(c) (YES at step S123), the process moves to step S124.

At step S124, it is determined whether σ of the label $\sigma_0$ of the vertex s is + (i.e., the flow in s is counterclockwise). When σ of the label $\sigma_0$ of the vertex s is + (i.e., the flow in s is counterclockwise), s0, s1 and s2 are set for the vertices id of $w_1$, and $w_3$, a tree obtained by replacing the label of the tree on the left in FIG. 9(c) with pairs of id and label is set for the tree G, and {s0,s1,s2} is added to T (step S125). Then the process returns to step S114.

At step S124, when σ of the label $\sigma_0$ of the vertex s is not +, that is, when the label $\sigma_0$ of the vertex s is − (i.e., the flow in s is clockwise) (NO at step S124), s1, s2 and s0 are set for the vertices id of $w_1$, $w_2$ and $w_3$, a tree obtained by replacing the label of the tree on the left in FIG. 9(c) with pairs of id and label is set for the tree G, and {s0,s1,s2} is added to T (step S126). Then the process returns to step S114.

On the other hand, when the vertex s does not have the shape on the left in FIG. 9(c) (NO at step S123), the process moves to step S127.

At step S127, it is determined whether the vertex s has the shape on the right in FIG. 9(c). When the vertex s has the shape on the right in FIG. 9(c) (YES at step S127), the process moves to step S128.

At step S128, it is determined whether σ of the label $\sigma_0$ of the vertex s is + (i.e., the flow in s is counterclockwise). When σ of the label $\sigma_0$ of the vertex s is + (i.e., the flow in s is counterclockwise) (YES at step S128), s0 and s1 are set for the vertices id of $w_1$ and $w_2$, a tree obtained by replacing the label of the tree on the right in FIG. 9(c) with pairs of id and label is set for the tree G, and {s0,s1} is added to T (step S129). Then the process returns to step S114.

On the other hand, at step S128, when σ of the label $\sigma_0$ of the vertex s is not +, i.e., when σ of the label $\sigma_0$ of the vertex s is − (i.e., the flow in s is clockwise) (NO at step S128), s1 and s0 are set for the vertices id of $w_1$ and $w_2$, a tree obtained by replacing the label of the tree on the right in FIG. 9(c) with pairs of id and label is set for the tree G, and {s0,s1} is added to T (step S130). Then the process returns to step S114.

On the other hand, when, at step S127, the vertex s does not have the shape on the right in FIG. 9(c) (NO at step S127), the process moves to step S131.

At step S131, it is determined whether the vertex s has the shape in FIG. 9(h). When the vertex s has the shape in FIG. 9(h) (YES at step S131), s0, s1, . . . , and sl are set for the vertices id of w, $y_1$, . . . , and $y_l$, a tree obtained by replacing the label of the tree in FIG. 9(h) with pairs of id and label is set for the tree G, and {s0, . . . ,sl} is added to T (step S132). Then the process returns to step S114.

On the other hand, at step S131, when the vertex s does not have the shape in FIG. 9(h) (NO at step S131), the process moves to step S133.

At step S133, it is determined whether the vertex s has the shape on the left in FIG. 9(g). When the vertex s has the shape on the left in FIG. 9(g) (including the case where k=0) (YES at step S133), s0,s1, s2, . . . , and sk+1 are set for the vertices id of $w_1$, $w_2$, $z_l$, . . . , and $z_k$, a tree obtained by replacing the label of the tree on the left in FIG. 9(g) with pairs of id and label is set for the tree G, and {s0, . . . ,sk+1} is added to T (step S134). Then the process returns to step S114.

At step S133, when the vertex s does not have the shape on the left in FIG. 9(g) (NO at step S133), the process moves to step S135.

At step S135, it is determined whether the vertex s has the shape on the right in FIG. 9(g). When the vertex s has the shape on the right in FIG. 9(g) (including the case where k=0) (YES at step S135), s0,s1, . . . , and sk are set for the vertices id of w, $z_l$, . . . , and $z_k$, a tree obtained by replacing the label of the tree on the right in FIG. 9(g) with pairs of id and label is set for the tree G, and {s0, . . . , sk} are added to T (step S136). Then the process returns to step S114.

On the other hand, at step S135, when the vertex s does not have the shape on the right in FIG. 9(g), (NO at step S135), the process moves to step S138 (in this case, the vertex s has the shape in FIG. 9(f) as shown at step S137).

At step S138, it is determined whether σ of the label $σ_0$ of the vertex s is + (i.e., the flow in s is counterclockwise). When σ of the label $σ_0$ of the vertex s is + (i.e., the flow in s is counterclockwise) (YES at step S138), s0, . . . , sk−1,sk, . . . , and sl+k−1 are set for the vertices id of $y_1$, . . . , $y_k$, $z_1$, . . . , $z_l$, a tree obtained by replacing the label of the tree in FIG. 9(f) with pairs of id and label is set for the tree G, and {s0, . . . , sl+k−1} is added to T (step S139). Then the process returns to step S114.

At step S138, when σ of the label $σ_0$ of the vertex s is not +, i.e., when σ of the label $σ_0$ of the vertex s is − (i.e., the flow in s is clockwise) (NO at step S138), sl, . . . , sl+k−1,s0, . . . , and sl−1 are set for the vertices id of $y_1$, . . . , $y_k$, $z_1$, . . . , and $z_l$, a tree obtained by replacing the label of the tree in FIG. 9(f) with pairs of id and label is set for the tree G, and {s0, . . . , sl+k−1} is added to T (step S140). Then the process returns to step S114.

The operations described above are the process of converting a saddle connection diagram of O system into a tree.

2-2-2. Graph Representations of Flows Represented with I, II-Words

Let H be a Hamiltonian vector field with a 1-source-sink point in $D_z(M)$ and D be its corresponding ss-saddle connection diagram. $C_H=D_z(M)\backslash D$ consists of connected components each serving as an open annulus domain containing closed orbits or an open disk domain consisting of ss-orbits. On the other hand, a rooted, labeled, and directed tree is constructed as described below. Similar to the case of O-words, each connected component in $C_H$ is associated with a set of vertices. The connected component serving as the root corresponding to the open disk domain nearest to the 1-source sink point in $C_H$ whose closure contains the 1-source sink point and encloses clockwise ss-orbits is chosen as the connected component serving as the root. The label $o_⊘$ is assigned to the connected component. In such a determination manner, the root can be uniquely determined.

FIG. 11 is a diagram for explaining a method of choosing a connection component serving as the root from $C_H=D_z(M)\backslash D$, where D is an ss-saddle connection diagram that can be represented with a I word or a II word. A dashed line is written to represent an ss-orbit contained in the connected component serving as the root and the direction of the ss-orbit.

In FIG. 11, (a) is an ss-saddle connection diagram represented with a word representation $IA_0A_0$, where the flow of the ss-saddle connection has the right-to-left direction, (b) is an ss-saddle connection diagram represented with a word representation $IA_0A_0$, where the ss-saddle connection has the left-to-right direction, (c) is an ss-saddle connection diagram represented with a word representation $IIA_0A_0$, where the periodic orbits contained in the outermost connected component have the clockwise direction, and (d) has the same word representation $IIA_0A_0$ as that of (c), while the periodic orbits have the counterclockwise direction. Below the ss-saddle connection diagrams, images of the ss-saddle connection diagrams each formed by a conformal mapping that maps a point in the root connected component to infinity are shown. In the images obtained by conformal mapping, every ss-orbit contained in the root is counterclockwise.

For example, in the ss-saddle connection diagram with the word representation $IA_0A_0$ like that shown in FIG. 11(a), the connected component (the domain containing the dashed curved line) right above the 1-source sink point serves as the root. Even in the same shape of the same ss-saddle connection diagram, when the flow direction is reversed as shown in FIG. 11(b), according to that definition, the root is the connected component right below the 1-source-sink point. As for the ss-saddle connection diagram with the word representation $IIA_0A_0$ in FIG. 11(c), when the direction of the connected component right above the 1-source-sink point is reversed (FIG. 11(d), the connected component right below the 1-source-sink point serves as the root. Note that, when a point in the root connected component is selected and an ss-saddle connection diagram is formed by conformal mapping that maps the point to infinity, the root component is at the outermost in the image and the ss-orbits are always counterclockwise in the image (see the lower area in each diagram in FIG. 11).

Definitions are made as shown in FIG. 11 by using, for the set of vertices consisting of the connected component thus obtained, ones obtained by mapping a directed edge between vertices by conformal mapping where the connected component serving as the root is the outermost. When the dimension of the common component of the closure of two connected components v, w∈V is 1, i.e., dim(cl(v)∩cl(w))=1 and v is outside w, a directed edge from v to w is constructed. For a connected component w∈V with ss-orbits, if dim(cl(v)∩cl(w))=1 and the intersection cl(v)∩cl(w) contains ss-saddle connections (resp. ss-∂-saddle connections), the label $o_0$ (resp. $o_2$) is assigned to the child vertex w. For a connected component w∈V enclosing counterclockwise closed orbits, if cl(v)∩cl(w) contains saddle connections (resp. ∂-saddle connections), the label $+_0$ (resp. $+_2$) is assigned to the child connected component w. Similarly, the labels $-_0$ and $-_2$ are assigned to connected components vertices containing clockwise closed orbits.

Accordingly, a unique rooted, labeled, and directed tree $T_H=(V,E)$ can be associated with the ss-saddle connection diagram of the Hamiltonian vector field H. The following is the method of visualizing a graph representation $T_H=(V,E)$ of a structurally stable Hamiltonian vector field H a I-word or II-word representation into a plane graph.

Note that $\Gamma(v)=\Gamma_o(v)\cup\Gamma_+(v)\cup\Gamma_-(v)$. Suppose that the elements in $\Gamma(v)$ are arranged according to the Rule (1) of the order relation in advance and the elements with the same label in $\Gamma_{+2}(v)$ and $\Gamma_{-2}(v)$ are arranged counterclockwise in cyclic order as in the O-word visualization. Since it suffices if the flowchart (FIGS. 10-A to 10-E) is used to visualize the connected component v with closed orbits in $V_+$ or $V_-$ into a plane graph, it suffices if drawing a graph for the connected component in $V_o$ is considered.

Figure 12:
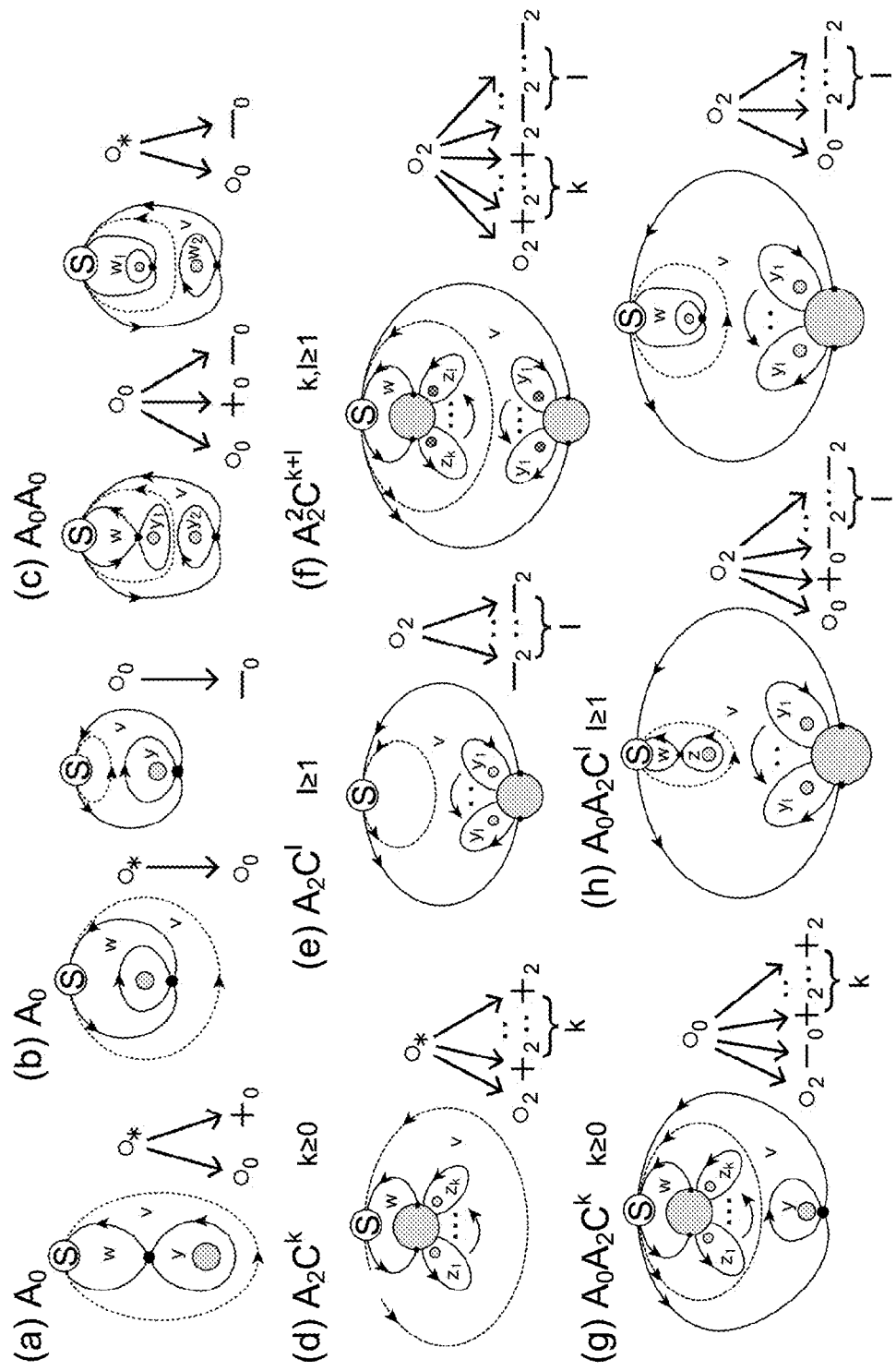
FIG. 12 is a diagram showing local structures of ss-saddle connection diagrams generated by the operations $A_0$, $A_2$ and C and visualization of graph representations obtained according to the local structures.

FIG. 12 shows local structures of ss-saddle connection diagrams generated by the operations $A_0$, $A_2$ and C and visualization of graph representations obtained according to the local structures. The parent connected component v is symbolized as $o_\emptyset$ ($o_0$ or $o_2$) in FIG. 12.

FIG. 12 shows local ss-saddle connection diagrams constructed by (a) $A_0$, (b) $A_0$, (c) $A_0A_0$, (d) $A_2C^k$ (k≥0), (e) $A_2C^l$ (l≥1), (f) $A_2^2C^{k+l}$ (k,l≥1), (g) $A_0A_2C^k$ (k≥0) and (h) $A_0A_2C^l$ (l≥1) and their corresponding parent-child relations to be generated, where the counterclockwise ss-orbits contained in the parent connected component are shown by dashed lines. The label of the parent connected component is expressed as $o^*$ (note that * is any one of Ø, 0 and 2). Because the root is determined such that the directions of the ss-orbits are always counterclockwise, the flow directions of the orbits contained in its child connected component is determined automatically.

More specifically, because the parent connected component v has two child connected components $w \in Vo_0$ and $y \in V+_0$ for the outward homoclinic saddle connection in FIG. 12(a), two arrows to $o_0$ and $+_0$ from $o^*$ are drawn. For the inward homoclinic saddle connection like that in FIG. 12(b), an arrow to $o_0$ or $-_0$ can be drawn depending on which connected component is chosen as the parent. Two types of patterns are created for the structure created by the operation $A_0A_0$ as shown in FIG. 12(c) and accordingly three arrows to $o_0$, $+_0$ and $-_0$ or two edges to $o_0$ and $-_0$ can be drawn.

Arrows to an $o_2$ and k $+_2$ are drawn according to the local structure of the local ss-saddle connection diagram created by the operation $A_2C^k$ (k≥0), like that shown in FIG. 12(d), with the connected components $\{z_1, \ldots, z_k\}$ containing k closed orbits. For the local streamline structure (FIG. 12(e)) created by the operation $A_2C^l$ (l≥1) with the child connected components $\{y_1, \ldots, y_l\}$ containing l clockwise closed orbits, it suffices if l arrows are drawn to $-_2$. FIG. 12(f) shows the local structure with a child connected component $w \in Vo_2$, l child connected components $\{y_1, \ldots y_l\}$, and k child connected components $\{z_1, \ldots, z_k\}$ and shows that k arrows to $+_2$ and l arrows to $-_2$ can be drawn according to the local structure. Lastly, for the structure in FIG. 12(g) assigned by the operation $A_0A_2C_k$ (resp. $A_0A_2C^l$ (l≥1) like that in FIG. 12(h)), arrows to $o_2$ and $-_0$ (resp. $o_0$ and $+_0$) are drawn and k arrows to $+_2$ (resp. l arrows to $-_2$) are drawn on the right.

2-2-2-1. Process of Converting ss-Saddle Connection Diagram of I, II System into Tree FIGS. 13-A to 13-D are flowcharts for explaining a process of converting an ss-saddle connection diagram of I, II system into a tree. The process of converting an ss-saddle connection diagram of I, II system into a tree shown in FIGS. 13-A to 13-D is executable by an apparatus, such as a computer.

According to FIGS. 13-A to 13-D, a ss-saddle connection diagram D is set for the input and the ss-saddle connection diagram D is converted to have a root at the outermost like that shown in FIG. 11 by performing given coordinate conversion (step S141) and u=0, T={0} and tree $G=(0,o_\emptyset)$ are put (step S142).

At step S143, it is determined whether the root 0 has the shape in FIG. 12(a). When the root 0 has the shape in FIG. 12(a) (YES at step S143), 1 and 00 are set for the vertices id of w and y, a tree obtained by replacing the label of the tree in FIG. 12(a) with pairs of id and label is set for the tree G (i.e., $(1,o_0) \leftarrow (0,o_\emptyset) \rightarrow (00,+_0)$ is set for G), and {1,00} is added to T (i.e., T={0} is replaced with T={0,1,00}), i.e., T←TU{00, . . . , 0k−1} (step S144). Then, the process moves to step S149.

On the other hand, when the root 0 does not have the shape in FIG. 12(a) (NO at step S143), the process moves to step S145.

At step S145, it is determined whether the root 0 has the shape on the left in FIG. 12(b). When the root 0 has the shape on the left in FIG. 12(b) (YES at step S145), 1 is set for the vertex id of w, a tree obtained by replacing the label of the tree in FIG. 12(b) with a pair of id and label is set for the tree G (i.e., G is $((0,o_\emptyset) \rightarrow (1,o_0))$, and {1} is added to T (step S146). Then, the process moves to step S149.

On the other hand, at step S145, when the root 0 does not have the shape in FIG. 12(b) (NO at step S145), the process moves to step S148 (in this case, as shown in step S147, the root 0 has the shape in FIG. 12(d)).

At step S148, 1, 00, . . . , and 0k−1 are set for the vertices id of w, $z_1, \ldots,$ and $z_k$, a tree obtained by replacing the label of the tree in FIG. 12(d) with pairs of id and label is set for the tree G, and {1,00, . . . , 0k−1} is added to T, and the process moves to step S149.

At step S149, it is determined whether there exists an element t larger than u among T. When u is the largest element among T (NO at step S149), all vertices id of the tree G are removed and the resultant tree is set for G (step S150). The tree G is then output (step S151) and the process ends.

On the other hand, at step S149, when it is determined that u is not the largest among T (YES at step S149), u'=min{t∈T|u<t} (i.e., u' is a large element next to u among T) is put, and $(u,\sigma^*)$ is replaced with $(u',\sigma'^*)$ (step S152). The process is then moves to step S153.

At step S153, it is determined whether u is a natural number (i.e., whether u corresponds to id of $o_\emptyset$, $o_0$ and $o_2$). When u is not a natural number (NO at step S153), the process moves to S114 in FIG. 10-B that is the O-word process.

On the other hand, at step S153, when u is a natural number (YES at step S153), the process moves to step S155.

At step S155, it is determined whether the outer boundary of the vertex u consists of an outward homoclinic ss-saddle connection and a circled S (1-source-sink point: see FIG. 6) and whether the inner boundary of u has the shape in FIG. 12(a). When the outer boundary of the vertex u consists of a homoclinic ss-saddle connection and a circled S and the inner boundary of u has the shape in FIG. 12(a) (YES at step S155), u+1 and u0 are set for the vertices of w and y, a tree obtained by replacing the label of the tree in FIG. 12(a) with pairs of id and label is set for the tree G (i.e., $(u+1,o_0) \leftarrow (u,o_0) \rightarrow (u0,+_0)$ is set for G), and T is replaced with TU{u+1,u0} (step S156). Then the process returns to step S149.

On the other hand, at step S155, when the outer boundary of the vertex u does not consist of an outward homoclinic ss-saddle connection and a circled S or the inner boundary of u does not have the shape in FIG. 12(a) (NO at step S155), the process moves to step S157.

At step S157, it is determined whether the outer boundary of the vertex u consists of an outward homoclinic ss-saddle connection and a circled S and the inner boundary of u has the shape on the left in FIG. 12(b). When the outer boundary of the vertex u consists of a homoclinic ss-saddle connection and a circled S and the inner boundary of u has the shape on the left in FIG. 12(b) (YES at step S157), u+1 is set for the vertex id of w, a tree obtained by replacing the label of the tree on the left in FIG. 12(b) with a pair of id and label is set for the tree G, and {u+1} is added to T (step S158). Then the process returns to step S149.

On the other hand, at step S157, when the outer boundary of the vertex u does not consist of an outward homoclinic ss-saddle connection and a circled S or the inner boundary of u does not have the shape on the left in FIG. 12(b) (NO at step S157), the process moves to step S159.

At step S159, it is determined whether the outer boundary of the vertex u consists of an outward homoclinic ss-saddle connection and a circled S and the inner boundary of u has the shape in FIG. 12(d). When the outer boundary of the vertex u consists of a homoclinic ss-saddle connection and a circled S and u has the shape in FIG. 12(d) (YES at step S159), u+1, u0, . . . , and uk−1 are set for the vertices id of w, $z_1$, . . . , and $z_k$, a tree obtained by replacing the label of the tree in FIG. 12(d) with a pair of id and label is set for the tree G, and {u+1,u0, . . . , uk−1} is added to T (step S160). Then the process returns to step S149.

On the other hand, at step S159, when the outer boundary of the vertex u does not consist of an outward homoclinic ss-saddle connection and a circled S or the inner boundary of u does not have the shape in FIG. 12(d) (NO at step S159), the process moves to step S161.

At step S161, it is determined whether the vertex u has the shape on the left in FIG. 12(c). When the vertex u has the shape on the left in FIG. 12(c) (YES at step S161), u+1, u0, and u1 are set for the vertices id of w, $y_1$ and $y_2$, a tree obtained by replacing the label of the tree on the left in FIG. 12(c) with pairs of id and label is set for the tree G, and {u+1,u0,u1} is added to T (step S162). Then the process returns to step S149.

On the other hand, at step S161, when the vertex u does not have the shape on the left in FIG. 12(c) (NO at step S161), the process moves to step S163.

At step S163, it is determined whether the vertex u has the shape on the right in FIG. 12(c). When the vertex u has the shape on the right in FIG. 12(c) (YES at step S163), u+1 and u0 are set for the vertices id of $w_1$ and $w_2$, a tree obtained by replacing the label of the tree on the right in FIG. 12(c) with pairs of id and label is set for the tree G, and {u+1,u0} is added to T (step S164). Then the process returns to step S149.

At step S163, when the vertex u does not have the shape on the right in FIG. 12(c) (NO at step S163), the process moves to step S165.

At step S165, it is determined whether the vertex u has the shape in FIG. 12(g). When the vertex u has the shape in FIG. 12(g) (YES at step S165), u+1, u0, u1, . . . , and uk are set for the vertices id of w, y, $z_1$, . . . , and $z_k$, a tree obtained by replacing the label of the tree in FIG. 12(g) with pairs of id and label is set for the tree G, and {u+1,u0, . . . , uk} is added to T (step S166). Then the process returns to step S149.

At step S165, when the vertex u does not have the shape in FIG. 12(g) (NO at step S165), the process moves to step S167.

At step S167, it is determined whether the vertex u has the shape on the left in FIG. 12(h). When the vertex u has the shape on the left in FIG. 12(h) (YES at step S167), u+1, u0, u1, . . . , and ul are set for the vertices id of w, y, $y_1$, . . . , and $y_l$, a tree obtained by replacing the label of the tree on the left in FIG. 12(h) with pairs of id and label is set for the tree G, and {u+1,u0,u1, . . . , ul} is added to T (step S168). Then the process returns to step S149.

At step S167, when the vertex u does not have the shape on the left in FIG. 12(h) (NO at step S167), the process moves to step S169.

At step S169, it is determined whether the vertex u has the shape on the right in FIG. 12(h). When the vertex u has the shape on the right in FIG. 12(h) (YES at step S169), u+1, u0, . . . , and ul−1 are set for the vertices id of w, $y_1$, . . . , and $y_l$, a tree obtained by replacing the label of the tree on the right in FIG. 12(h) with pairs of id and label is set for the tree G, and {u+1,u0, . . . , ul−1} is added to T (step S170). Then the process returns to step S149.

On the other hand, at step S169, when the vertex u does not have the shape on the right in FIG. 12(h) (NO at step S169), the process moves to step S171.

At step S171, it is determined whether the vertex u has the shape in FIG. 12(f). When the vertex u has the shape in FIG. 12(f) (YES at step S171), u+1, u0, . . . , uk−1, uk, . . . , and ul+k−1 are set for the vertices id of w, $z_1$, . . . , $z_k$, $y_1$, . . . , and $y_l$, a tree obtained by replacing the label of the tree in FIG. 12(f) with pairs of id and label is set for the tree G, and {u+1,u0, . . . , ul+k−1} is added to T (step S172). Then the process returns to step S149.

At step S171, when the vertex u does not have the shape in FIG. 12(f) (NO at step S171), the process moves to step S173.

At step S173, it is determined whether the vertex u has the shape on the right in FIG. 12(b). When the vertex u has the shape on the right in FIG. 12(b) (YES at step S173), u0 is set for the vertex id of y, a tree obtained by replacing the label of the tree on the right in FIG. 12(b) with a pair of id and label is set for the tree G, and {u0} is added to T (step S174). Then the process returns to step S149.

At step S173, when the vertex u does not have the shape on the right in FIG. 12(b) (NO at step S173), the process moves to step S175.

At step S175, it is determined whether the vertex u has the shape in FIG. 12(e). When the vertex u has the shape in FIG. 12(e) (YES at step S175), u0, . . . , and ul−1 are set for the vertices id of $y_1$, . . . , and $y_l$, a tree obtained by replacing the label of the tree in FIG. 12(e) with pairs of id and label is set for the tree G, and {u0, . . . , ul−1} is added to T (step S176). Then the process returns to step S149.

On the other hand, at step S175, when the vertex u does not have the shape in FIG. 12(e) (NO at step S175), the process moves to step S149 (in this case, as shown in step S177, the vertex u has the shape in FIG. 12(a)).

The operations described above are the process of converting an ss-saddle connection diagram of I, II system into a tree.

2-2-3. Graph Representations and their Regular Expressions

According to the descriptions given above, the root can be uniquely determined for the ss-saddle connection diagrams each with a 1-source-sink point and all local structures of the ss-saddle connection diagrams constructed by the operations $A_0$, $A_2$, $B_0$, $B_2$ and C and parent-child relations between connected components derived therefrom are all represented in FIGS. 9 and 12, which accordingly represents the following.

Proposition 3.1: A unique, rooted, labeled, and directed tree representation corresponds to each streamline topology of structurally stable Hamiltonian vector field with a 1-source-sink point.

Regarding structurally stable Hamiltonian vector fields without any 1-source-sink point, how to select a root is unambiguous because, for any connected component containing a circular boundary without containing any a-saddle, there exists a homeomorphism that always maps the connected component to the outermost one. This means that, for a saddle connection diagram, there exist different graph representations for the number of connected components. To exclude such ambiguity, it is defined that graph representations created owing to the homeomorphism are different from one another. In other words, an equivalence relation $V_1 \sim V_2$ between two structurally stable Hamiltonian vector fields $V_1$ and $V_2$ are defined, if there is a homeomorphism on $D_z(M)$ that maps each orbit of $V_1$ to an orbit of $V_2$ and the outer boundary of $V_1$ to that of $V_2$ preserving orientation of the orbits. Then ~ defines the equivalence relation and a unique directed, labeled and rooted tree can be assigned to the equivalent class.

Preposition 3.2: A unique, rooted, labeled, and directed tree representation corresponds to the streamline topologies of the equivalent class for ~ of structurally stable Hamiltonian vector fields.

3. Regular Expression Creating Step

The regular expression creating step (step S2) in FIG. 2 will be described in detail. As a well-known fact regarding the graph theory, a unique "regular expression" can be assumed for any rooted, labelled, and directed tree. Let $T_H=(V,E)$ denotes a graph representation assigned to a structurally stable Hamiltonian vector field H assigned according to the above-described method. A regular expression is inductively assigned to the graph representation in the following manner. Note that the in-degree of all vertices excluding the root is one. When $ht(T_H)=0$, the graph has only the root, i.e., $V=\{V_0\}$, and the regular expression is $l(v_0)$. When there is a regular expression N up to the height $ht(T_H)=n-1$, let $T_{n-1}=\{v_1, v_2, \ldots, v_m\}$ be the set of vertices of the height. With the set of child vertices $\Gamma(v_i)=\{v_{i1}, v_{i2}, \ldots, v_{imi}\}$ of each vertex $v_i$ and their corresponding labels $l_i=l(v_i)$ (i=1, ..., m), a new regular expression can be constructed by replacing $l_i$ with $l_i(l_{i1}, l_{i2}, \ldots, l_{imi})$ for N. Note that $l_{ik}=l(v_{ik})$ (k=1, ..., $m_i$). Let $N_{TH}$ be the regular expression of $T_H$ thus constructed. From the construction method, the following proposition is obtained.

Proposition 3.3. The mapping $N_T=f_N(T)$ from any rooted, labeled and directed tree T to the regular expression $N_T$ is bijective.

Indication of Propositions 3.1 and 3.2 is, in other words, that the mapping $T_H=f_T(H)$ from (ss-) saddle connection diagrams H to their corresponding graph representations $T_H$ is injective. Hence, it follows from Proposition 3.3 that the composite mapping $N_T=f_N(f_T(W))$ is also injective. In other words, assigning different regular expressions to structurally stable Hamiltonian vector fields with the same word representation and using regular expressions to patterns that cannot be distinguished by word representations makes it possible to distinguish them. As an example, FIG. 14-A shows visualization of graph representations of structurally stable streamline patterns assigned by the same word representation $IA_0C$ and their regular expressions. As described in 2-2-2. Graph representations of flows represented with I, II-words, for the root connected component, one right below or above the 1-source-sink point is chosen. As also can be seen from it, their regular expressions are different from each other.

FIG. 14-A shows graph representations of structurally stable streamline patterns with word representations $IA_0C$ and their corresponding regular expressions. The root corresponds to the connected component right below the 1-source-sink point according its definition. In order to obtain the graph representations, patterns where the root connected component is mapped to the outermost are drawn on the right.

3-1. Process of Converting Tree into Regular Expression

FIG. 14-B is a flowchart for explaining a process of converting a tree into a regular expression. The process of converting a tree into a regular expression shown in FIG. 14-B is executable by an apparatus, such as a computer. In the following processing, id is assigned to every point in a tree as pre-processing. Note that id of different points are different from one another. According to FIG. 14-B, a tree G is set for the input (step S178). Then V is set for the set of vertices of the tree G, s=0 and T={0} are put, X is set for the empty set, and the regular expression N=(s,σ*) ( ) is put (step S179).

At step S180, $(s^{(1)},\sigma^{(1)}), \ldots, (s^{(h)},\sigma^{(h)})$ is set for the result of reading the children of s from the left, where (s,σ*) ( ) in the regular expression N is replaced with (s,σ*) $(s^{(1)}, h^{(1)*}), \ldots, (s^{(h)},\sigma^{(h)*}))$, $\{s^{(1)}, \ldots, s^{(h)}\}$ is added to T, and {s} is added to X.

At step S181, it is determined whether #V=#X. When #V=#X (YES at step S181), the regular expression N is output and the process ends.

At step S181, when #V=#X is not satisfied (NO at step S181), one s'∈T−X is chosen (Note: any choosing method may be used) and (s,σ*) is replaced with (s',σ'*) (step S182). Then the process returns to step S180.

The operations described above are the process of converting a tree into a regular expression.

4. Word Representation Conversion Step

The word representation conversion step (step S3) in FIG. 2 will be described in detail.

4-1. Conversion Algorithm from Regular Expression into Word Representation 4-1-1. Admissible Regular Expression As described above, since it is shown that there exists injective correspondence to regular expressions from ss-saddle connection diagrams, it is possible to give an algorithm from a regular expression into a word representation. Note that, since the mapping $f_N(f_T(H))$ that gives a regular expression from a ss-saddle connection diagram is not surjective, it is not possible to apply the algorithm to not all but only the regular expression of the image of the mapping $f_N(f_T(H))$. Such regular expressions are called admissible regular expressions. In order to characterize the admissible regular expressions, the fundamental types of regular expressions and their forward replacements are defined as follows. In other words, the admissible regular expressions refer to all regular expressions that can be obtained by applying forward replacements to fundamental type regular expressions among regular expressions corresponding to a rooted, labeled, and directed tree.

First, the fundamental types are regular expressions containing $+_\varnothing$, $-_\varnothing$ and $o_\varnothing$. FIG. 15 represents the five fundamental types $T_N$ and their corresponding regular expressions N. These regular expressions correspond to the (ss)-saddle connection diagrams containing the root in their graph representations. That is to say, the regular expressions $\sigma_\varnothing$, $\sigma_\varnothing(o_0,o_0)$, $\sigma_\varnothing(o_0(\mu_0))$, $\sigma_\varnothing(o_2, \ldots, o_2)$, $o_\varnothing(o_0(-_0))$, $o_\varnothing(o_0,+_0)$ and $o_\varnothing(o_2,+_2,\ldots,+_2)$ are the regular expressions for the ss-saddle connection diagrams with the word representations O, $OB_0$, $OB_2C^k$, II, and $IC^k$.

Next, some formal conversion rules of a sequence of words in regular expressions will be defined and the formal conversion rules will be called forward replacements. They are conversion rules adding a sequence of labels $b_1, \ldots, b_n$ in a regular expression and beneath a label l, which is expressed in a form of $l \to l\ (b_1, \ldots, b_n)$. FIG. 16 is the list of fourteen forward replacements. For example, the forward replacement $A_{0+}$ is given as $o_0 \to o_0(o_0,+_0)$.

In order to explain the detail of each of the forward replacements, a connected component that contains no topological streamline structure will be called a simply connected component. The simply connected component corresponds to a vertex with no child connected component in graph representations. Then, the forward replacements in FIG. 16 describe how the local streamline structures of (ss-) saddle connection diagrams and their regular expressions change when the operations $A_0$, $A_2$, $B_0$, $B_2$ and C are applied to an ss-orbit or a closed orbit in a simply connected component.

FIG. 17 illustrates the forward replacements and their changes of streamline structures obtained when the operations $A_0$, $A_2$ and C are applied. More specifically, FIG. 17 illustrates forward replacements of regular expressions corresponding to the changes of the local streamline structures obtained when the operations $A_0$, $A_2$ and C are applied to the simply connected component $o_0$ or $o_2$ in the ss-saddle connection diagram.

When the operation $A_0$ is applied to an ss-orbit in a simply connected component $o_0$, an outward homoclinic saddle connection like that illustrated in FIG. 17(a) and an inward homoclinic saddle connection like that illustrated in FIG. 17(b) are obtained. The forward replacements of the regular expressions induced according to the change are assigned as $A_{0+}$: $o_0 \to o_0(o_0,+_0)$ and $A_{0-}$: $o_0 \to o_0(o_0(-_0))$, respectively. The forward replacement $A_2C^k$ is a conversion rule of the regular expression obtained when the operation $A_2C^k$ is applied to an ss-orbit in a simply connected component $o_0$ as shown in FIG. 17(c). The operations $C^lA_0$, $C^l$ and $C^lA_2C^k$ (k,l≥0) applied to an ss-orbit in a simply connected component $o_2$ give rise to the four forward replacements $C^lA_{0+}$, $C^lA_{0-}$, $C^lo$ and $C^lA_2C^k$ (See FIGS. 17(d) to 17(g)).

It is possible to define more forward replacements when the operations $B_0$, $B_2$ and C are applied to a closed orbit contained in a simply connected component. FIG. 18 is a diagram for explaining forward replacements of regular expressions induced in accordance with the changes of streamline structures that are obtained when operations $B_0$, $B_2$ and C are applied to a closed orbit contained in a simply connected component $\sigma_0$ or $\sigma_2$ in a (ss-) saddle connection diagram.

The forward replacements according to which outward and inward homoclinic saddle connections like those illustrated in FIGS. 18(a) and 18(b) are obtained are $B_0+$: $\sigma_0 \to \sigma_0(\sigma_0,\sigma_0)$ and $B_0-$: $\sigma_0 \to \sigma_0(\sigma_0(\mu_0))$, respectively. The forward replacements induced by the operations $B_2C^k$, $C^lB_{0+}$, $C^lB_{0-}$, $C^l$, and $C^lB_2C^k$ are $B_2C^k$, $C^lB_{0+}$, $C^lB_{0-}$, $C_\sigma^l$, and $C^lB_2C^k$ like those illustrated in FIGS. 18(c) to 18(g), respectively. Regarding the forward replacement $C^lB_2C^k$, note that two types of forward replacements are obtained depending on the sign $\mathrm{sgn}(\sigma_2)$ owing to Rule (1) of the order relation between labels.

A set of regular expressions obtained by applying the forward replacements inductively to the fundamental types are defined as follows.

[Expression 1]

1. Denote $N_0$ the set of regular expressions of fundamental types.

2. For all regular expressions in $N:=\cup_{n=1} N_n$, apply every applicable forward replacement to each height n+1 simply connected component (vertex) to obtain a set of regular expressions, denoted by $N_n+1$.

A regular expression is said to be of O-type (resp. I, II-type), if it is constructed from the fundamental type O, $OB_0$, or $OB_2C^k$ (resp. $IC^k$ or II). Since all local streamline structures obtained by the operations are covered by FIGS. 17 and 18, the following lemma is known from the construction method.

[Expression 2]

Lemma 4.1. A set of regular expressions in $N:=\cup_{n=1} N_n$ is an admissible regular set, i.e., $N \supset \mathrm{Image}(f_N \bigcirc f_T)$.

Paying attention to the fact that all structurally stable Hamiltonian vector fields are created by applying the five operations $A_0$, $A_2$, $B_0$, $B_2$, and C to the three fundamental patterns O, I and II leads to the following proposition, which has been proved to be mathematically correct. The fact represents that admissible regular expressions that can be input to the word representation conversion algorithm to be given next are defined by the above inductive method.

[Expression 3]

Proposition 4.1. The admissible regular expressions consist of 0-type, I-type and II-type regular expressions. That is to say, $N=\cup_{n=1}^\infty N_n=\mathrm{Image}(f_{NT} \bigcirc f_T)$.

4-1-2. Conversion Algorithm to Word Representations

As it can be seen from the above, regarding the conversion algorithm to word representations to be given below, only regular expressions that are obtained by sequentially repeating the forward replacements obtained when the operations $A_0$, $A_2$, $B_0$, $B_2$ and C are applied to the fundamental types can be received as inputs.

Hence, if it is possible to, with respect to a given admissible regular expression, define backward replacements that are changes of the regular expressions occurring when characteristic streamline structures created by the operations are extracted, it will be possible to simplify the regular expressions by using the backward replacements and at the same time perform conversion into a word representations by assigning a sequence of words of a word representation corresponding to an extracted structure.

That is to say, it is the inverse operation of the operation $A_0$ (resp. $A_2$) of removing a homoclinic saddle point with a ss-saddle connection (resp. a circular boundary with just two ss-∂-saddles), and the inverse of the operation $B_0$ (resp. $B_2$) is an operation of replacing a pair of homoclinic saddle connections (resp. a circular boundary with just two ∂-saddles) with a circular boundary. Removing a simply connected component enclosed by a ∂-saddle connection attached to a circular boundary with more than two ∂-saddles is the inverse of the operation C. Note that the backward replacements can be expressed as a change of a sequence of words corresponding to a structure in admissible regular expressions to be removed.

First of all, a list of the backward replacements defined by the inverse operation of $B_2$ will be given. The backward replacements correspond to the inverse operations of the fundamental type $OB_2C^k$ (k=0) and the forward replacements $B_2C^k$ and $C^lB_2C^k$ (k=0 and l≥0). The backward replacement corresponding to the fundamental type $OB_2$: $\sigma_\varnothing \to \sigma_\varnothing(\sigma_2)$ can be simply described by $\sigma_\varnothing(\sigma_2) \to \sigma_\varnothing$. In order for easy view, the sequence of words in the regular expressions to be removed by the backward replacements are underlined in [Expression 4], [Expression 5], [Expression 11], FIG. 19 and FIG. 20. The backward replacements corresponding to the forward replacement $B_2$ differs according to the structure around the parent connected component $\sigma_0$.

FIG. 19 is a diagram showing exemplary backward replacements of regular expressions corresponding to the changes of local streamline structures in (ss-) saddle connection diagrams.

If the connected component $\sigma_0$ is surrounded by an outward homoclinic saddle connection as shown in FIG. 19(a), removing a simply connected component surrounded by a ∂-saddle connection from the (ss-) saddle connection diagram induces the backward replacement $\sigma_0(\underline{\sigma_2}) \mapsto \sigma_0$. On the other hand, when the parent connected component $\sigma_0$ is enclosed by an inward homoclinic saddle connection (FIG. 19(b)), the backward replacement $\sigma_0(\mu_0,\underline{\sigma_2}) \mapsto \sigma_0(\mu_0)$ is induced. The backward replacement of the forward replacement $C^l B_2$ is given by any one of the followings depending on the sign $\sigma_2$ from Rule (1) of the order relation on labels.

$$+_2, (\underline{+_2, -_2, \ldots, -_2}_{l \geq 0}) \mapsto +_2(\underline{-_2, \ldots, -_2}_{l}), \text{ or} \quad \text{[Expression 4]}$$

$$-_2, (\underline{+_2, \ldots, +_2, -_2}_{l \geq 0}) \mapsto -_2(\underline{+_2, \ldots, +_2}_{l}).$$

The inverse operations of the fundamental type $OB_0$ and the forward replacements $B_{0+}$, $B_{0-}$, $C^l B_{0+}$ and $C^l B_{0-}$ correspond to the replacement of a pair of homoclinic saddle connections with a circular boundary from a (ss-) saddle connection diagram. The backward replacements corresponding to the fundamental type $OB_0$ is given by $\sigma_\emptyset(\underline{\sigma_0,\sigma_0}) \mapsto \sigma_\emptyset$ when surrounded by the outward homoclinic saddle connection and is given by $\sigma_\emptyset(\underline{\sigma_0,(\mu_0)}) \mapsto \sigma_\emptyset$ when surrounded by the inward homoclinic saddle connection. When the connected component $\sigma_0$ in the forward replacement $B_{0+}$ of FIG. 18(a) is enclosed by an outward homoclinic saddle connection (FIG. 19(c)), its corresponding backward replacement is defined by $\sigma_0(\underline{\sigma_0,\sigma_0}) \mapsto \sigma_0$. The backward replacement for the connected component $\sigma_0$ enclosed by an inward homoclinic saddle connection is any one of $+_0(\underline{+_0,+_0,-_0}) \mapsto +_0(-_0)$ and $-_0(+_0,\underline{-_0,-_0}) \mapsto -_0(+_0)$ owing to Rule (1) of the order relation as shown in FIG. 19(d).

The same argument applies to the forward replacement $B_{0-}$, which yields the three backward replacements $\sigma_0(\underline{\sigma_0(\mu_0)}) \mapsto \sigma_0$, $+_0(\underline{+_0(-_0),-_0}) \mapsto +_0(-_0)$ and $-_0(+_0,\underline{-_0(+_0)}) \mapsto -_0(+_0)$. The forward replacements $C^l B_{0+}$ and $C^l B_{0-}$ (l≥0) in FIGS. 18(d) and 18(e) induce the following backward replacements.

$$\sigma_2(\underline{\sigma_0, \sigma_0, \mu_2, \ldots, \mu_2}_{l \geq 0}) \mapsto \sigma_2(\underline{\mu_2, \ldots, \mu_2}_{l}), \quad \text{[Expression 5]}$$

$$\sigma_2(\underline{\sigma_0(\mu_0), \mu_2, \ldots, \mu_2}_{l \geq 0}) \mapsto \sigma_2(\underline{\mu_2, \ldots, \mu_2}_{l}).$$

The backward replacements corresponding to removal of a simply connected component enclosed by a ∂-saddle connection correspond to the inverse operations of the fundamental type $IC^k$ (k≠0) and the forward replacements $A_2 C^k$, $B_2 C^k$ (k≠0), $C^l A_{0+}$, $C^l B_{0+}$, $C^l B_{0-}$ (l≠0), $C_o^l$, $C_\sigma^l$, $C^l A_2 C^k$ (l+k≠0) and $C^l B_2 C^k$. Since the operation C is applicable for any number of times to any circular boundary with at least two ∂-saddles, the backward replacements express removal of any one of the simply connected components enclosed by a ∂-saddle connection attached to the circular boundary from a sequence containing the simply connected components $(+_2, \ldots, +_2)$ and $(-_2, \ldots, -_2)$. The backward replacements of the fundamental type $IC^k$ (k≥1) are as follows.

$$o_\phi(o_2, \underline{+_2, \ldots, +_2}_{k \geq 1}) \mapsto o_\phi(o_2, \underline{+_2, \ldots, +_2}_{k-1}). \quad \text{[Expression 6]}$$

For the forward replacement $A_2 C^k$ (k≠0) in FIG. 17(c), if the connected component $o_0$ is enclosed by an outward or an inward homoclinic saddle connection as shown in FIGS. 19(e) and 19(f), the following backward replacements obtained by removing a simply connected component $+_2$ enclosed by the ∂-saddle connection are as follows.

$$o_0(o_2, \underline{+_2, \ldots, +_2}_{k \geq 1}) \mapsto o_0(o_2, \underline{+_2, \ldots, +_2}_{k-1}), \quad \text{[Expression 7]}$$

$$o_0(o_2, -_0, \underline{+_2, \ldots, +_2}_{k \geq 1}) \mapsto o_0(o_2, -_0, \underline{+_2, \ldots, +_2}_{k-1}).$$

Similarly, when the connected component $\sigma_0$ is enclosed by an outward or inward homoclinic saddle connection in the forward replacement $B_2 C^k$ (k≥0) in FIG. 18(c), the backward replacement is as follows.

$$\sigma_0(\underline{\sigma_2, \ldots, \sigma_2}_{k+1 \geq 2}) \mapsto \sigma_0(\underline{\sigma_2, \ldots, \sigma_2}_{k}), \quad \text{[Expression 8]}$$

$$\sigma_0(\mu_0, \underline{\sigma_2, \ldots, \sigma_2}_{k+1 \geq 2}) \mapsto \sigma_0(\mu_0, \underline{\sigma_2, \ldots, \sigma_2}_{k-1}).$$

All the forward replacements $C_o^l$, $C_\sigma^l$, $C^l A_{0+}$, $C^l A_{0-}$, $C^l B_{0+}$ and $C^l B_{0-}$ (l≥0) shown in FIGS. 17(d) to 17(f) and FIGS. 18(d) to 18(f) are defined by the connected components $o_2$ and $\sigma_2$ enclosed by a ∂-saddle connection. Hence, their backward replacements are defined in a straightforward manner as follows.

$$o_2(o_0 +_0, \underline{-_2, \ldots, -_2}_{l}) \mapsto o_2(o_0, +_0, \underline{-_2, \ldots, -_2}_{l-1}); \quad \text{[Expression 9]}$$

$$A^1 A_{0+}, 1 \geq 1,$$

$$o_2(o_0(-_0), \underline{-_2, \ldots, -_2}_{l}) \mapsto o_2(o_0(-_0), \underline{-_2, \ldots, -_2}_{l-1});$$

$$C^l A_{0-}, 1 \geq 1 C^l A_{0-}, 1 \geq 1,$$

$$o_2(\underline{-_2, \ldots, -_2}_{l}) \mapsto o_2(\underline{-_2, \ldots, -_2}_{l-1}); C_o^1, 1 \geq 1,$$

$$\sigma_2(\sigma_0, \sigma_0, \underline{\mu_2, \ldots, \mu_2}_{l}) \mapsto \sigma_2(\sigma_0, \sigma_0, \underline{\mu_2, \ldots, \mu_2}_{l-1});$$

$$C^l B_{0+}, 1 \geq 1,$$

$$\sigma_2(\sigma_0(\mu_0), \underline{\mu_2, \ldots, \mu_2}_{l}) \mapsto \sigma_2(\sigma_0(\mu_0), \underline{\mu_2, \ldots, \mu_2}_{l-1});$$

$$C^l B_{0-}, 1 \geq 1,$$

$$\sigma_2(\underline{\mu_2, \ldots, \mu_2}_{l}) \mapsto \sigma_2(\underline{\mu_2, \ldots \mu_2}_{l-1}); C_o^1, 1 \geq 1.$$

Regarding the forward replacements $C^l A_2 C^k$ and $C^l B_2 C^k$ ($1+k \neq 0$) in FIGS. 17(g) and 18(g), two different backward replacements are obtained from Rule (1) of the order relation depending on which one of simply connected components $+_2$ and $-_2$ is removed.

[Expression 10]

$$o_2(o_2, \underbrace{+_2, \ldots, +_2}_{k}, \underbrace{-_2, \ldots, -_2}_{l}) \mapsto o_2(o_2, \underbrace{+_2, \ldots, +_2}_{k-1},$$
$$\underbrace{-_2, \ldots, -_2}_{l}); C^l A_2 C^k, k \geq 1, l \geq 0,$$

$$o_2(o_2, \underbrace{+_2, \ldots, +_2}_{k}, \underbrace{-_2, \ldots, -_2}_{l}) \mapsto o_2(o_2, \underbrace{+_2, \ldots, +_2}_{k},$$
$$\underbrace{-_2, \ldots, -_2}_{l-1}); C^l A_2 C^k, k \geq 0, l \geq 1,$$

$$+_2(\underbrace{+_2, \ldots, +_2}_{k+1}, \underbrace{-_2, \ldots, -_2}_{l}) \mapsto +_2(\underbrace{+_2, \ldots, +_2}_{k},$$
$$\underbrace{-_2, \ldots, -_2}_{l}); C^l B_2 C^k, k \geq 1, l \geq 0,$$

$$+_2(\underbrace{+_2, \ldots, +_2}_{k+1}, \underbrace{-_2, \ldots, -_2}_{l}) \mapsto +_2(\underbrace{+_2, \ldots, +_2}_{k+1},$$
$$\underbrace{-_2, \ldots, -_2}_{l-1}); C^l B_2 C^k, k \geq 0, l \geq 1,$$

$$-_2(\underbrace{+_2, \ldots, +_2}_{l}, \underbrace{-_2, \ldots, -_2}_{k+1}) \mapsto -_2(\underbrace{+_2, \ldots, +_2}_{l-1},$$
$$\underbrace{-_2, \ldots, -_2}_{k+1}); C^l B_2 C^k, k \geq 0, l \geq 1,$$

$$-_2(\underbrace{+_2, \ldots, +_2}_{l}, \underbrace{-_2, \ldots, -_2}_{k+1}) \mapsto -_2(\underbrace{+_2, \ldots, +_2}_{l},$$
$$\underbrace{-_2, \ldots, -_2}_{k}); C^l B_2 C^k, k \geq 1, l \geq 0.$$

FIG. 20 shows the list of the backward replacements [$B_2$], [$B_0$] and [$C$] of the regular expressions induced by the operations $B_0$, $B_2$ and $C$. For the admissible regular expression given last, applying the backward replacements in FIG. 20 as many as possible yields the following word representations that are obtained finally, which has been proved to be mathematically correct.

Lemma 4.2: If all the backward replacements contained in [$B_0$], [$B_2$] and [$C$] are no longer applicable to an admissible regular expression N that is given, then the word representations corresponding to the regular expression are as follows.

1) The word representation of N is O.
2) The word representation of N is any one of $IA_0^{p+m} A_2^{c-2-p-m}$ and $IIA_0^{c-2}$, where c, p and m are the numbers of $o^*$, $+_0$ and $-_0$ contained in N.

Figure 21:
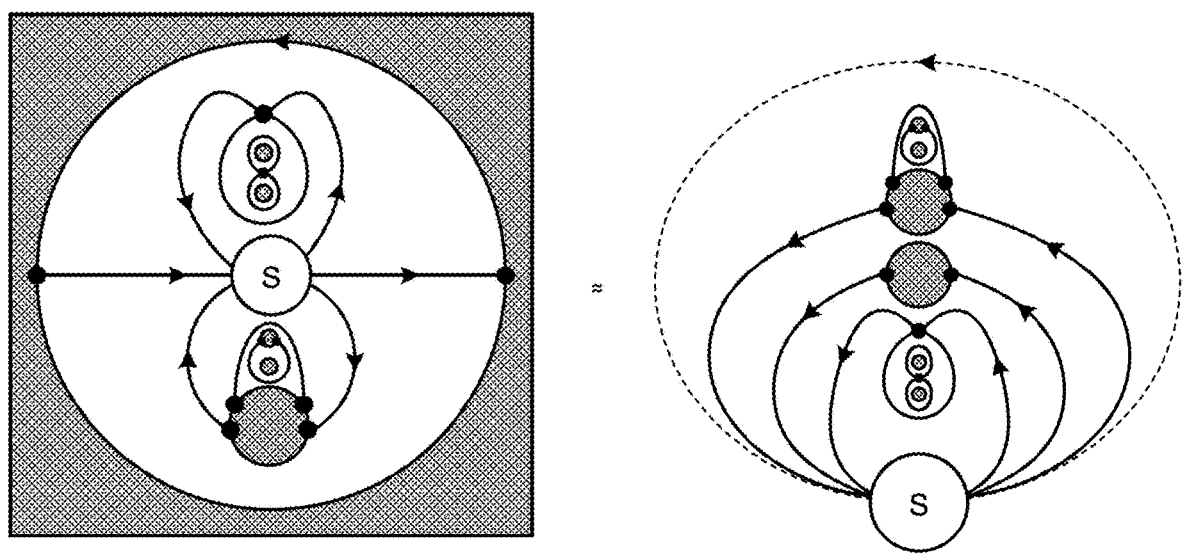
FIG. 21 is a diagram showing an ss-saddle connection diagram of a structurally stable Hamiltonian vector field with a regular expression of $o_\emptyset(o_2(o_2(o_0(-_0(-_0, -_0)))),+_2(+_2))$.

Lastly, an example of the conversion algorithm will be represented. FIG. 21 is an ss-saddle connection diagram of a structurally stable Hamiltonian vector field with a regular expression $o_\emptyset(o_2(o_2(O_0(-_0(-_0,-_0)))),+_2(+_2))$. Applying the backward replacements $C^l B_2$ (l=0), $B_0$ and IC sequentially leads to the regular expression as follows.

[$C^l B_2$]: $o_\emptyset(o_2(o_2(o_0(-_0(-_0,-_0)))),+_2(\underline{+_2})) \mapsto o_\emptyset(o_2(o_2 (o_0(-_0(-_0,-_0)))),+_2)$,

[$B_0$]: $o_\emptyset(o_2(o_2(o_0(-_0(\underline{-_0,-_0})))),+_2) \mapsto o_\emptyset(o_2 (o_2(o_0(-_0))),+_2)$,

[$C$]: $o_\emptyset(o_2(o_2(o_0(-_0))),\underline{+_2}) \mapsto o_\emptyset(o_2(o_2(o_0(-_0))))$. [Expression 11]

As a consequence, a sequence of subwords $CB_0B_2$ is obtained according to the structure that is taken out. Then, counting the numbers of $o^*$, $+_0$ and $-_0$ in the remaining regular expression $o_\emptyset(o_2(O_0(-_0)))$ yields c=4, p=0 and m=1. Hence, from the existence of $o_2$ and from p+m=1 and c−2−p−m=1, its word representation $IA_0 A_2 CB_0 B_2$ can be obtained as a result.

4-1-3. Process of Converting Regular Expression into Word Representation

Figure 22B:
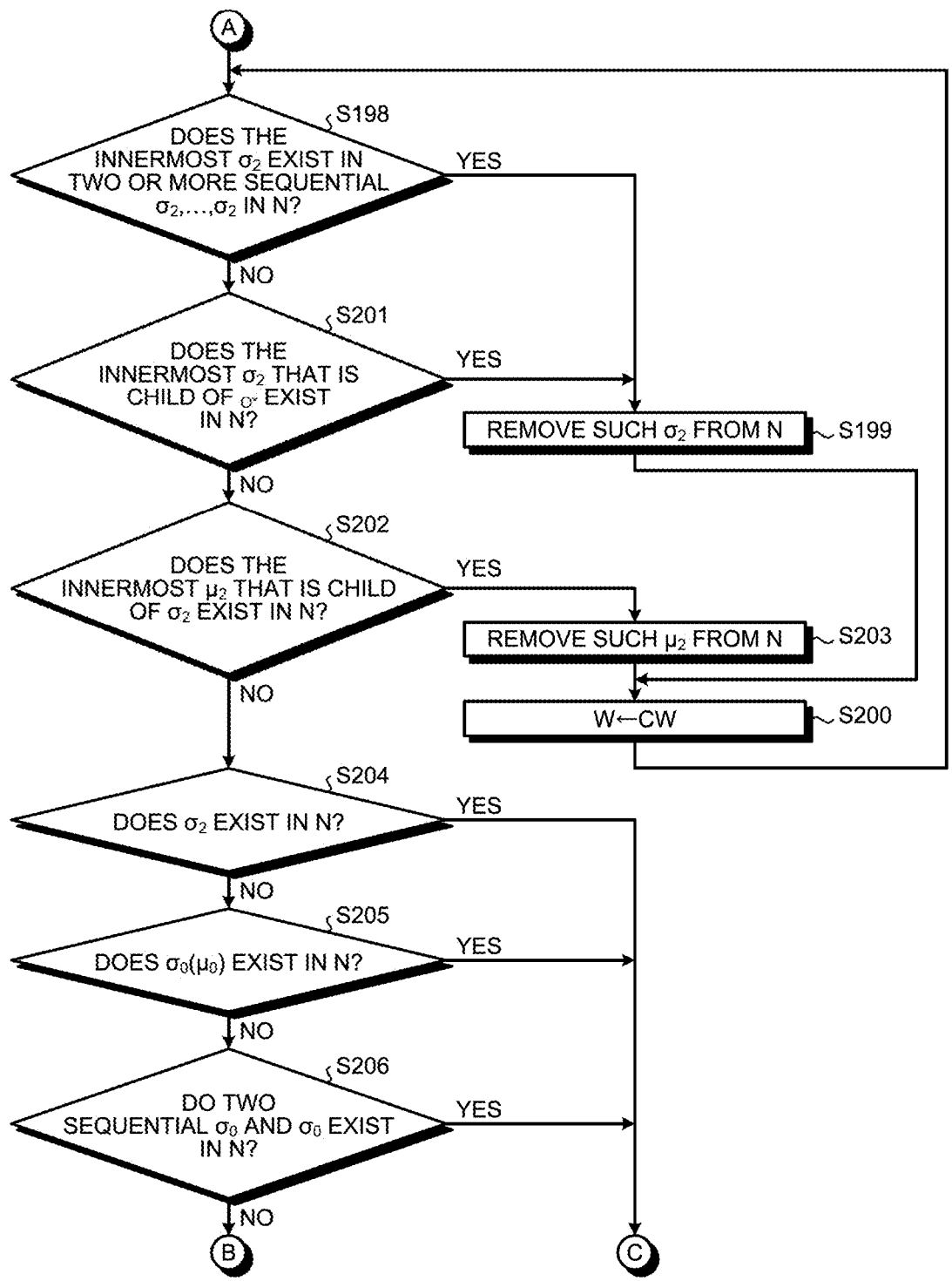
FIG. 22-A is a flowchart for explaining a process of converting a regular expression into a word representation.

FIGS. 22-A to 22-C are flowcharts for explaining a process of converting a regular expression into a word representation. The process of converting a regular expression into a word representation illustrated in FIGS. 22-A to 22-C is executable by a device, such as a computer. In the following descriptions, $\sigma \in \{+,-\}$ is represented and $\mu = -\sigma$ is put. In FIGS. 22-A to 22-C, first of all, a regular expression N is set for an input (step S184). A word W is put as an empty set (step S185).

At step S186, it is determined whether $\sigma_\emptyset(\sigma_2)$ containing the innermost $\sigma_2$ or $\sigma_0(\sigma_2)$ containing the innermost $\sigma_2$ is contained in the regular expression N. When $\sigma_\emptyset(\sigma_2)$ containing the innermost $\sigma_2$ or $\sigma_0(\sigma_2)$ containing the innermost $\sigma_2$ is contained in the regular expression N (YES at step S186), the process moves to step S187.

At step S187, the innermost $\sigma_2$ contained in $\sigma_\emptyset(\sigma_2)$ or $\sigma_0(\sigma_2)$ is extracted from the regular expression N and W is replaced with $B_2W$ (step S188) and the process returns to step S186.

On the other hand, at step S186, when $\sigma_\emptyset(\sigma_2)$ containing the innermost $\sigma_2$ or $\sigma_0(\sigma_2)$ containing the innermost $\sigma_2$ is not contained in the regular expression N (NO at step S186), the process moves to step S189.

At step S189, it is determined whether $+_2(+_2, -_2, \ldots, -_2)$ containing the innermost $+_2$ exists in the regular expression N. When $+_2(+^2, -_2, \ldots, -_2)$ containing the innermost $+_2$ exists in the regular expression N (YES at step S189), the innermost $+_2$ is extracted from the regular expression N (step S190), W is replaced with $B_2W$ (step S188) and the process returns to step S186.

On the other hand, at step S189, when $+_2(+_2,-_2, \ldots,-_2)$ containing the innermost $+_2$ does not exist in the regular expression N (NO at step S189), the process moves to step S191.

At step S191, it is determined whether $-_2(+_2, \ldots, +_2,-_2)$ containing the innermost $-_2$ exists in the regular expression N. When $-_2(+_2, \ldots, +_2,-_2)$ containing the innermost $-_2$ exists in the regular expression N (YES at step S191), the innermost $-_2$ is extracted from the regular expression N (step S192), W is replaced with $B_2W$ (step S188) and the process returns to step S186.

On the other hand, at step S191, when $-_2(+_2, \ldots, +_2,-_2)$ containing the innermost $-_2$ does not exist in the regular expression N (NO at step S191), the process moves to step S193.

At step S193, it is determined whether two sequential innermost $\sigma_0$ and $\sigma_0$ are contained in the regular expression N. When the two sequential innermost $\sigma_0$ and $\sigma_0$ are contained in the regular expression N (YES at step S193), $\sigma_0$ and $\sigma_0$ are extracted from the regular expression N (step S194), W is replaced with $B_0W$ (step S195), and the process returns to step S193.

On the other hand, at step S193, when the two sequential innermost $\sigma_0$ and $\sigma_0$ are not contained in the regular expression N (NO at step S193), the process moves to step S196.

At step S196, it is determined whether the innermost $\sigma_0(\mu_0)$ is contained in the regular expression N. When the innermost $\sigma_0(\mu_0)$ is contained in the regular expression N (YES at step S196), $\sigma_0(\mu_0)$ is extracted from the regular expression N (step S197), W is replaced with $B_0W$ (step S195), and the process returns to step S193.

At step S196, when the innermost $\sigma_0(\mu_0)$ is not contained in the regular expression N (NO at step S196), the process moves to step S198.

At step S198, it is determined whether the innermost $\sigma_2$ is contained in two or more sequential $\sigma_2, \ldots, \sigma_2$ in the regular expression N. When the innermost $\sigma_2$ is contained in two or more sequential $\sigma_2, \ldots, \sigma_2$ in the regular expression N (YES at step S198), $\sigma_2$ is extracted from the regular expression N (step S199), W is replaced with CW (step S200), and the process returns to step S198.

On the other hand, at step S198, when the innermost $\sigma_2$ is not contained in two or more sequential $\sigma_2, \ldots, \sigma_2$ in the regular expression N (NO at step S198), the process moves to step S201.

At step S201, it is determined whether the innermost $\sigma_2$ that is a child of o* exists in the regular expression N. When the innermost $\sigma_2$ that is a child of o* exists in the regular expression N (YES at step S201), $\sigma_2$ is extracted from the regular expression N (step S199), W is replaced with CW (step S200), and the process returns to step S198.

On the other hand, at step S201, when the innermost $\sigma_2$ that is a child of o* does not exist in the regular expression N (NO at step S201), the process moves to step S202.

At step S202, it is determined whether the inner most $\mu_2$ that is a child of $\sigma_2$ exists in the regular expression N. When the innermost $\mu_2$ that is a child of $\sigma_2$ exists in the regular expression N (YES at step S202), $\mu_2$ is extracted from the regular expression N (step S203), W is replaced with CW (step S200), and the process returns to step S198.

On the other hand, at step S202, when the innermost $\mu_2$ that is a child of $\sigma_2$ does not exist (NO at step S202), the process moves to step S204.

At step S204, it is determined whether $\sigma_2$ exists in the regular expression N. When $\sigma_2$ exists in the regular expression N (YES at step S204), the process returns to step S186.

On the other hand, at step S204, when $\sigma_2$ does not exist in the regular expression N (NO at step S204), the process moves to step S205.

At step S205, it is determined whether $\sigma_0(\mu_0)$ exists in the regular expression N. When $\sigma_0(\mu_0)$ exists in the regular expression N (YES at step S205), the process returns to step S186.

On the other hand, at step S205, when $\sigma_0(\mu_0)$ does not exist in the regular expression N (NO at step S205), the process moves to step S206.

At step S206, it is determined whether two sequential $\sigma_0$ and $\sigma_0$ exist in the regular expression N. When two sequential $\sigma_0$ and $\sigma_0$ exist in the regular expression N (YES at step S206), the process returns to step S186.

On the other hand, at step S206, when two sequential $\sigma_0$ and $\sigma_0$ do not exist in the regular expression N (NO at step S206), the process moves to step S207.

At step S207, it is determined whether the regular expression N is $\sigma_\emptyset$. When the regular expression N is $\sigma_\emptyset$ (YES at step S207), W is replaced with OW (step S208), the word W is output (step S212), and the process ends.

On the other hand, at step S207, when the regular expression N is not $\sigma_\emptyset$ (NO at step S207), the process moves to step S209.

At step S209, it is determined whether the regular expression N contains $o_2$. When the regular expression N contains $o_2$ (YES at step S209), W is replaced with $IA_0^{p+m} A^{c-2-p-m}$W(step S210), the word W is output (step S212), and the process ends. Note that c, p and m are the numbers of o*, $+_0$ and $-_0$.

On the other hand, at step S209, when the regular expression N does not contain $o_2$ (NO at step S209), W is replaced with $IIA_0^{c-2}$W(step S212), the word W is output (step S212), and the process ends.

The above process is the process of converting a regular expression into a word representation.

The apparatus configuration for implementing the above-described flow pattern regular expression creating method according to the embodiment with a computer will be described here. The method according to the embodiment may be implemented by a computer or may be used when the following processes according to the embodiment are performed by a computer or the like.

Configuration of Regular Expression Creating Apparatus

Figure 23:
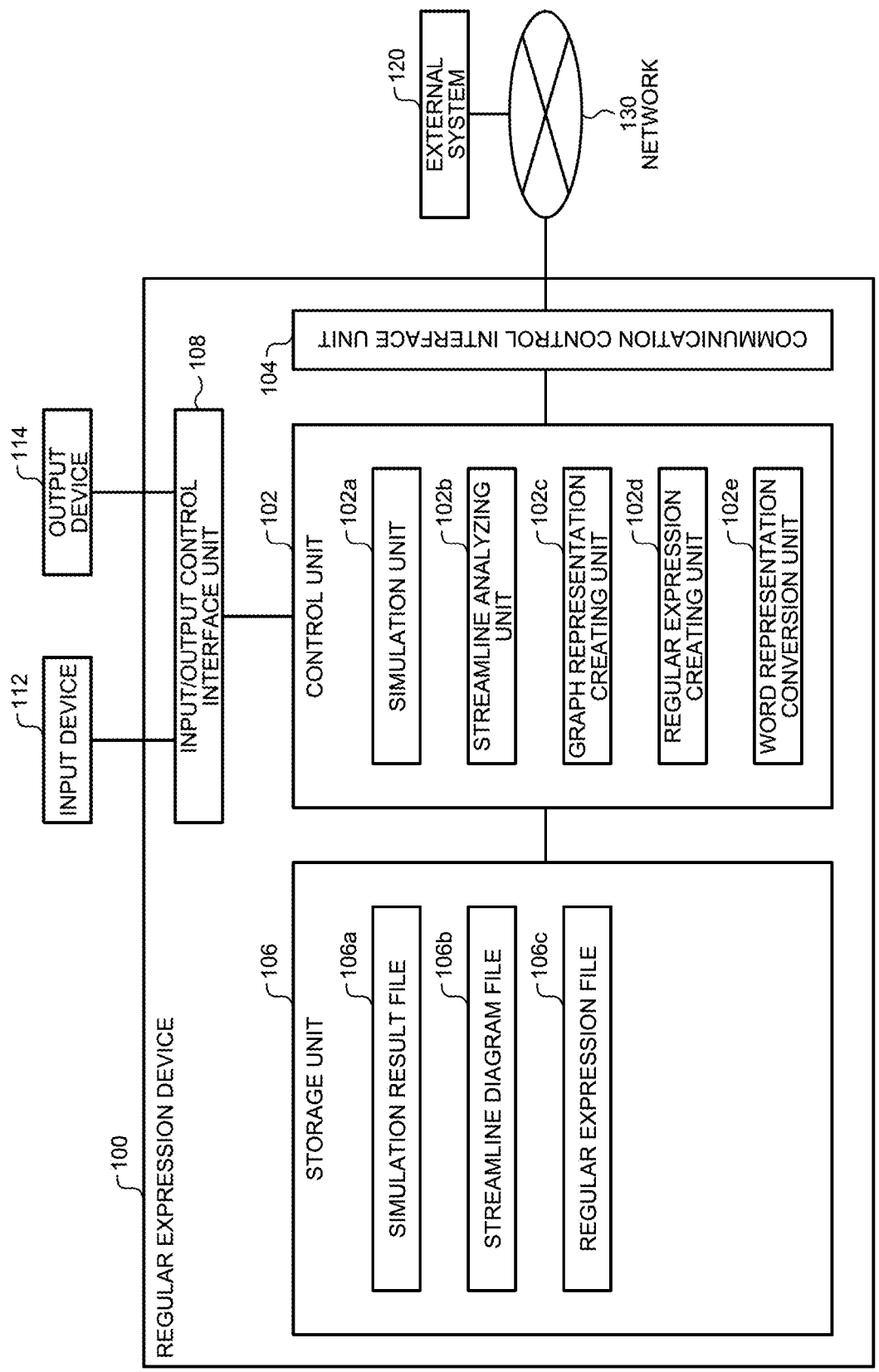
FIG. 23 is a block diagram showing an exemplary regular expression creating apparatus to which the embodiment is applied.

The configuration of the regular expression creating apparatus according to the embodiment will be described here with reference to FIG. 23. FIG. 23 is a block diagram showing an exemplary regular expression creating apparatus 100 to which the embodiment is applied, schematically showing only components relevant to the embodiment among the components.

As shown in FIG. 23, schematically, the regular expression creating apparatus 100 according to the embodiment at least includes a control unit 102 and a storage unit 106 and, in the embodiment, further includes an input/output control interface unit 108 and a communication control interface unit 104. The control unit 102 is a CPU that generally controls the entire regular expression creating apparatus 100, or the like. The communication control interface unit 104 is an interface that is connected to a communication device (not shown), such as a router, that is connected to a communication line or the like, and the input/output control interface unit 108 is an interface that is connected to an input device 112 and an output device 114. The storage unit 106 is a device that stores various types of data necessary for the regular expression creating apparatus 100 to execute the above-described regular expression creating method (such as the data of the patterns illustrated in FIGS. 4 to 9, FIGS. 11 and 12, FIG. 14-A and FIGS. 15 to 21), databases and tables. The data, the databases, the tables, etc., are referred to as required when the control unit 102 executes the regular expression creating method. The units of the regular expression creating apparatus 100 are communicably connected via a predetermined communication path. Furthermore, the regular expression creating apparatus 100 is communicably connected to a network 130 via a communication device, such as a router, and a wired or wireless communication line, such as a dedicated line.

The various types of data, databases and tables (a simulation result file 106a, a streamline diagram file 106b, a regular expression file 106c, etc.) stored in the storage unit 106 are storage units, such as fixed disk devices, etc. For example, the storage unit 106 stores various programs used for various types of processing, tables, files, databases, webpages, etc.

From among these components of the storage unit 106, the simulation result file 106a is a simulation result storage unit that stores data representing the simulation results of numerical simulations performed by a simulation unit 102a. For example, the simulation result file 106a may be data representing the values of design variables representing the shape of a structure and hydrodynamic simulation results (the pressure or the direction of flow of the fluid at each set of space coordinates) for a given fluid (such as an ocean current or air current) with respect to the structure. The simulation result file 106a may store, as simulation results, data that is input in advance via the input device 112 through a model measurement of, for example, a wind channel test in a laboratory.

The streamline diagram file 106b is a streamline data storage unit that stores data, such as a streamline diagram, representing streamlines. For example, the streamline data stored in the streamline diagram file 106b may be data representing the streamlines that are analyzed by a streamline analyzing unit 102b on the basis of the data representing the simulation result.

The regular expression file 106c is a regular expression storage unit that stores regular expression data. For example, the regular expression data that is stored in the regular expression file 106c includes sequences of words.

FIG. 23 will be referred back here. The input/output control interface unit 108 controls the input device 112 and the output device 114. For the output device 114, a monitor (including a home TV set) or alternatively a speaker may be used (the output device 114 may be referred to as a monitor below). For the input device 112, a keyboard, a mouse, a microphone, etc., may be used.

The control unit 102 in FIG. 23 includes an internal memory for storing a control program of, for example, an OS (Operating System), a program that defines various processing procedures, and necessary data. The control unit 102 performs information processing to perform various types of processing by these programs etc. The control unit 102 functionally and schematically includes the simulation unit 102a, the streamline analyzing unit 102b, a graph representation creating unit 102c, a regular expression creating unit 102d, and a word representation conversion unit 102e.

Figure 29:
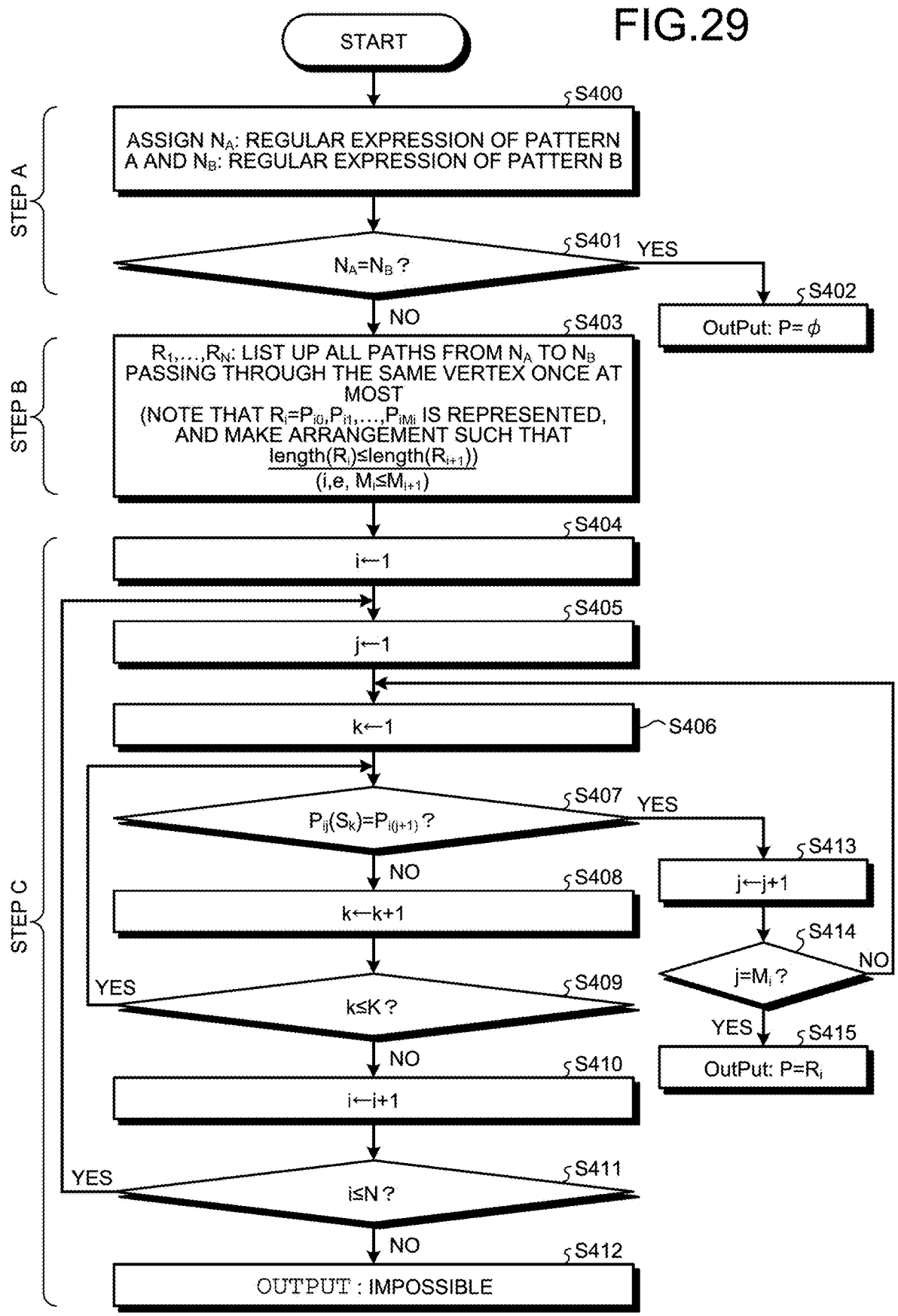
FIG. 29 is a flowchart for explaining an exemplary method of optimizing a flow around an object in a fluid by using word representations and regular expressions.

The simulation unit 102a is a simulation unit that performs simulations of a fluid with respect to a structure and, for example, the simulation unit 102a executes the above-described design parameter selecting step (see FIG. 24) and a second design parameter selecting step (see, for example, FIG. 29). The simulation unit 102a may perform, in addition to simulations in a two-dimensional plane, simulations of a fluid in a three-dimensional space. For example, the simulation unit 102a may optimize the structure by using a known optimization method. For example, while repeatedly changing the design variable that determines the shape of a structure by simulated annealing, a genetic algorithm method, etc., the simulation unit 102a may perform a fluid simulation with respect to the structure to calculate an appropriate shape of the structure (for example, a shape of bridge piers with less resistance to the water current). In the embodiment, the simulation unit 102a may store data representing the simulation results in the simulation result file 106a. For example, the simulation unit 102a may store data representing the value of a design variable representing the shape of the structure and the results of hydrodynamic simulations of a given fluid (such as an ocean current or air current) with respect to the structure (the pressure, the direction of flow, resistance, etc., of the fluid at each set of spatial coordinates).

The streamline analyzing unit 102b is a streamline analyzing unit that performs a flow analysis. The streamline analyzing unit 102b may derive a streamline diagram by performing a streamline analysis on the result of a simulation performed by the simulation unit 102a. For example, the streamline analyzing unit 102b creates a streamline diagram by using a known method from the data on numerical simulations and experiments that are stored in the simulation result file 106a. Specifically, the streamline analyzing unit 102b is able to create a streamline diagram by, after calculating all of a saddle point, a 1-source-sink point, etc., from the numerical simulation result, drawing all contour lines of a stream function having the same value as that of the stream function at that point and connecting that point, and drawing all contour lines of a stream function having the equal value as that of a stream function at the boundary and connecting the boundary. In a case of the result of a three-dimensional simulation, the streamline analyzing unit 102b may perform a streamline analysis after conversion into two-dimensional data at a cross section of the structure. Any plane can be a cross section and, preferably, the streamline analyzing unit 102b may implement a conversion into two-dimensional data at a cross section along a direction, i.e., the direction in which the fluid flows (uniform flow). For example, for transportation, such as a train, a motor vehicle or an airplane, a cross section may be generated along the travel direction. Furthermore, using the technology described in Computational Homology (Non-Patent Literature 1), the streamline analyzing unit 102b may extract a characteristic structure that satisfies the conditions from a flow field. In the embodiment, the streamline analyzing unit 102b stores the created streamline diagram data in the streamline diagram file 106b.

The graph representation creating unit 102c is a graph representation creating unit for executing the above-described graph representation creating step (step S1). For example, by executing the process of converting a saddle connection diagram of O system into a tree shown in FIGS. 10-A to 10-E and the process of converting an ss-saddle connection diagram of I, II system into a tree shown in FIGS. 13-A to 13-D, etc., the graph representation creating unit 102c creates a graph representation having one-to-one correspondence to a flow pattern in a multiply connected exterior domain with N (N is an integer equal to or larger than 1) holes topologically. The graph representation may be one obtained by assigning a unique rooted, labeled and directed tree $T_H=(V,E)$ (where V is a set of points called vertices and E is a set of edges connecting vertices) to a structurally stable Hamiltonian vector field H defined by a flow pattern and then visualizing the tree as plane graph. The graph representation may include one obtained by, when v is a parent vertex, w is a child vertex of the parent vertex, l(v) is a label assigned to the parent vertex v, l(w) is a label assigned to the child vertex w, and Γ(v) is the set of child vertices of v, arranging the set of child vertices Γ(v) of v according to the rules of a given order relation and drawing arrows from l(v) to l(w) from left to right for w∈Γ(v). The flow pattern may be at least one of patterns of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes. Furthermore, when a flow pattern has a 1-source-sink point, the flow pattern may be converted such that the domain containing a counterclockwise ss-orbit closest to the 1-source-sink point is the outermost domain, the orbits appearing on the (ss-) saddle connection diagram of the converted flow pattern may be extracted from the whole domain, vertices may be set for the connected components obtained by excluding all orbits appearing on the (ss-) saddle connection diagram from the whole domain and the outermost connected component may be regarded as the root, a current component is set for the root, the connected components sharing the boundary with the current component may be regarded as children of the current component to which labels are assigned according to the orbit serving as the boundary, the children may be arranged according to a given order relation between labels, the children of the current component may be set as current components and this setting may be repeatedly executed until there is no child. The flow pattern may be a flow pattern diagram that is created by repeating an operation, starting from at least one of the pattern words, of assigning any one of the operation words defining the five types of operations that can be topologically adopted to add a hole to a flow pattern until the number of holes reaches N.

The regular expression creating unit $102d$ is a regular expression creating unit for implementing the above-described regular expression creating step (step S2). For example, by executing the process of converting a tree into a regular expression shown in FIG. 14-B, the regular expression creating unit $102d$ creates a regular expression from a graph representation created by the graph representation creating unit $102c$.

The word representation conversion unit $102e$ is a word representation conversion unit for implementing the above-described word representation conversion step (step S3). For example, by executing the process of converting a regular expression into a word representation illustrated in FIGS. 22-A to 22-C, the word representation conversion unit $102e$ converts a regular expression that is created by the regular expression creating unit $102d$ into a word representation. The word representation may be a sign word that is formed by assigning any one of operation words that define five types of operations that can be topologically adopted to add a hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes.

This is the exemplary configuration of the regular expression creating apparatus 100 according to the embodiment. The regular expression creating apparatus 100 may be connected to an external system 120 via the network 130. In this case, the communication control interface unit 104 implements communication control between the regular expression creating apparatus 100 and the network 130 (or a communication device, such as a router). In other words, the communication control interface unit 104 has a function of communicating data with another terminal via a communication line. Furthermore, the network 130 has a function of connecting the regular expression creating apparatus 100 and the external system 120 to each other and is, for example, the Internet or the like.

The external system 120 is connected to the regular expression creating apparatus 100 via the network 130 and has a function of providing an external database relating to various types of data including simulation result data and streamline diagram data, a program for causing a connected information processing apparatus to execute a word representation method, etc.

The external system 120 may be configured as a web server, an ASP server, or the like. The hardware configuration of the external system 120 may be configured using an information processing apparatus, such as a generally available work station or a personal computer, and an auxiliary device thereof. Each of the functions of the external system 120 may be implemented by the CPU, disk device, memory device, input device, output device, and communication control device in the hardware configuration of the external system 120 and by a program for controlling them.

Method of Designing an Object in Fluid by Using Word Representations and Regular Expressions For example, regarding a designing method in which, through control on the shape and layout of an object, such as a bridge or bridge piers, placed in a flow (hereinafter, referred to as the designing subject) and the flow surrounding the object, a parameter optimum to the designing subject is determined, how to perform designing using word representations and regular expressions will be described.

Premise 1: There is a variable design parameter to the design subject (for example, an apparatus for controlling the shape, layout and flows).

Premise 2: For designing a designing subject, "optimum states" according to the problems are set, and the optimum state is described as a characteristic of the streamline structure. For example, when the state where a separation vortex is closed in is the optimum state, maximizing the lift is expected for a wing and minimizing the drag can be expected for bridge piers.

Premise 3: In such designing, it is possible to perform experiments and numerical calculations while varying the design parameter (leading to the word representations and regular expressions of streamline pattern thus obtained). The flow is limited to two-dimensional flows below. For three-dimensional flows, designing may be possible by, for example, converting them into two-dimensional flow by taking their cross-sections (note that it is not necessarily possible to deal with three-dimensional flows).

In conventional optimization designing, starting from the default state, optimization of the design parameter is performed, for example, through experience and trial and error or with a conventional optimization method. Even if one type of optimization is realized, this may be local optimization or may be physically unstable and therefore it may be not clear whether it is durable to practical designing.

In design parameter searching according to the embodiment, under such circumstances, ideal circumstances are initially set for word representations and regular expressions of flow patterns and accordingly a parameter region that realizes the ideal state can be searched for. Accordingly, "possible" design parameters that realize the optimum setting can be searched quickly as many as possible. Performing the known optimization method, starting from those possible design parameters, increases the possibility that a lot of and highly-feasible design parameters are obtained.

Figure 24:
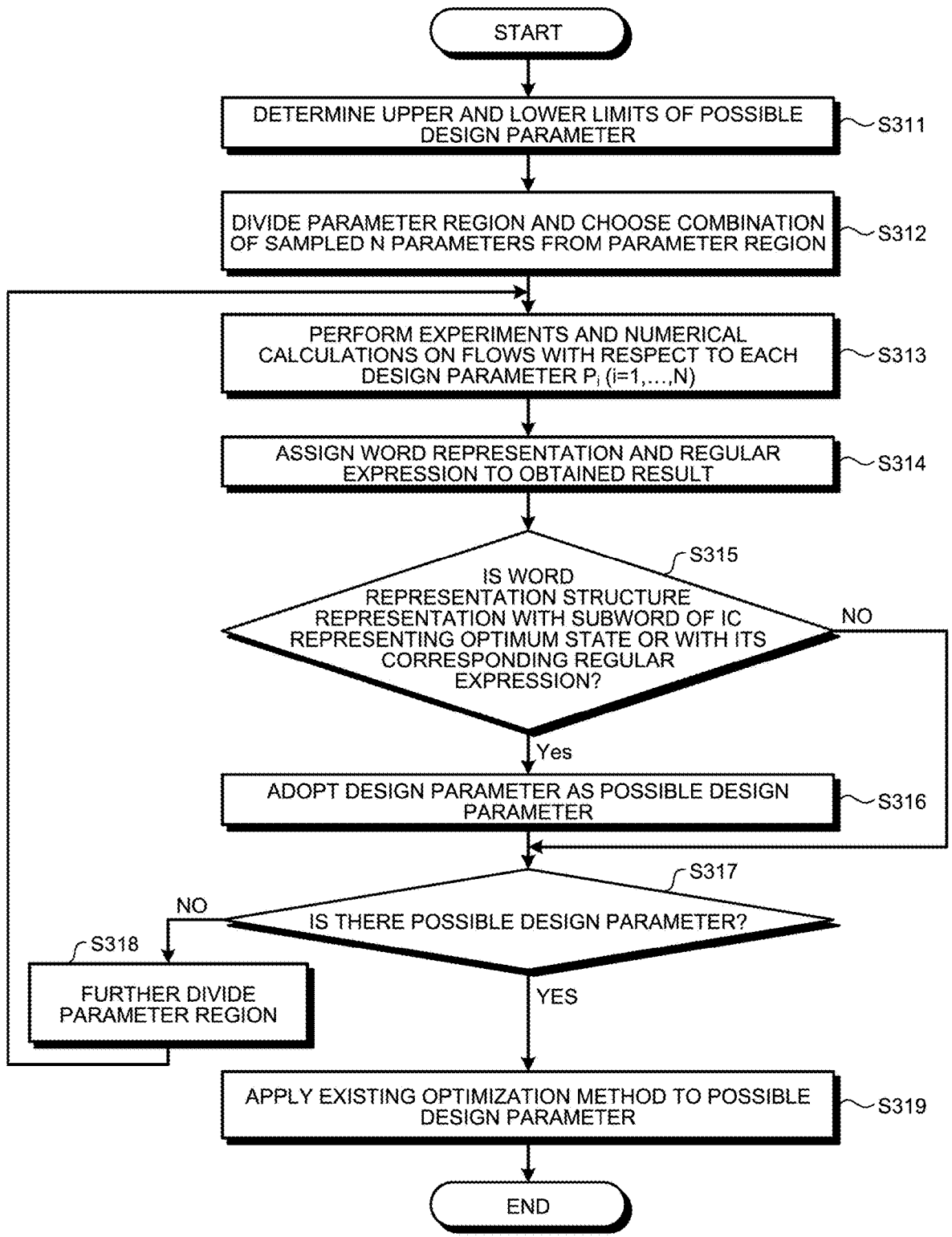
FIG. 24 is a flowchart for explaining a method of designing an object in a fluid by using word representations and regular expressions.

FIG. 24 is a flowchart for explaining a method of designing an object in a fluid by using word representations and regular expressions, i.e., the above-described design parameter selecting step. The flowchart shown in FIG. 24 is executed by the simulation unit $102a$.

According to FIG. 24, first of all, possible upper and lower limits of a design parameter are determined (step S311). The parameter region determined at step S311 (the region defined by the upper and lower limits of the design parameter is referred to as the "parameter region") is divided and a sample of combination of N parameters is selected from the parameter region (a design parameter $P_i$ (i=1, . . . , N)) (step S312). The sample may be selected properly according to the experiences and the calculation results, etc., or, if there is no prior information, the parameter region may be divided equally for sampling.

An example will be described below where the purpose of designing is that "C" is contained in the word representation as a word representation representing the vortex closed state. Experiments and numerical calculations on a flow is performed with respect to each design parameter $P_i$ (i=1, . . . , N) (step S313). A word representation and a regular expression are assigned to each obtained result (step S314). It is determined whether the word representation is a structure representation with a subword IC representing the optimum state or with its corresponding regular expression (step S315). When the word representation is a structure representation with a subword IC representing the optimum state or with its corresponding regular expression (YES at step S315), the design parameter is adopted as a possible design parameter (step S316). On the other hand, when the word representation is not a structure representation with a subword IC representing the optimum state or with its corresponding regular expression (NO at step S315), the design parameter is not adopted as a possible design parameter.

Even a pattern without the subword IC representation that transitions to a structure with the IC or its corresponding regular expression via one transition with the method of acquiring a fluid transition route (transition pattern) using a regular expression and a word representation may be used as a possible design parameter.

At step S317, it is determined whether there is a possible design parameter (step S317). When there is a possible design parameter (YES at step S317), an existing optimization method is applied to the possible design parameter (step S319). In addition to applying the existing optimization method, calculating a word representation and a regular expression necessarily and monitoring them at each stage in the optimization process enables optimization of quantitative flow and optimization designing enabling optimization of ideal streamline structure simultaneously.

When there is no possible design parameter (NO at step S317), the parameter region is further divided (step S318) and executes the processing at steps S313 to S317.

Figure 25:
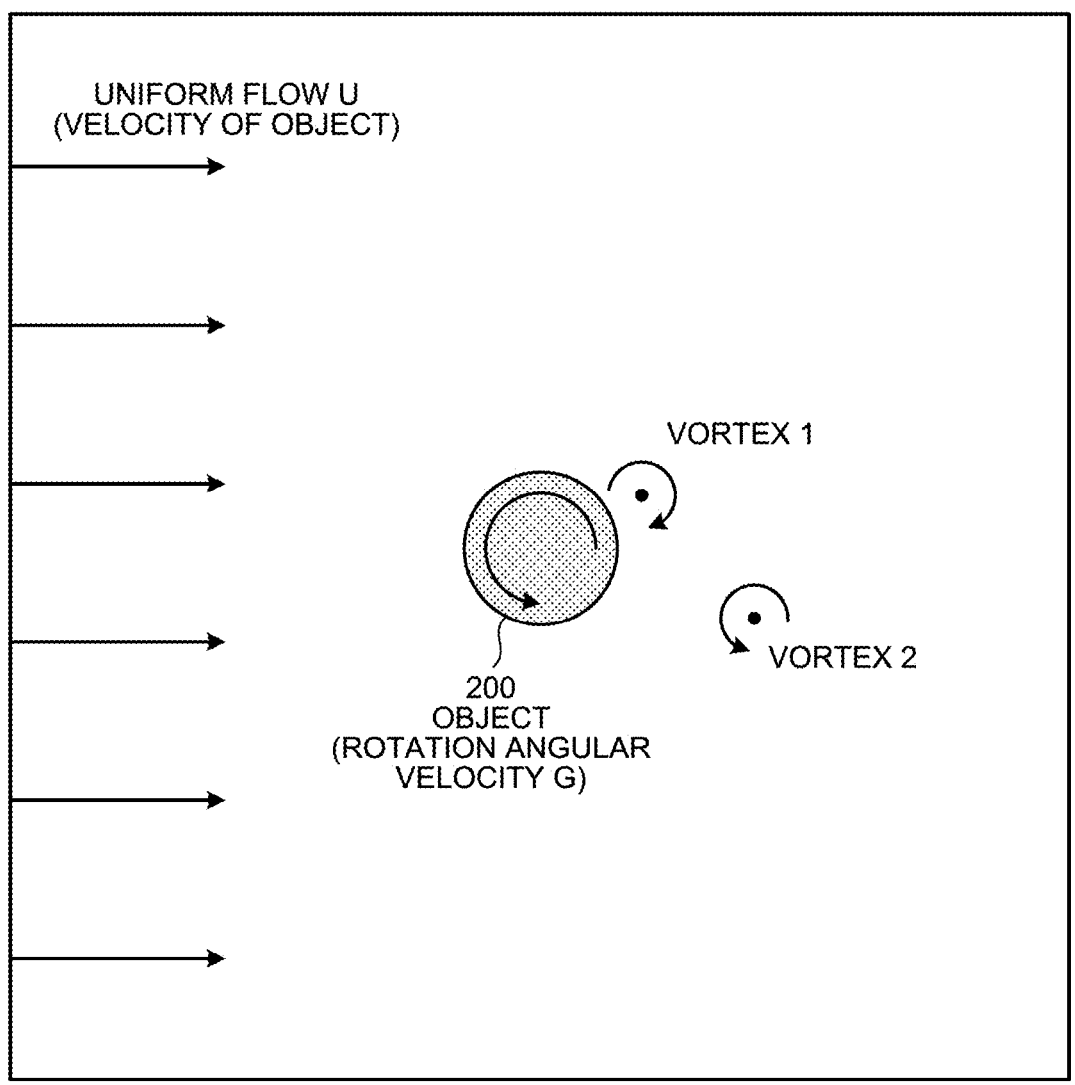
FIG. 25 is a diagram for explaining an exemplary specific example for explaining the method of designing an object in a fluid by using word representations and regular expressions.
Figure 26:
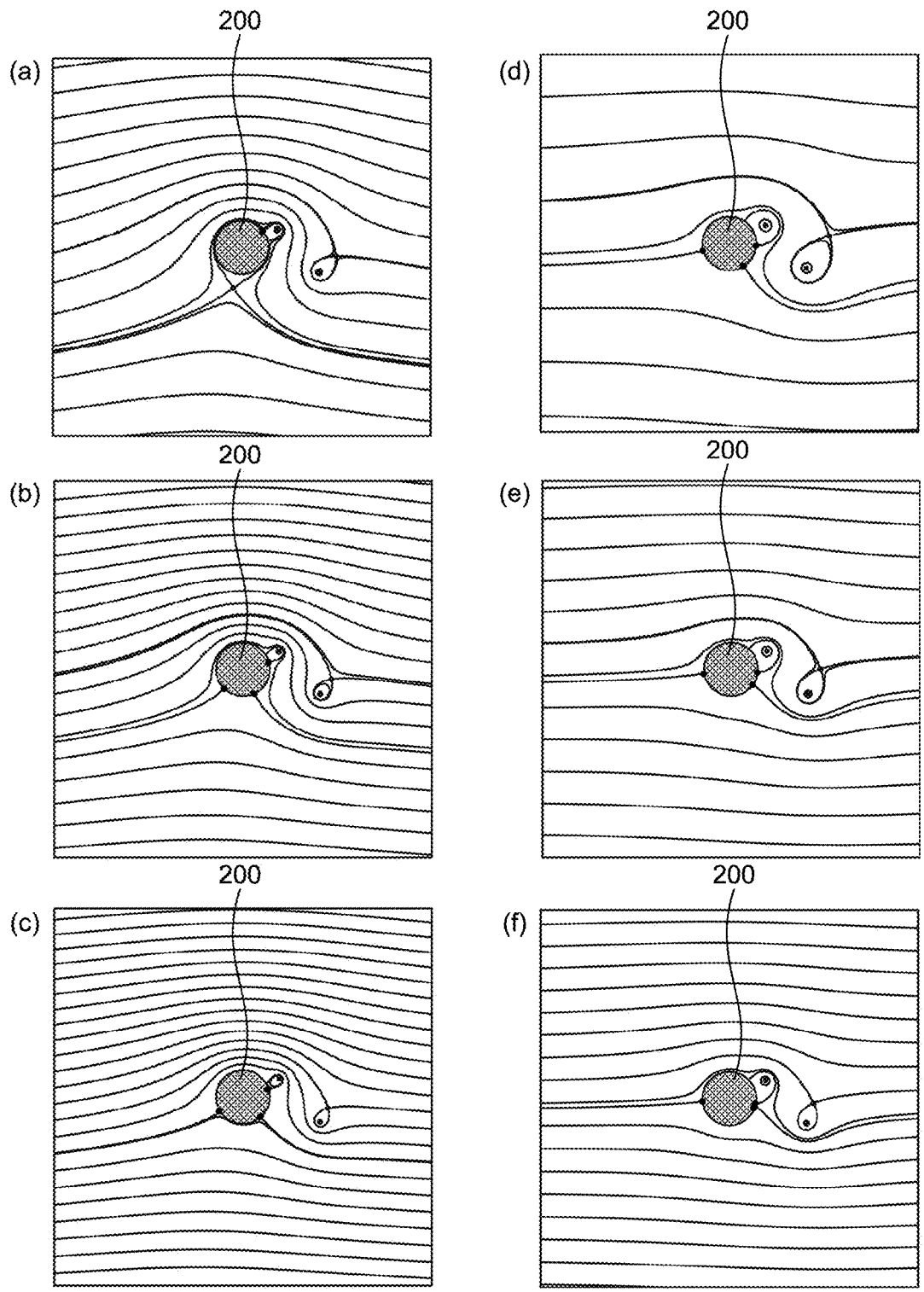
FIG. 26 is a diagram for explaining the exemplary specific example for explaining the method of designing an object in a fluid by using word representations and regular expressions.

FIGS. 25 and 26 are diagrams for explaining an exemplary specific example for explaining the above-described method of designing an object in a fluid by using word representations and regular expressions. FIG. 25 assumes circumstances where there exist two vortex structures (Vortex 1 and Vortex 2) behind an object 200 placed in a uniform flow. Let U denote the velocity of the uniform flow (or the traveling speed of the object). It is assumed that the object 200 is capable of rotating at an angular velocity G. It is assumed that the intensity and position of the vortices are already given in the flow, and it is considered to optimize an apparatus that "closes" Vortex 1 in to maximize the lift to which the object 200 is subjected and causes Vortex 2 to be away from the object along the flow by searching for "parameters of U and G". Because the vortex closed state can be expressed by the word representation "C" and the vortex to be away can be represented by "$A_0$", the designing method is applied to narrow down the parameter region to achieve the word representation $IA_0C$ representing the targeted circumstances.

As for the design parameter, U is a variable from 0 to 1.1 and G is a variable from $-1.6 \times 2\pi$ to $1.6 \times 2\pi$ (upper and lower limits of the design parameter is determined at step S311). These parameter sections are divided into five sections to divide the design parameter region (step S312). The results of executing steps S313 to S319 are (a) to (f) in FIG. 26. According to the designing method, the optimization designing is achieved between "$0.5 \leq U \leq 0.9$ and $G=-0.8 \times 2\pi$" (corresponding to (a) to (c) in FIG. 26) and "$0.3 \leq U \leq 0.7$ and $G=0$" (corresponding to (d) to (f) in FIG. 26). Owing to narrowing down the possible parameters, dividing these parameter regions is further repeated to search for the best parameter region maximizing the quantitative quantity, such as the lift. Accordingly, it is possible to know the velocity of the object 200 and each rotation velocity for maximizing the lift by closing the vortex.

Second Method of Designing an Object in Fluid by Using Word Representations and Regular Expressions A designing method that optimizes a flow around an object placed in a fluid (hereinafter, referred to as the "designing subject") using word representations and regular expressions will be described. An exemplary method of designing an object design parameter (physical parameter) using word representations and regular expressions such that a streamline pattern (current pattern) formed around the object placed in a uniform flow becomes a desired streamline pattern (objective pattern) (the above-described second design parameter selecting step) will be described below. In the following example, the streamline pattern in the case where a flat plate airfoil is placed in a uniform flow will be described. The second design parameter selecting step is executable by using only regular expressions in principle, and using both regular expressions and word representations makes it possible to design a more preferable design parameter.

Figure 27:
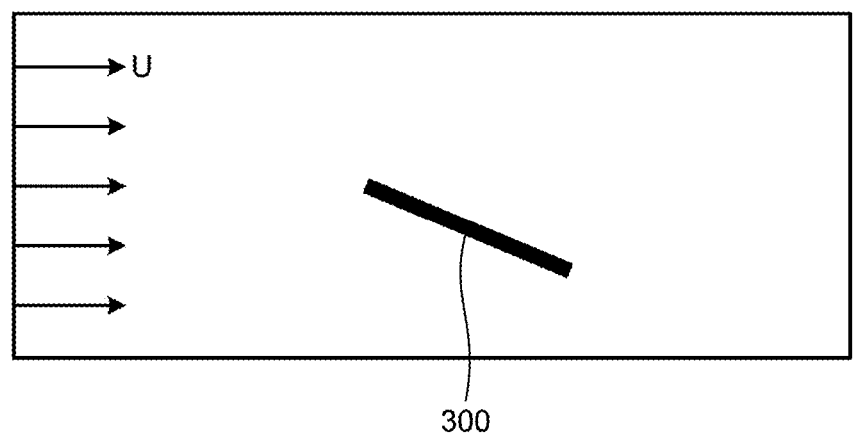
FIG. 27 is an explanatory view for explaining a method of optimizing a flow around an object in a fluid by using word representations and regular expressions.

FIGS. 27 and 28 are explanatory views for explaining the method of optimizing a flow around an object in a fluid by using word representations and regular expressions. FIG. 29 is a flowchart for explaining an exemplary method of optimizing a flow around an object in a fluid by using word representations and regular expressions, that is, the second design parameter selecting step. The flowchart shown in FIG. 29 is executed by the simulation unit 102a.

FIG. 27 illustrates the case where a flat plate airfoil 300 is placed at a given angle with respect to a uniform flow U. FIG. 28 shows flow patterns formed around the flat plate airfoil 300 and the word representations and regular expressions of the streamline patterns. FIG. 28(a) is the streamline pattern extracted from the flow formed around the flat plate airfoil 300 placed in the uniform flow U ("flow" can be calculated through fluid experiments or numeric calculations) (referred to as "Pattern A"). FIG. 28(c) is a pattern where a rotating flow structure is closed on the flat plate airfoil 300 (referred to as "Pattern B"). A method of preferably changing the design parameter of the flat plate airfoil 300 to find out a design parameter that realizes Pattern B (objective pattern) from Pattern A (current pattern) and thus increase the lift applied to the flat plate airfoil 300 will be described.

According to FIG. 29, first of all, at Step A (steps S400 to S402), regular expressions are assigned to Pattern A and Pattern B by using word representations (Japanese Laid-open Patent Publication No. 2012-203601 (PCT/JP2013/070939)) and the algorithm according to the embodiment. Specifically, a word representation $IA_0CCB_0$ and a regular expression $N_A$ of $o_\varnothing(o_0(o_2,-_0(-_0,-_0),+_2,+_2))$ are assigned to Pattern A, and a word representation $IA_0CCB_0$ and a regular expression $N_B$ of $o_\varnothing(o_2\ (o_0, +_0,-_2\ (-_0,-_0,+_2)))$ are assigned to Pattern B (step S400, see FIGS. 28(a) and 28(c)). As the word representations of Pattern A and Pattern B are completely the same, they cannot be distinguished by the conventional technology; however, the regular expressions are different and thus it is possible to distinguish the two flows by using the regular expressions and specify the objective shape of the flow optimum designing by using the regular expressions.

It is determined whether the regular expression $N_A$ of Pattern A and the regular expression $N_B$ of Pattern B are the same (step S401). When the regular expression $N_A$ of Pattern A and the regular expression $N_B$ of Pattern B are the same (YES at step S401), path P=Ø is output (step S402). When the regular expression $N_A$ of Pattern A and the regular expression $N_B$ of Pattern B are different from each other (NO at step S401), the process moves to step S403.

At step B, transition routes of Pattern A and Pattern B are determined (step S403). Specifically, by using the flow pattern transition identifying program (Japanese Laid-open Patent Publication No. 2013-230678 (PCT/JP2014/079512)), routes having the one same regular expression between FIGS. 28(a) and 28(c) at most are determined (step S403). More specifically, all the paths from the regular expression $N_A$ of Pattern A to the regular expression $N_B$ of Pattern B, passing through the same vertex once at most, are listed up and N routes $R_i$ (i=1, 2, ..., N) are obtained. Note that $R_1, ..., R_N$ are arranged according to the ascending order of lengths of routes (length $(R_i)$≤length $(R_{i+1})$). Each route $R_i$ (i=1, 2, ..., N) has an intermediate flow pattern $P_{ij}$ (j=1, 2, ..., M). Note that, for convenience, $P_{i0}=N_A$, $P_{iMi}=N_B$.

At Step C, the design parameter is changed for transition along the route $R_i$ (steps S404 to 415). The design parameter is changed for the N routes $R_i$ (i=1, 2, ..., N) for transition along the routes according to the order i=1, ..., N (the ascending order of the lengths of routes) to calculate an optimum design parameter. In other words, by changing the design parameter, any one of the N routes $R_i$ (i=1, 2, ..., N) from Pattern A to Pattern B that matches the regular expression of Pattern B is determined and the changed design parameter that leads to the match with the regular expression of Pattern B is output as the optimum design parameter.

The range in which the design parameter is changeable is specified around the design parameter of the pattern $P_{ij}$ (note that j=1, 2, ..., M) on the route $R_i$, the range is divided by K, and $S_k$ (k=1, ..., K) is set for each parameter value. Furthermore, the parameter value of the design parameter of the pattern $P_{ij}$ is changed to $S_k$ and a regular expression of a pattern obtained through experiments or numerical calculations is represented by $P_{ij}(S_k)$.

When $P_{ij}(S_k)$ matches the word representation and the regular expression $N_B$ ($=P_{iMi}$) of Pattern B finally, the parameter value is output as the design parameter that achieves optimum designing and the flow ends.

When $S_k$ is changed and $P_{ij}(S_k)$ matches the regular expression $P_{i(j+1)}$ on the route $R_i$, the design parameter is selected, j is further incremented by "1", a range in which the design parameter is changeable is specified around the selected design parameter, the range is divided by K, $S_k$ (k=1, ..., K) is set for each parameter value, and the process is repeated until $P_{ij}(S_k)$ matches the word representation and the regular expression $N_B$ ($=P_{iMi}$) of Pattern B.

When $P_{ij}(S_k)$ does not match the regular expression $P_{i(j+1)}$ on the route $R_i$ even after $S_k$ is changed, it is determined that transition on the route is impossible and $S_k$ is changed for the next route.

First of all, i=1, j=1 and k=1 are put (steps S404 to S406). Next, it is determined whether $P_{ij}(S_k)=P_{i(j+1)}$ (step S407). When $P_{ij}(S_k)=P_{i(j+1)}$ (YES at step S407), j←j+1 is put (step S413) and it is determined whether j=$M_i$ (step S414). When j=$M_i$ (YES at step S414), in other words, when $P_{ij}(S_k)=P_{iMi}(=N_B)$, as the design parameter is the optimum design parameter, the path P=$R_i$ and the design parameter are output (step S415), and the flow ends. When j=$M_i$ is negative (NO at step S414), the design parameter is selected, the process returns to step S406, a range in which the design parameter is changeable is specified around the selected design parameter, the range is divided by K, $S_k$ (k=1, ..., K) is put for each parameter value, and the process is repeated until $P_{ij}(S_k)$ matches the word representation and the regular expression $N_B$ ($=P_{iMi}$) of Pattern B.

When $P_{ij}(S_k)=P_{i(j+1)}$ is negative (NO at step S407), k←k+1 is put (step S408) and it is determined whether k≤K (step S409). When k≤K (YES at step S409), the process returns to step S407. On the other hand, when k≤K is negative (NO at step S409), i←i+1 is put (step S410) and it is determined whether i≤N (step S411). When i≤N (YES at step S411), the process returns to step S405 to perform searching on the next route and, when i≤N is negative (NO at step S411), optimization is impossible with respect to all the routes and "impossible" is output (step S412).

The pattern in FIG. 28(b) that is the shortest route will be described as one of the routes obtained at Step B (in the case where the route is via the word representation $ICCCB_0$, the regular expression $o_⊘(o_2 (-_2 (-_0,-_0,+_2,+_2))))$ (for the length of the route, M=1)). At Step C, the design parameter is changed from Pattern A in FIG. 28(a) to search for the word representation and the regular expression in FIG. 28(b). When the pattern in FIG. 28(b) is not found even if all design parameters to which the design parameter is changeable are searched, it is determined that optimum designing along this route is impossible and the same is repeated on a route acquired at Step B other than the shortest route in FIG. 28(b).

When the design parameter that realizes the objective Pattern B in FIG. 28(c) is found straightforwardly, since this is the optimum design parameter, the design parameter is output and the flow ends (step S415). On the other hand, when a design parameter that achieves the pattern in FIG. 28(b) is found, the design parameter is selected and a range in which the design parameter is changeable is specified around the design parameter, the range is divided, and experiments and numerical calculations are performed on each division to perform searching on whether there is a design parameter leading to Pattern B in FIG. 28(c). When a design parameter leading to Pattern B in FIG. 28(c) is found, since this is the optimum design parameter, the design parameter is output and the flow ends.

When an optimum design parameter is not found even after all the range in which the design parameter is changeable is searched, it is determined that optimization on the route is impossible and searching is performed on another route obtained at Step B. When no design parameter leading to Pattern B in FIG. 28(c) is found even after searching is performed on all the routes acquired at Step B, it is determined that optimization is impossible (step S412).

Other Embodiments

The embodiment of the present invention has been described above, and the present invention may be carried out by, in addition to the above-described embodiment, various different embodiments within the scope of the technical idea described in the claims.

For example, the example has been given described where the regular expression creating apparatus 100 performs the processing in a stand-alone mode, and alternatively the regular expression creating apparatus 100 may perform the processing in response to a request from a client terminal and return the processing result to the client terminal.

Moreover, among the steps of the processing described in the embodiment, all or part of the steps of the processing described as ones automatically performed may be performed manually and all or part of the steps of the processing described as ones manually performed may be performed automatically by well-known methods.

In addition to this, the processing procedures, control procedures, specific names, information including registered data of each set of processing and parameters, such as retrieval conditions, screen examples, and database configurations, described in the literatures and drawings above may be arbitrarily changed unless otherwise noted.

Furthermore, each component of the regular expression creating apparatus 100 illustrated in the drawings is of a functional concept and is not necessarily configured physically as illustrated in the drawings.

For example, all or any part of the processing functions that the devices in the regular expression creating apparatus 100 have, and particularly each processing function performed by the control unit 102, may be implemented by a CPU (Central Processing Unit) and a program interpreted and executed by the CPU, or may be implemented as hardware using a wired logic. The program is recorded in a recording medium to be described below and is mechanically read by the regular expression creating apparatus 100 as necessary. Specifically, the storage unit 106, such as a ROM and an HD, or the like records a computer program for giving instructions to the CPU in cooperation with the OS (Operating System) to perform various types of processing. This computer program is downloaded to a RAM and accordingly executed to configure the control unit 102 in cooperation with the CPU.

Moreover, this computer program may be stored in an application program server that is connected to the regular expression creating apparatus 100 via any network 130, and all or part thereof may be downloaded as necessary.

Furthermore, the program according to the present invention may be stored in a computer-readable recording medium and may be configured as a program product. The "recording medium" includes any "portable physical medium", such as a memory card, USB memory, SD card, flexible disk, magneto-optical disk, ROM, EPROM, an EEPROM, CD-ROM, MO, DVD, and Blu-ray (trademark) disc.

Moreover, the "program" refers to a data processing method written in any language and by any description method, and is not limited to a specific format, such as source codes and binary codes. The "program" is not necessarily configured unitarily and includes a program configured in a dispersed manner as multiple modules and libraries and a program that implements its functions in cooperation with a different program represented by an OS (Operating System). Well-known configurations and procedures can be used for the specific configuration for each device shown in the embodiment to read the recording medium, the reading procedure, or the installation procedure after the reading, and the like.

Various databases and the like (the simulation result file 106a, the streamline diagram file 106b, the regular expression file 106c, etc.) stored in the storage unit 106 are storage units, examples of which are a memory device, such as a RAM or a ROM, a fixed disk device, such as a hard disk, a flexible disk, and an optical disk, and store therein various programs, tables, databases, files for web pages, and the like that are used for various types of processing and providing websites.

Moreover, the regular expression creating apparatus 100 may be configured as an information processing apparatus, such as a well-known personal computer or workstation, or may be configured by connecting any peripheral device to the information processing apparatus. Moreover, the regular expression creating apparatus 100 may be implemented by installing software (including program and data) that causes the information processing apparatus to implement the method according to the present invention.

Furthermore, specific modes of distribution/integration of the devices are not limited to those illustrated in the drawings, and all or a part thereof can be configured by functionally or physically distributing or integrating them in any unit according to various additions or the like, or according to functional loads. In other words, the above-described embodiment may be implemented by any combination or the embodiment may be selectively performed.

As described above, according to the embodiment, the regular expression creating method of creating a regular expression of a flow pattern in a multiply connected exterior domain with N (N is an integer equal to or larger than 1) holes topologically includes the graph representation creating step of creating a graph representation having one-to-one correspondence to the flow pattern and the regular expression creating step of creating a regular expression from the graph representation that is created at the graph representation creating step, and thus there is an effect that it is possible to provide a new representation method enabling one-to-one correspondence to the flow pattern.

The graph representation is obtained by assigning a unique rooted, labeled, and directed tree $T_H=(V,E)$ (where V is a set of points called vertices and E is a set of edges connecting the vertices) to a structurally stable Hamiltonian vector field H defined by a flow pattern and then visualizing the tree as a plane graph, and thus there is an effect that, for a structurally stable Hamiltonian vector field, it is possible to provide, as a graph representation, one obtained by visualizing a unique rooted, labeled, and directed tree into a plane graph.

According to the embodiment, the graph representation may be obtained by, when v is a parent vertex, w is a child vertex of the parent vertex, l(v) is a label assigned to the parent vertex v, l(w) is a label assigned to the child vertex w, and $\Gamma(v)$ is the set of child vertices of v, arranging the set of child vertices $\Gamma(v)$ of v according to the rules of a given order relation and drawing arrows from l(v) to l(w) from left to right for $w\in\Gamma(v)$, and thus there is an effect that it is possible to provide a graph representation in which parent-child connected relation can be seen by sight.

According to the embodiment, the flow pattern may be at least one of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes, and thus there is an effect that it is possible to assign regular expressions to all basic flow patterns and deal with regular expressions of specific flow patterns.

According to the embodiment, the word representation conversion step of converting a regular expression created at the regular expression creating step into a word representation is included, and thus there is an effect that it is possible to convert a regular expression into a word representation.

According to the embodiment, the word representation is a sign word that is formed by assigning any one of operation words that define five types of operations that can be topologically adopted to add a hole to a flow pattern, for the number of times corresponding to the number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes, and thus there is an effect that it is possible to convert regular expressions into all basic flow patterns and the word representations that define the five types of operations that can be topologically adopted.

According to the embodiment, as in word representation, it is possible to provide the regular expression creating method, the regular expression creating apparatus, and the program for flow patterns that make it possible to easily deal with flow patterns that can be adopted to structures without depending on experiences and intuition. Use of both word representation and regular expression makes it possible to limit ones that cannot limit specific flows with only word representations and further develop the theory of flow optimum control.

Note that word representations and regular expressions are extremely useful in various fields involving designing and layout of structures, such as designing bridge piers, a layout of a breakwater, removal of contaminants at harbors, designing blades for wind power generation, a structure of pantograph of a train, and the optimum layout of oil fences. It is also possible to apply them to fields, such as sport dynamics, for designing the structures of sports goods.

REFERENCE SIGNS LIST

100 REGULAR EXPRESSION CREATING APPARATUS
102 CONTROL UNIT
102a SIMULATION UNIT
102b STREAMLINE ANALYZING UNIT
102c GRAPH REPRESENTATION CREATING UNIT
102d REGULAR EXPRESSION CREATING UNIT
102e WORD REPRESENTATION CONVERSION UNIT
104 COMMUNICATION CONTROL INTERFACE UNIT
106 STORAGE UNIT
106a SIMULATION RESULT FILE
106b STREAMLINE DIAGRAM FILE
106c REGULAR EXPRESSION FILE
108 INPUT/OUTPUT CONTROL INTERFACE UNIT
112 INPUT DEVICE
114 OUTPUT DEVICE
120 EXTERNAL SYSTEM
130 NETWORK
200 OBJECT
300 FLAT PLATE AIRFOIL

The invention claimed is:

1. A method of creating a regular expression of a flow pattern in a multiply connected exterior domain with N holes topologically, the method comprising:
retrieving, by one or more processor devices from one or more memory devices of a regular expression creating apparatus, one or more flow patterns;
creating, by the one or more processor devices, a graph representation of each of the retrieved one or more flow patterns based on a unique tree being assigned to each field of the retrieved one or more flow pattern, each graph representation having one-to-one correspondence to each of the retrieved one or more flow patterns;
creating, by the one or more processor devices, a regular expression from each created graph representation;
storing, by the one or more processor devices in the one or more memory devices, the each created regular expression in association with a corresponding one of the retrieved one or more flow patterns;
receiving, from an interface, an instruction to conduct one or more flow pattern calculations;
retrieving, by the one or more processor devices from the one or more memory devices, one or more stored regular expressions for the one or more flow pattern calculations on one or more of the flow patterns associated with the one or more retrieved regular expressions;
executing, by the one or more processor devices, the one or more flow pattern calculations based on the one or more retrieved regular expressions; and
outputting, to the interface, a result of the one or more flow pattern calculations,
wherein N is an integer equal to or larger than 1,
wherein each of the one or more flow patterns is defined by at least one of
1) a pattern I, among two types of flow patterns that can be topologically adopted in a simply connected exterior domain with a hole, with a 1-source-sink point and two ss-∂-saddle connections,
2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and
3) a pattern O without any 1-source-sink point in a doubly connected exterior domain with two holes, and
wherein the flow pattern is a flow pattern diagram that is created by repeating an operation, starting from at least one pattern, of assigning any one of operation words defining five types of operations that can be topologically adopted to add a hole to a flow pattern until a number of holes reaches N.

2. The method according to claim 1, wherein the each graph representation is obtained by assigning a unique rooted, labeled, and directed tree TH=(V,E) to a structurally stable Hamiltonian vector field H defined by the flow pattern and then visualizing the tree as a plane graph, and
wherein V is a set of points called vertices and E is a set of edges connecting the vertices.

3. The method according to claim 1, wherein the each graph representation is obtained by, when v is a parent vertex, w is a child vertex of the parent vertex, l(v) is a label assigned to the parent vertex v, l(w) is a label assigned to the child vertex w, and Γ(v) is the set of child vertices of v, arranging the set of child vertices Γ(v) of v according to rules of a given order relation and drawing arrows from l(v) to l(w) from left to right for w∈Γ(v).

4. The method according to claim 1, wherein the graph representation creating step comprises:
when the flow pattern has a 1-source-sink point, converting the flow pattern such that a domain containing a counterclockwise ss-orbit closest to the 1-source-sink point is an outermost domain;
extracting orbits appearing on a (ss-)saddle connection diagram of the converted flow pattern from a whole domain;

setting vertices for connected components obtained by excluding all orbits appearing on the (ss-)saddle connection diagram from the whole domain and regarding an outermost connected component as a root;

setting a current component as the root;

regarding the connected components sharing a boundary with the current component as children of the current component, assigning labels according to an orbit serving as the boundary, and arranging the labels according to a given order relation; and setting the children of the current component as current components and repeating the regarding, assigning, arranging, and setting until there is no child.

5. The method according to claim 1, further comprising converting the each created regular expression into a word representation, wherein the word representation is a sign word that is formed by assigning any one of a plurality of operation words that define five types of operations that can be topologically adopted to add a hole to a flow pattern, for a number of times corresponding to a number of added holes, to pattern words that define three types of flow patterns in total including, in addition to two types of flow patterns that can be topologically adopted in a simply connected exterior domain with a hole, a pattern without any 1-source-sink point in a doubly connected exterior domain with two holes.

6. The method according to claim 5, wherein the regular expression converting comprises converting, into the word representation, an admissible regular expression enabling a forward replacement performed on a regular expression of a fundamental type among regular expressions corresponding to a rooted, labeled, and directed tree.

7. The method according to claim 5, further comprising selecting a possible design parameter for an object in a fluid by:

setting an upper limit and a lower limit of a design parameter;

selecting multiple parameters from a parameter region that is defined by the upper limit and the lower limit;

performing experiments and/or numerical calculations on a flow with respect to each of the selected multiple parameters;

assigning a word representation and a regular expression to each obtained result of the experiments and/or numerical calculations; and selecting, as the possible design parameter, a design parameter whose word representation and regular expression represent an optimum state.

8. The method according to claim 7, wherein the design parameter selecting further comprises performing optimization designing by using the selected design parameter.

9. The method according to claim 1, further comprising designing an object design parameter using the one or more retrieved regular expressions such that a current flow pattern formed around an object placed in a fluid flow becomes a desired objective flow pattern, wherein the designing comprises:

acquiring all routes for transition from the regular expression of the current flow pattern to the regular expression of the objective flow pattern that pass through a same vertex once at most;

changing the design parameter along one of the routes for transition;

calculating a flow pattern and a regular expression for the changed design parameter;

determining whether the changed design parameter leads to a match between the calculated regular expression and the regular expression of the objective flow pattern; and repeating the changing, the calculating, and the determining and, upon the condition of determining the match, outputting the changed design parameter.

10. A regular expression creating apparatus that creates a regular expression of a flow pattern in a multiply connected exterior domain with N holes topologically, the apparatus comprising:

one or more processor devices;

an interface; and one or more memory devices connected to the one or more processor devices, the one or more memory devices storing computer readable program instructions that, when executed by the one or more processor devices, cause the one or more processor devices to:

retrieve one or more flow patterns stored in the one or more memory devices;

create a graph representation of each of the retrieved one or more flow patterns based on a unique tree being assigned to each field of the retrieved one or more flow pattern, each graph representation having one-to-one correspondence to each of the retrieved one or more flow patterns;

create a regular expression from each created graph representation;

store each created regular expression in the one or more memory devices in association with a corresponding one of the retrieved one or more flow patterns;

receive, from the interface, an instruction to conduct one or more flow pattern calculations, retrieve, from the one or memory devices, one or more stored regular expressions for the one or more flow pattern calculations on one or more of the flow patterns associated with the one or more retrieved regular expressions;

execute the one or more flow pattern calculations based on the one or more retrieved regular expressions; and output, to the interface, a result of the one or more flow pattern calculations, wherein N is an integer equal to or larger than 1, wherein each of the one or more flow patterns is defined by at least one of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes, and wherein the flow pattern is a flow pattern diagram that is created by repeating an operation, starting from at least one pattern, of assigning any one of operation words defining five types of operations that can be topologically adopted to add a hole to a flow pattern until a number of holes reaches N.

11. A non-transitory computer-readable medium comprising computer readable program codes, performed by a regular expression creating apparatus that creates a regular expression of a flow pattern in a multiply connected exterior domain with N holes topologically, the program codes when executed causing a computer to execute:

retrieving, by one or more processor devices from one or more memory devices of the flow pattern regular expression creating apparatus, one or more flow patterns;

creating, by the one or more processor devices, a graph representation of each of the retrieved one or more flow patterns based on a unique tree being assigned to each field of the retrieved one or more flow pattern, each graph representation having one-to-one correspondence to each of the retrieved one or more flow patterns;

creating, by the one or more processor devices, a regular expression from each created graph representation;

storing, by the one or more processor devices in the one or more memory devices, each created regular expression in association with a corresponding one of the retrieved one or more flow patterns;

receiving, from an interface, an instruction to conduct one or more flow pattern calculations;

retrieving, by the one or more processor devices from the one or more memory devices, one or more stored regular expressions for the one or more flow pattern calculations on one or more of the flow patterns associated with the one or more retrieved regular expressions;

executing by the one or more processor devices, the one or more flow pattern calculations based on the one or more retrieved regular expressions; and outputting, to the interface, a result of the one or more flow pattern calculations, wherein N is an integer equal to or larger than 1, wherein each of the one or more flow patterns is defined by at least one of 1) a pattern I, among two types of flow patterns that can be topologically adopted in a simply connected exterior domain with a hole, with a 1-source-sink point and two ss-∂-saddle connections, 2) a pattern II, among the two types of flow patterns that can be topologically adopted in a simply connected exterior domain with a hole, with a 1-source-sink point, a saddle point, a homoclinic saddle connection connecting to the saddle point, and two ss-saddle connections, and 3) a pattern O without any 1-source-sink point in a doubly connected exterior domain with two holes, and wherein the flow pattern is a flow pattern diagram that is created by repeating an operation, starting from at least one pattern, of assigning any one of operation words defining five types of operations that can be topologically adopted to add a hole to a flow pattern until a number of holes reaches N.

* * * * *